(12) United States Patent
Ishigaki et al.

(10) Patent No.: US 10,170,988 B2
(45) Date of Patent: Jan. 1, 2019

(54) POWER SUPPLY SYSTEM

(71) Applicant: TOYOTA JIDOSHA KABUSHIKI KAISHA, Toyota-shi, Aichi-ken (JP)

(72) Inventors: Masanori Ishigaki, Nagakute (JP); Shuji Tomura, Nagakute (JP); Naoki Yanagizawa, Nagakute (JP); Masaki Okamura, Toyota (JP)

(73) Assignee: TOYOTA JIDOSHA KABUSHIKI KAISHA, Toyota-shi (JP)

( * ) Notice: Subject to any disclaimer, the term of this patent is extended or adjusted under 35 U.S.C. 154(b) by 328 days.

(21) Appl. No.: 14/916,023

(22) PCT Filed: Sep. 2, 2014

(86) PCT No.: PCT/JP2014/004501
§ 371 (c)(1),
(2) Date: Mar. 2, 2016

(87) PCT Pub. No.: WO2015/033553
PCT Pub. Date: Mar. 12, 2015

(65) Prior Publication Data
US 2016/0204703 A1    Jul. 14, 2016

(30) Foreign Application Priority Data

Sep. 4, 2013 (JP) .................. 2013-183155

(51) Int. Cl.
*H02J 1/10* (2006.01)
*H02M 3/158* (2006.01)
(Continued)

(52) U.S. Cl.
CPC ............. *H02M 3/158* (2013.01); *H02M 3/02* (2013.01); *H02M 3/18* (2013.01)

(58) Field of Classification Search
CPC ........... H02M 3/158; H02M 3/18; H02M 3/02
(Continued)

(56) References Cited

U.S. PATENT DOCUMENTS 5,414,614 A   5/1995  Fette et al.
5,461,264 A   10/1995 Yang
(Continued)

FOREIGN PATENT DOCUMENTS

CN   101529690 A   9/2009
JP   2000-295715 A  10/2000
(Continued)

*Primary Examiner* — Richard Tan
(74) *Attorney, Agent, or Firm* — Hunton Andrews Kurth LLP

(57) ABSTRACT

An operation mode selection unit selects an operation mode of a power converter and generates a mode selection signal indicating the result of selection, in accordance with a load condition and a power supply condition. An operation mode switching control unit generates a mode control signal designating an operation mode of the power converter. When the operation mode currently selected by the mode control signal is different from an operation mode indicated by the mode selection signal, the operation mode switching control unit adjusts a power distribution ratio between a plurality of DC power supplies or an output voltage on an electric power line so as not to change abruptly, and then permits a transition of operation mode.

9 Claims, 27 Drawing Sheets

(51) Int. Cl.
*H02M 3/02* (2006.01)
*H02M 3/18* (2006.01)

(58) Field of Classification Search
USPC .......................................... 307/43
See application file for complete search history.

(56) References Cited

U.S. PATENT DOCUMENTS

| | | |
|---|---|---|
| 2003/0071523 A1 | 4/2003 | Silverman |
| 2010/0001583 A1 | 1/2010 | Ichikawa |
| 2011/0090721 A1 | 4/2011 | Singer et al. |
| 2013/0134786 A1 | 5/2013 | Ishigaki et al. |
| 2014/0145694 A1* | 5/2014 | Ishigaki .................. H02J 1/06 |
| | | 323/271 |

FOREIGN PATENT DOCUMENTS

| | | |
|---|---|---|
| JP | 2006-033956 A | 2/2006 |
| JP | 2008-054477 A | 3/2008 |
| JP | 2008-109756 A | 5/2008 |
| JP | 2010-057288 A | 3/2010 |
| JP | 2011-024305 A | 2/2011 |
| JP | 2012-070514 A | 4/2012 |
| WO | WO 2013001989 * | 1/2013 ............ H02M 3/158 |

* cited by examiner

FIG.3

| OPERATION MODE | USED POWER SUPPLY | S1 | S2 | S3 | S4 | k | OUTPUT VOLTAGE RANGE |
|---|---|---|---|---|---|---|---|
| PB | 10a AND 10b (IN PARALLEL) | PWM CONTROL | | | | CONTROLLABLE | max(Va, Vb) ~VHmax |
| SB | 10a AND 10b (IN SERIES) | PWM CONTROL | | | | $\dfrac{Va}{Va+Vb}$ | Va+Vb ~VHmax |
| aB | ONLY 10a | PWM CONTROL | | | | 1.0 | max(Va, Vb) ~VHmax |
| bB | ONLY 10b | PWM CONTROL | | | | 0.0 | max(Va, Vb) ~VHmax |
| PD | 10a AND 10b | ON | ON | OFF | ON | INTERNAL RESISTANCE RATIO | max(Va, Vb) |
| SD | 10a AND 10b | ON | OFF | ON | OFF | $\dfrac{Va}{Va+Vb}$ | Va+Vb |
| aD | ONLY 10a | ON | ON | OFF | OFF | 1.0 | Va(Va>Vb) |
| bD | ONLY 10b | ON | OFF | OFF | ON | 0.0 | Vb(Vb>Va) |

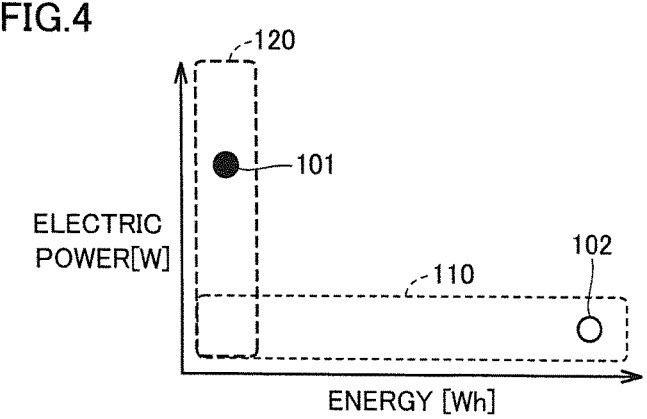

FIG.4

FIG.5
(a)
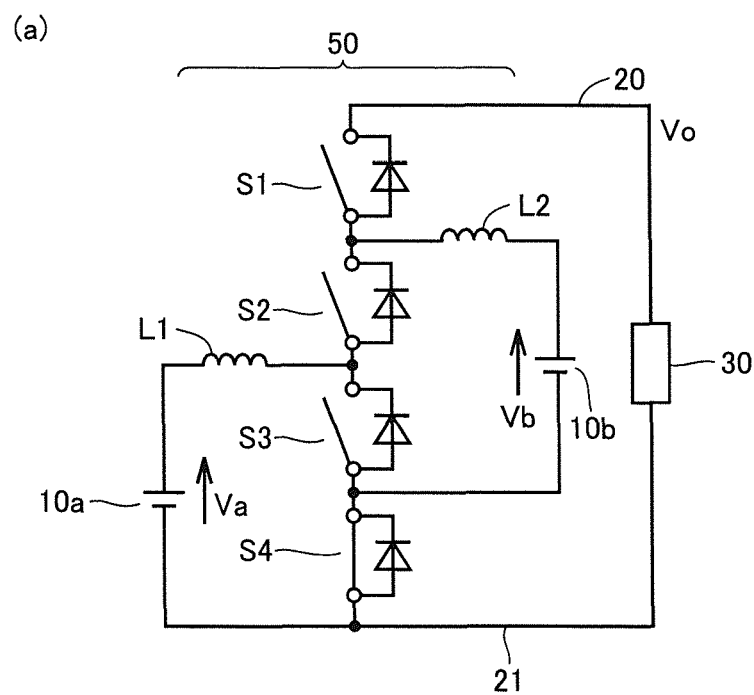
(b)
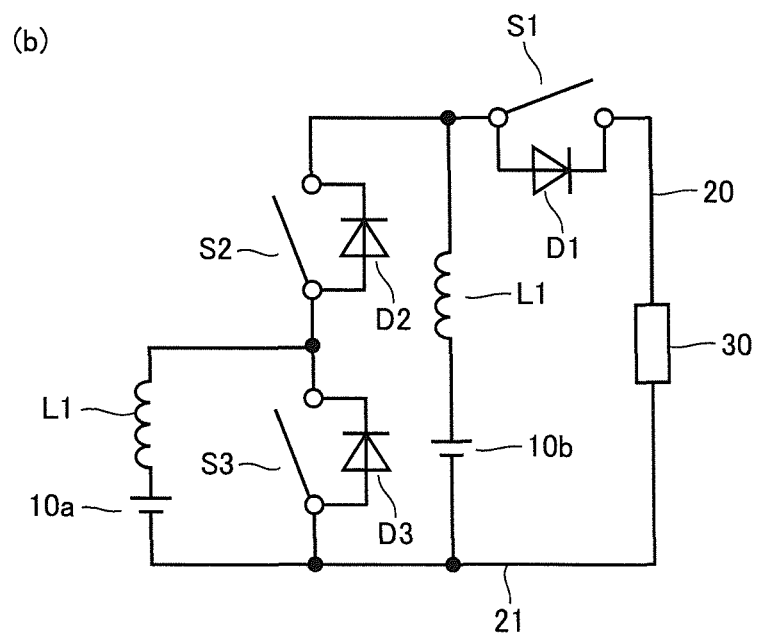

FIG.6
(a)
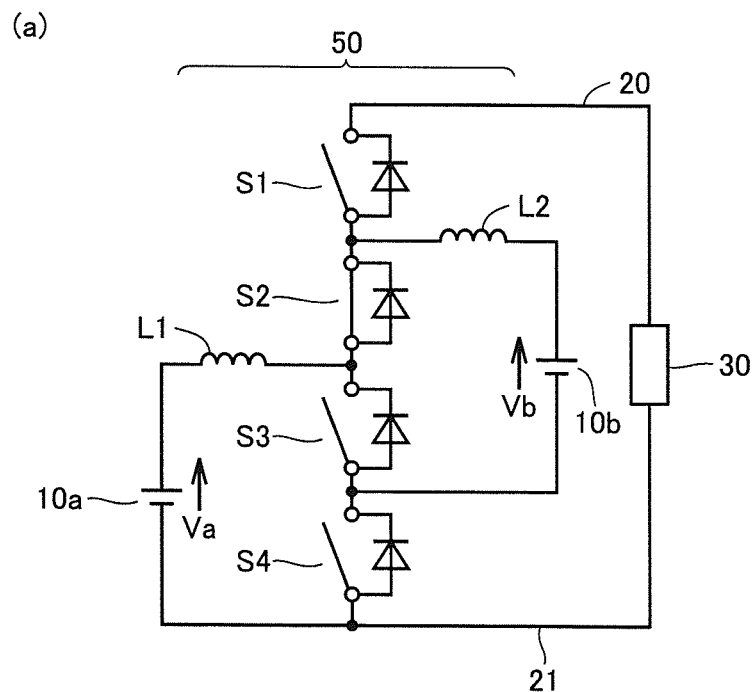
(b)
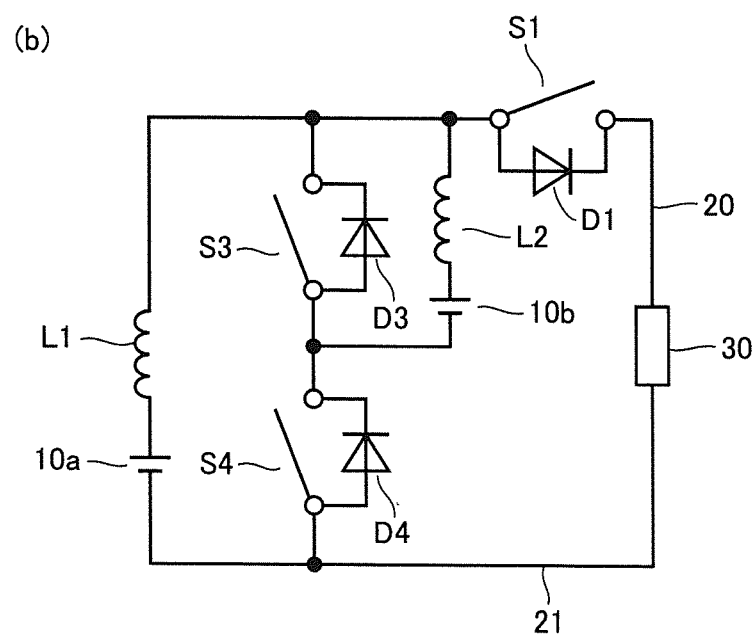

FIG.7
(a)
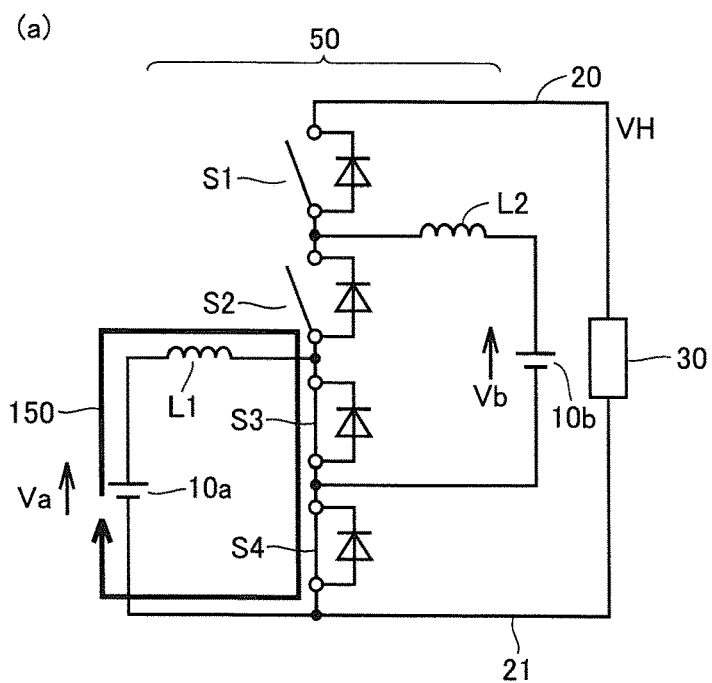
(b)
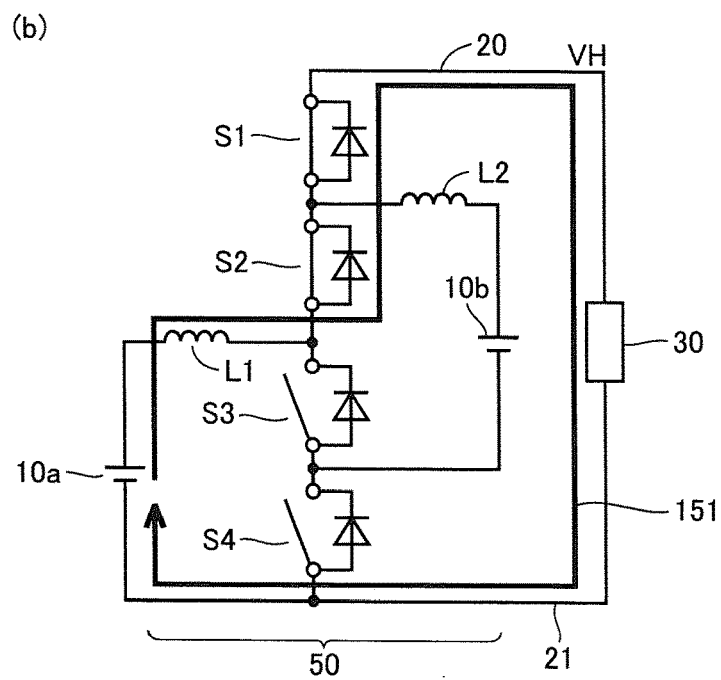

FIG.8
(a)
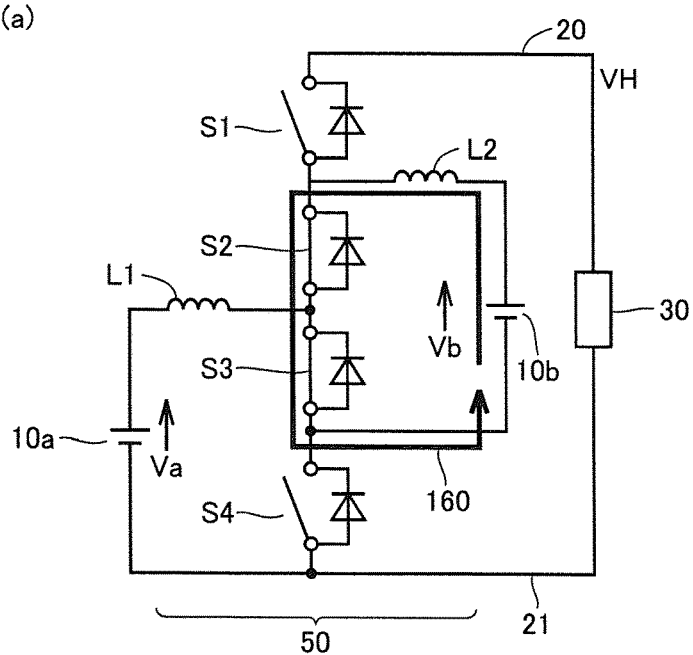
(b)
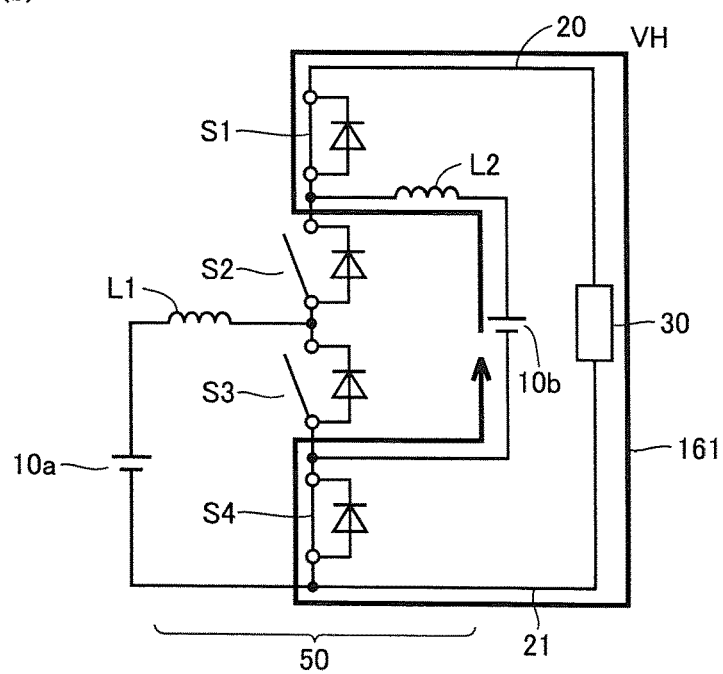

| | OPERATIONAL EXPRESSION |
|---|---|
| SG1 | /SDa or /SDb |
| SG2 | /SDa or SDb |
| SG3 | SDa or SDb |
| SG4 | SDa or /SDb |

FIG.11
(a)
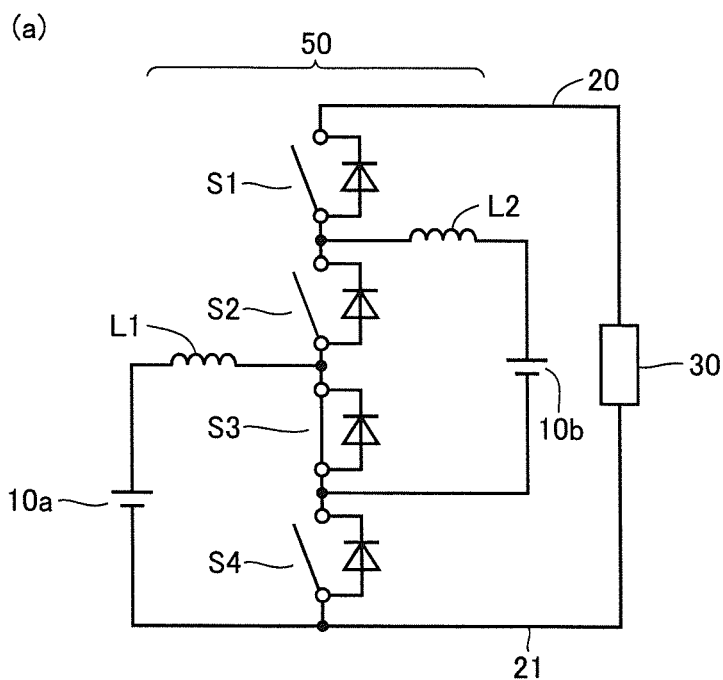
(b)
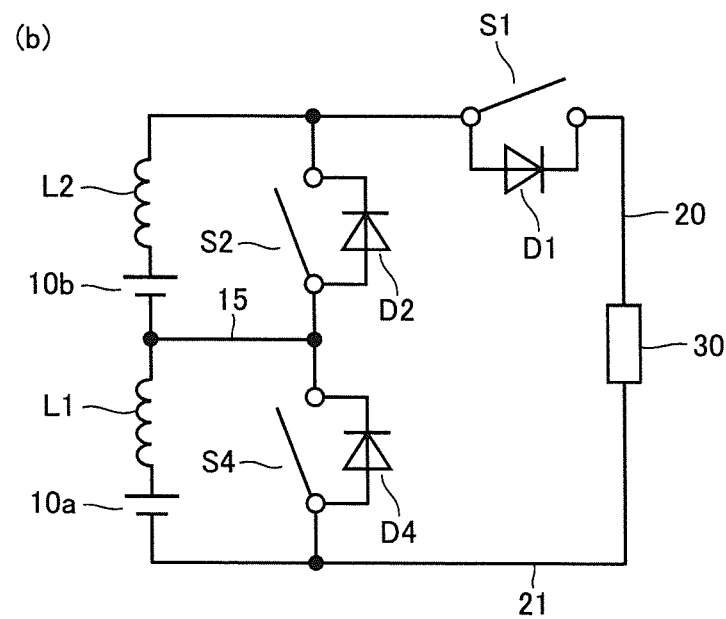

FIG.12
(a)
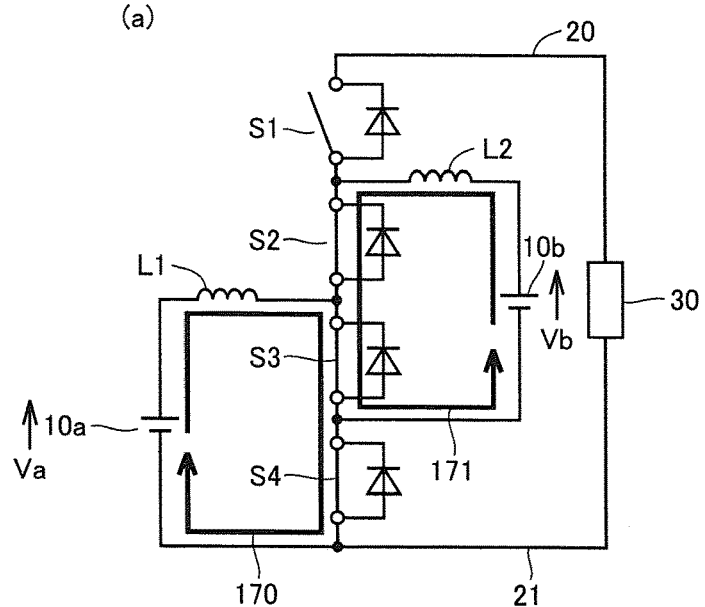
(b)
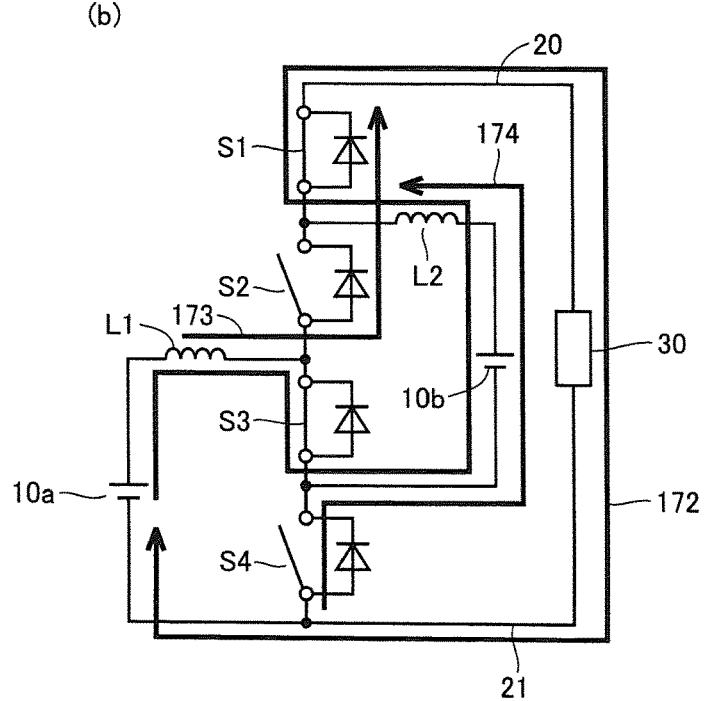

| | OPERATIONAL EXPRESSION |
|---|---|
| SG1 | /SDc |
| SG2 | SDc |
| SG3 | KEPT AT H |
| SG4 | SDc |

FIG.18

| PRESENT MODE | MODE AFTER TRANSITION | VH REQUIREMENT | POWER DISTRIBUTION REQUIREMENT | POWER PROTECTION REQUIREMENT |
|---|---|---|---|---|
| PB | SB | VH>Va+Vb (INCREASE VH*) | k=k1 (ADJUST Pa*) | ·CHECK UPPER AND LOWER LIMITS OF Pa(SB) (Pamin~Pamax) ·CHECK UPPER AND LOWER LIMITS OF Pb(SB) (Pbmin~Pbmax) |
| | aB | — | k=1.0 (INCREASE Pa*) | CHECK UPPER AND LOWER LIMITS OF PL* (Pamin~Pamax) |
| | bB | — | k=0 (Pa* TO 0) | CHECK UPPER AND LOWER LIMITS OF PL* (Pbmin~Pbmax) |
| | PD | VH=max(Va,Vb) | k=k2 (ADJUST Pa*) | ·CHECK UPPER AND LOWER LIMITS OF Pa(PD) (Pamin~Pamax) ·CHECK UPPER AND LOWER LIMITS OF Pb(PD) (Pbmin~Pbmax) |
| | SD | VH=Va+Vb (ADJUST VH*) | k=k1 (ADJUST Pa*) | ·CHECK UPPER AND LOWER LIMITS OF Pa(SD) (Pamin~Pamax) ·CHECK UPPER AND LOWER LIMITS OF Pb(SD) (Pbmin~Pbmax) |
| | aD | VH=Va (DECREASE VH*) | k=1.0 (INCREASE Pa*) | CHECK UPPER AND LOWER LIMITS OF PL* (Pamin~Pamax) |
| | bD | VH=Vb (DECREASE VH*) | k=0.0 (Pa* TO 0) | CHECK UPPER AND LOWER LIMITS OF PL* (Pbmin~Pbmax) |

FIG.19

| PRESENT MODE | MODE AFTER TRANSITION | VH REQUIREMENT | POWER DISTRIBUTION REQUIREMENT | POWER PROTECTION REQUIREMENT |
|---|---|---|---|---|
| SB | PB | — | — (MAINTAIN k=k1) | — |
| | aB | SB → PB (Fig.18) → aB | | |
| | bB | SB → PB (Fig.18) → bB | | |
| | PD | SB → PB (Fig.18) → PD | | |
| | SD | VH=Va+Vb (ADJUST VH∗) | — (k# UNCHANGED) | — |
| | aD | SB → PB (Fig.18) → aD | | |
| | bD | SB → PB (Fig.18) → bD | | |

FIG.20

| PRESENT MODE | MODE AFTER TRANSITION | VH REQUIREMENT | POWER DISTRIBUTION REQUIREMENT | POWER PROTECTION REQUIREMENT |
|---|---|---|---|---|
| aB | PB | — | — (k=1.0) | — |
| | SB | aB → PB (Fig.18) → SB | | |
| | PD | aB → PB (Fig.18) → PD | | |
| | SD | aB → PB (Fig.18) → SD | | |
| | aD | VH=Va (ADJUST VH∗) | — | — |
| | bD (bB) | aB → PB (Fig.18) → bD(bB) | | |

FIG.21

| PRESENT MODE | MODE AFTER TRANSITION | VH REQUIREMENT | POWER DISTRIBUTION REQUIREMENT | POWER PROTECTION REQUIREMENT |
|---|---|---|---|---|
| bB | PB | — | — (k=0) | — |
| | SB | bB ⟶ PB | PB ⟶ SB (Fig.18) | |
| | PD | bB ⟶ PB | PB ⟶ PD (Fig.18) | |
| | SD | aB ⟶ DB | DB ⟶ SD (Fig.18) | |
| | bD | VH=Va (ADJUST VH*) | — | — |
| | aD (aB) | bB ⟶ PB | PB ⟶ aD(aB) (Fig.18) | |

FIG.22

| PRESENT MODE | MODE AFTER TRANSITION | VH REQUIREMENT | POWER DISTRIBUTION REQUIREMENT | POWER PROTECTION REQUIREMENT |
|---|---|---|---|---|
| PD | PB | — | — (MAINTAIN k=k2) | — |
| | SB | PB ⟶ PB | PB ⟶ PD (Fig.18) | |
| | aB | PD ⟶ PB | PB ⟶ aB (Fig.18) | |
| | bB | PD ⟶ PB | PB ⟶ bB (Fig.18) | |
| | SD | PD ⟶ PB | PB ⟶ SD (Fig.18) | |
| | aD | TRANSITION IN ACCORDANCE WITH VOLTAGE RELATIONSHIP (Va>Vb) | | |
| | bD | TRANSITION IN ACCORDANCE WITH VOLTAGE RELATIONSHIP (Vb>Va) | | |

FIG.23

| PRESENT MODE | MODE AFTER TRANSITION | VH REQUIREMENT | POWER DISTRIBUTION REQUIREMENT | POWER PROTECTION REQUIREMENT |
|---|---|---|---|---|
| SD | PB | — | — (MAINTAIN k=k#) | — |
|  | SB | — | — | — |
|  | aB | SD ⟶ PB (Fig.18) ⟶ aB | | |
|  | bB | SD ⟶ PB (Fig.18) ⟶ bB | | |
|  | PD | SD ⟶ PB (Fig.18) ⟶ PD | | |
|  | aD | SD ⟶ PB (Fig.18) ⟶ aD | | |
|  | bD | SD ⟶ PB (Fig.18) ⟶ bB | | |

FIG.24

| PRESENT MODE | MODE AFTER TRANSITION | VH REQUIREMENT | POWER DISTRIBUTION REQUIREMENT | POWER PROTECTION REQUIREMENT |
|---|---|---|---|---|
| aD | PB | — | — (MAINTAIN k=1.0) | — |
|  | SB | aD ⟶ PB (Fig.18) ⟶ aD | | |
|  | aB | — | — | — |
|  | bB | aD ⟶ PB (Fig.18) ⟶ bB | | |
|  | PD | aD ⟶ PB (Fig.18) ⟶ PD | | |
|  | SD | aD ⟶ PB (Fig.18) ⟶ SD | | |
|  | bD, PD | TRANSITION IN ACCORDANCE WITH VOLTAGE RELATIONSHIP | | |

| PRESENT MODE | MODE AFTER TRANSITION | VH REQUIREMENT | POWER DISTRIBUTION REQUIREMENT | POWER PROTECTION REQUIREMENT |
|---|---|---|---|---|
| bD | PB | — | (MAINTAIN k=0) | — |
|  | SB | bD ⟶ PB | (Fig.18) ⟶ bD | |
|  | aB | bD ⟶ PB | (Fig.18) ⟶ aB | |
|  | bB | — | — | — |
|  | PD | bD ⟶ PB | (Fig.18) ⟶ PD | |
|  | SD | bD ⟶ PB | (Fig.18) ⟶ SD | |
|  | aD, PD | TRANSITION IN ACCORDANCE WITH VOLTAGE RELATIONSHIP | | |

| | | | | |
|---|---|---|---|---|
| S1 | OFF | ON | ON | OFF |
| S2 | ON | OFF | ON | ON |
| S3 | ON | ON | ON | ON |
| S4 | ON | ON | OFF | ON |

FIG.29
(a)
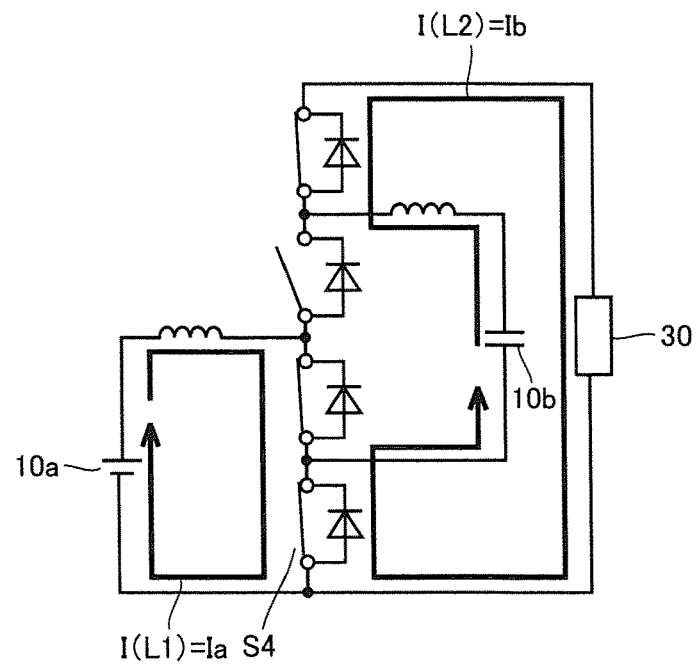
(b)
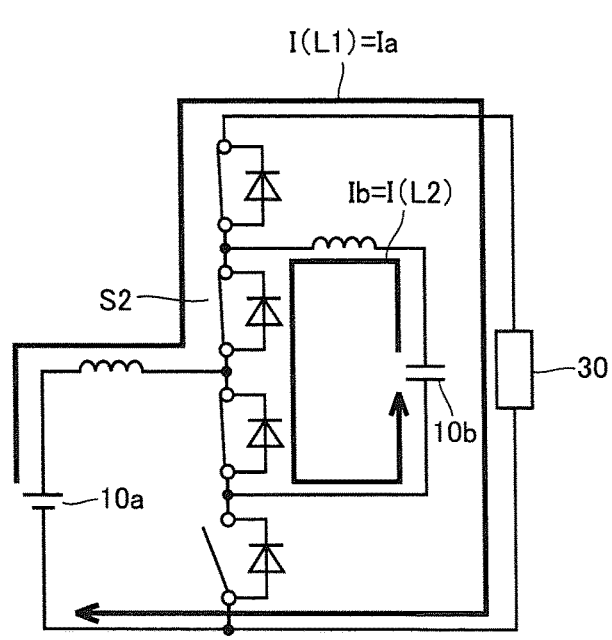

FIG.30
(a)
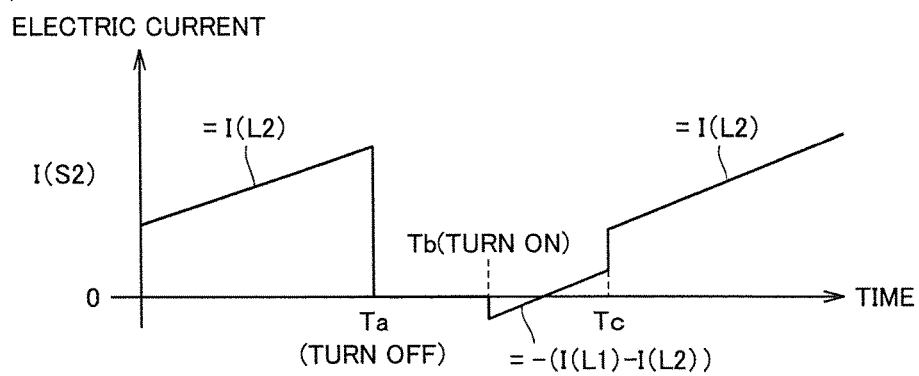
(b)
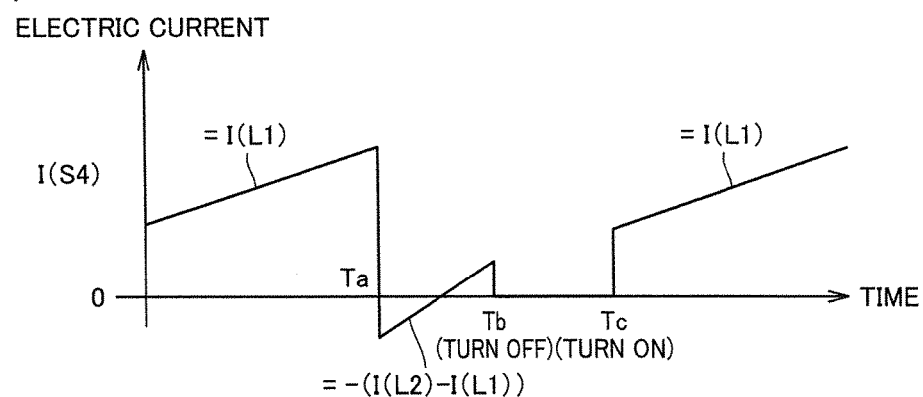

FIG.32
(a)
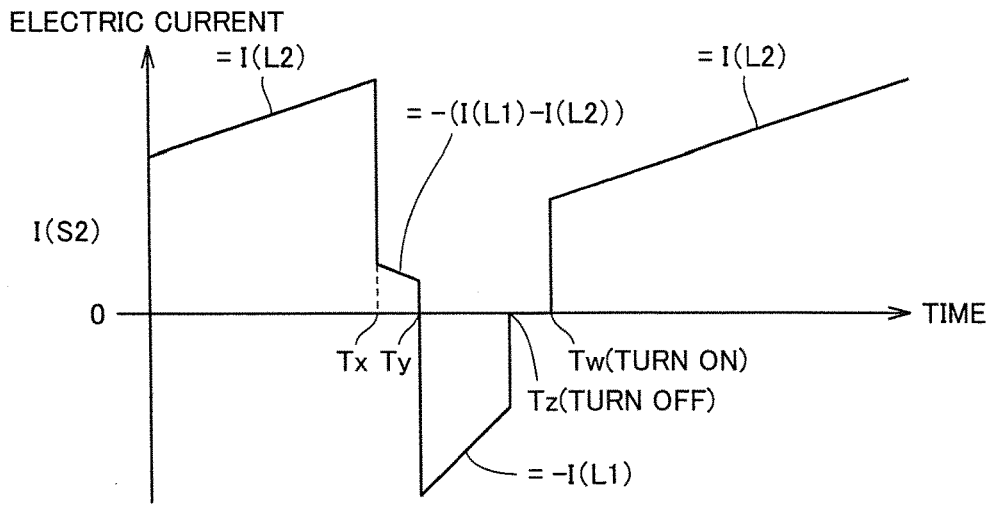
(b)
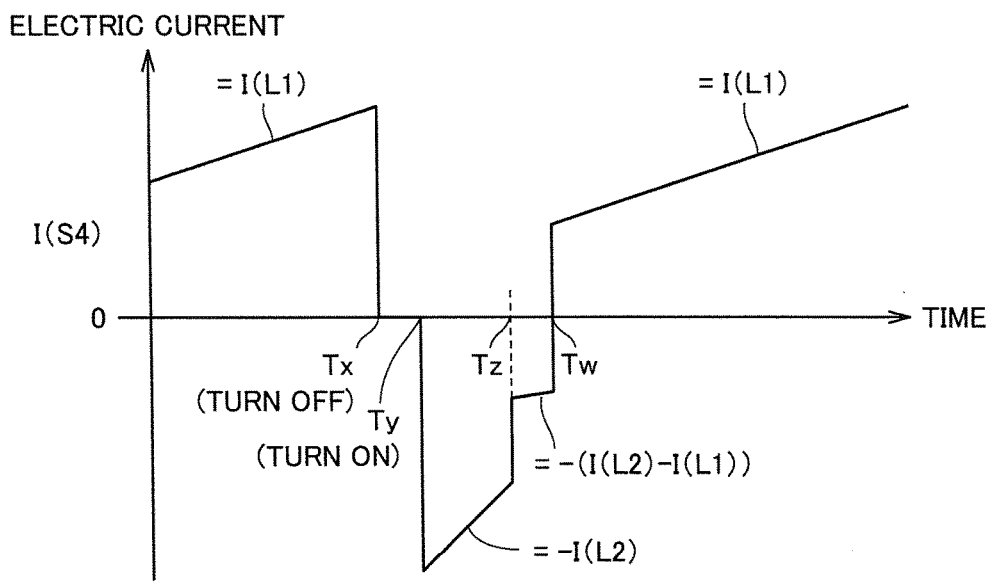

FIG.33

| OPERATION CONDITION | CONDITION OF DC POWER SUPPLY 10a – CONDITION OF DC POWER SUPPLY 10b | WAVEFORMS OF I(L1) AND I(L2) | REDUCTION OF TURN-ON LOSS | REDUCTION OF TURN-OFF LOSS | REDUCTION OF CONDUCTION LOSS | REDUCTION OF CONDUCTION LOSS |
|---|---|---|---|---|---|---|
| A | POWERING – POWERING | | S2 AT Tb | S4 AT Tb | S4 IN Ta~Tb | S2 IN Tb~Tc |
| B | REGENERATIVE – REGENERATIVE | | S4 AT Tb | S2 AT Tb | S2 IN Ta~Tb | S4 IN Tb~Tc |
| C | REGENERATIVE – POWERING | | S3 AT Ta | S1 AT Ta | S1 IN Ta~Tb | S3 IN Tc~Ta |
| D | POWERING – REGENERATIVE | | S1 AT Tc | S3 AT Tc | S1 IN Tb~Tc | S3 IN Tc~Ta |

FIG.36

|  | PB MODE | SB MODE |
|---|---|---|
| SG1 | /SDa or /SDb | /SDc→/SDa or /SDb |
| SG2 | /SDa or SDb | SDc→SDa and SDb |
| SG3 | SDa or SDb | KEPT AT H→SDa or SDb |
| SG4 | SDa or /SDb | SDc→SDa and SDb |

POWER SUPPLY SYSTEM

CROSS-REFERENCE TO RELATED APPLICATIONS

This is a national phase application based on the PCT International Patent Application No. PCT/JP2014/004501 filed Sep. 2, 2014, claiming priority to Japanese Patent Application No. 2013-183155 filed Sep. 4, 2013, the entire contents of both of which are incorporated herein by reference.

TECHNICAL FIELD

The present invention relates to a power supply system, and more particularly to controlling a power supply system configured to include a power converter connected across a plurality of DC power supplies and an electric power line.

BACKGROUND ART

Electric power supply devices in which a plurality of power supplies are combined to supply power to a load are described in, for example, Japanese Patent Laying-Open Nos. 2010-57288 (PTL 1), 2008-54477 (PTL 2) and 2000-295715 (PTL 3). In the electric power supply devices described in these documents, a plurality of operation modes different in the mode of connection between the plurality of power supplies are switched to be applied to controlling of a power converter.

Japanese Patent Laying-Open No. 2012-70514 (PTL 4) describes a configuration of a power converter capable of, by means of controlling of a plurality of switching elements, switching between an operation mode of carrying out DC/DC conversion with two DC power supplies connected in series (series connection mode) and an operation mode of carrying out DC/DC conversion with two DC power supplies used in parallel (parallel connection mode).

CITATION LIST

Patent Literature

[PTL 1] Japanese Patent Laying-Open No. 2010-57288
[PTL 2] Japanese Patent Laying-Open No. 2008-54477
[PTL 3] Japanese Patent Laying-Open No. 2000-295715
[PTL 4] Japanese Patent Laying-Open No. 2012-70514

SUMMARY OF INVENTION

Technical Problem

PTLs 1 to 4, in which the operation mode of the power converter is switched in accordance with the operation condition of a load and the like, fail to explicitly describe what kind of restriction or control should be given at the time of this switching. On the other hand, the mode of power conversion between a plurality of DC power supplies and an electric power line is changed when the operation mode is changed. Therefore, if outputs of the DC power supplies greatly vary in accordance with the operation mode switching, protection of the DC power supplies and variations in outputs to the load may be affected.

Solution to Problem

The present invention was made to solve these problems, and an object of the present invention is, in a power supply system in which a power converter connected across a plurality of DC power supplies and an electric power line is configured to have a plurality of operation modes, to control the operation of the power converter such that switching among the plurality of operation modes are smoothly carried out.

In an aspect of the present invention, a power supply system includes an electric power line connected to a load, a plurality of DC power supplies, a power converter connected across the plurality of DC power supplies and the electric power line, and a control device configured to control operation of the power converter. The power converter includes a plurality of switching elements and is configured to control an output voltage on the electric power line by operating with one of a plurality of operation modes different in mode of power conversion between the plurality of DC power supplies and the electric power line applied. The plurality of operation modes include a first operation mode in which power distribution between the plurality of DC power supplies can be controlled through the power converter, and a second operation mode in which power distribution between the plurality of DC power supplies is determined in a fixed manner through the power converter. The control device includes a mode selection unit and an operation mode switching control unit. The mode selection unit selects an operation mode from among the plurality of operation modes in accordance with conditions of the load and the plurality of DC power supplies. When a present operation mode currently applied to the power converter and an operation mode after transition selected by the mode selection unit are different, the operation mode switching control unit controls switching from the present operation mode to the operation mode after transition. When the present operation mode is the first operation mode and the operation mode after transition is the second operation mode, the operation mode switching control unit controls, in the first operation mode, power distribution between the plurality of DC power supplies to be performed at a power distribution ratio in a case where the operation mode after transition is applied, and then executes switching to the operation mode after transition.

Preferably, when one mode belonging to the second operation mode among the plurality of operation modes is the present operation mode and the operation mode after transition is another mode belonging to the second operation mode among the plurality of operation modes, the operation mode switching control unit switches the present operation mode to the first operation mode and controls power distribution between the plurality of DC power supplies in the first operation mode, and then executes switching to the operation mode after transition.

Alternatively, preferably, when electric power of each of the DC power supplies in accordance with the power distribution ratio in the case where the operation mode after transition is applied reaches a limiting value for each of the DC power supplies, the operation mode switching control unit prohibits switching to the operation mode after transition.

More preferably, when the output voltage at present falls out of a controllable range of the output voltage by the operation mode after transition, the operation mode switching control unit operates the power converter by the present operation mode such that the output voltage falls within the controllable range, and then executes switching to the operation mode after transition.

Preferably, the plurality of DC power supplies are implemented by a first DC power supply and a second DC power supply. The plurality of switching elements include first to fourth switching elements. The first switching element is connected electrically across a first node and the electric power line. The second switching element is connected electrically across a second node and the first node. The third switching element is connected electrically across a third node, connected electrically to a negative electrode terminal of the second DC power supply, and the second node. The fourth switching element is connected electrically across a negative electrode terminal of the first DC power supply and the third node. The power converter further includes a first reactor and a second reactor. The first reactor is connected electrically across the second node and a positive electrode terminal of the first DC power supply. The second reactor is connected electrically across the first node and a positive electrode terminal of the second DC power supply. The first operation mode includes a first mode in which the first and second DC power supplies execute DC voltage conversion in parallel with the electric power line by controlling on/off of the first to fourth switching elements. The second operation mode includes a second mode in which the first and second DC power supplies connected in series execute DC voltage conversion with the electric power line by keeping the third switching element on and controlling on/off of the first, second and fourth switching elements.

More preferably, when one mode belonging to the second operation mode among the plurality of operation modes is the present operation mode and the operation mode after transition is another mode belonging to the second operation mode among the plurality of operation modes, the operation mode switching control unit switches the present operation mode to the first operation mode to control power distribution between the first and second DC power supplies in the first operation mode, and then executes switching to the operation mode after transition.

More preferably, when electric power of each of the DC power supplies in accordance with the power distribution ratio in the case where the operation mode after transition is applied reaches a limiting value for each of the DC power supplies, the operation mode switching control unit prohibits switching to the operation mode after transition.

Still more preferably, when the output voltage at present falls out of a controllable range of the output voltage by the operation mode after transition, the operation mode switching control unit operates the power converter by the present operation mode such that the output voltage falls within the controllable range, and then executes switching to the operation mode after transition.

Alternatively, preferably, the control device includes a duty ratio calculation unit, a pulse width modulation control unit and a carrier phase control unit. The duty ratio calculation unit calculates a first duty ratio for controlling output from the first DC power supply and a second duty ratio for controlling output from the second DC power supply. The pulse width modulation control unit generates on/off control signals for the first to fourth switching elements based on first and second control pulse signals respectively obtained by pulse width modulation in accordance with comparison between a first carrier wave and the first duty ratio as well as comparison between a second carrier wave and the second duty ratio. The carrier phase control unit variably controls a phase difference between the first carrier wave and the second carrier wave when the first and second modes are applied. When the operation mode after transition is the second mode, the operation mode switching control unit operates the power converter by the first mode to obtain phases of currents in which a falling timing of electric current of the first DC power supply and a rising timing of electric current of the second DC power supply coincide with each other or to obtain phases of currents in which the rising timing of electric current of the first DC power supply and the falling timing of electric current of the second DC power supply coincide with each other, and then executes switching to the second mode.

Preferably, the second operation mode further includes a third mode, a fourth mode, a fifth mode, and a sixth mode. In the third mode, the power converter operates such that DC voltage conversion is executed between one of the first and second DC power supplies and the electric power line by controlling on/off of the first to fourth switching elements. In the fourth mode, the power converter operates such that the first to fourth switching elements are kept on/off to maintain the first and second DC power supplies connected in parallel with the electric power line. In the fifth mode, the power converter operates such that the first to fourth switching elements are kept on/off to maintain the first and second DC power supplies connected in series with the electric power line. In the sixth mode, the power converter operates such that the first to fourth switching elements are kept on/off to maintain one of the first and second DC power supplies electrically connected to the electric power line.

Advantageous Effects of Invention

According to the present invention, in a power supply system in which a power converter connected across a plurality of DC power supplies and an electric power line is configured to have a plurality of operation modes, the operation of the power converter can be controlled such that switching among the plurality of operation modes are smoothly carried out.

BRIEF DESCRIPTION OF DRAWINGS

FIG. 3 is a table for describing a plurality of operation modes possessed by the power converter shown in FIG. 1.

FIG. 4 is a conceptual view showing an example of properties of two DC power supplies shown in FIG. 1 when implemented by power supplies of different types.

FIG. 5 includes circuit diagrams describing a first circuit operation in a PB mode.

FIG. 6 includes circuit diagrams describing a second circuit operation in the PB mode.

FIG. 7 includes circuit diagrams describing DC/DC conversion (step-up operation) for the first DC power supply in the PB mode.

FIG. 8 includes circuit diagrams describing DC/DC conversion (step-up operation) for the second DC power supply in the PB mode.

FIG. 11 includes circuit diagrams describing a circuit operation in an SB mode.

FIG. 12 includes circuit diagrams describing DC/DC conversion (step-up operation) in the SB mode.

FIG. 18 is a table for describing mode switching requirements and mode switching processing in operation mode switching from the PB mode.

FIG. 19 is a table for describing mode switching requirements and mode switching processing in operation mode switching from the SB mode.

FIG. 20 is a table for describing mode switching requirements and mode switching processing in operation mode switching from an aB mode.

FIG. 21 is a table for describing mode switching requirements and mode switching processing in operation mode switching from a bB mode.

FIG. 22 is a table for describing mode switching requirements and mode switching processing in operation mode switching from a PD mode.

FIG. 23 is a table for describing mode switching requirements and mode switching processing in operation mode switching from an SD mode.

FIG. 24 is a table for describing mode switching requirements and mode switching processing in operation mode switching from an aD mode.

FIG. 29 includes circuit diagrams describing electric current paths in predetermined periods shown in FIG. 28.

FIG. 30 is a diagram of waveforms of electric currents of switching elements under the phases of currents shown in FIG. 28.

FIG. 32 includes diagrams of waveforms of electric currents of switching elements under the phases of currents shown in FIG. 31.

FIG. 33 is a table for describing carrier phase control in the PB mode in each operation condition of DC power supplies.

FIG. 36 is a table for describing settings of control signals in the SB mode.

DESCRIPTION OF EMBODIMENTS

Figure 1:
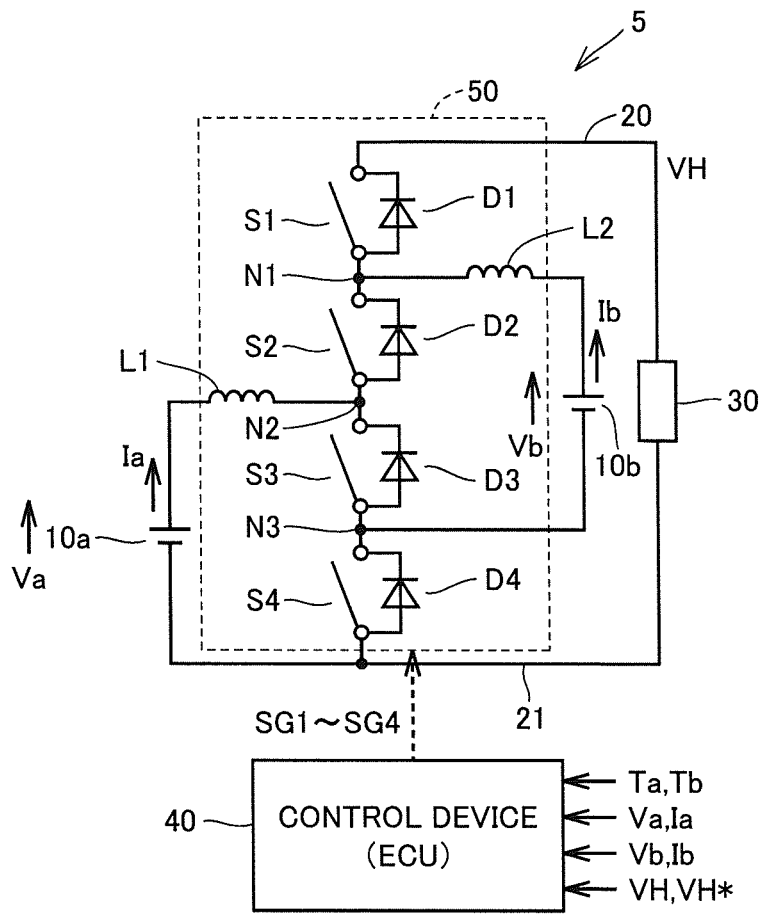
FIG. 1 is a circuit diagram showing a configuration of a power supply system including a power converter according to a first embodiment of the present invention.

Hereinbelow, embodiments of the present invention will be described in detail with reference to the drawings. It is noted that the same or corresponding portions in the drawings have the same reference characters allotted, and description thereof will not be repeated.

First Embodiment (Circuit Configuration of Power Converter)

FIG. 1 is a circuit diagram showing a configuration of a power supply system including a power converter according to a first embodiment of the present invention.

Referring to FIG. 1, a power supply system 5 includes a plurality of DC power supplies 10a and 10b, a load 30, and a power converter 50.

In the present embodiment, DC power supplies 10a and 10b are each implemented by a secondary battery, such as a lithium-ion secondary battery or a nickel-metal hydride battery, or a DC voltage source element having excellent output characteristics, such as an electric double layer capacitor or a lithium-ion capacitor. DC power supplies 10a and 10b correspond to "a first DC power supply" and "a second DC power supply", respectively.

Power converter 50 is connected across DC power supplies 10a, 10b and an electric power line 20. Power converter 50 controls a DC voltage on electric power line 20 (hereinafter also referred to as an output voltage VH) connected to load 30 in accordance with a voltage command value VH*. That is, electric power line 20 is provided in common for DC power supplies 10a and 10b.

Load 30 operates upon receipt of output voltage VH of power converter 50. Voltage command value VH* is set at a voltage suitable for the operation of load 30. Voltage command value VH* may be set to be variable in accordance with the operation condition of load 30. Furthermore, load 30 may be configured to be capable of generating electric power for charging DC power supplies 10a and 10b by regeneration or the like.

Power converter 50 includes switching elements S1 to S4 as well as reactors L1 and L2. In the present embodiment, for the switching elements, IGBTs (Insulated Gate Bipolar Transistors), power MOS (Metal Oxide Semiconductor) transistors, power bipolar transistors, or the like can be used. For switching elements S1 to S4, anti-parallel diodes D1 to D4 are arranged, respectively. On/off of switching elements S1 to S4 can be controlled in response to control signals SG1 to SG4, respectively. That is, switching elements S1 to S4 are respectively turned on when control signals SG1 to SG4 are at a high level (hereinafter referred to as an H level), and are turned off when they are at a low level (hereinafter referred to as an L level).

Switching element S1 is electrically connected across electric power line 20 and a node N1. Reactor L2 is connected across node N1 and a positive electrode terminal of DC power supply 10b. Switching element S2 is electrically connected across nodes N1 and N2. Reactor L1 is connected across node N2 and a positive electrode terminal of DC power supply 10a.

Switching element S3 is electrically connected across nodes N2 and N3. Node N3 is electrically connected to a negative electrode terminal of DC power supply 10b. Switching element S4 is electrically connected across node N3 and a ground line 21. Ground line 21 is electrically connected to load 30 and a negative electrode terminal of DC power supply 10a.

As understood from FIG. 1, power converter 50 is configured to include a step-up chopper circuit in correspondence with each of DC power supplies 10a and 10b. That is, for DC power supply 10a, a bidirectional current first step-up chopper circuit is formed in which switching elements S1 and S2 serve as upper arm elements and switching elements S3 and S4 serve as lower arm elements. Similarly, for DC power supply 10b, a bidirectional current second step-up chopper circuit is formed in which switching elements S1 and S4 serve as upper arm elements and switching elements S2 and S3 serve as lower arm elements.

Switching elements S1 to S4 are included in both of a power conversion path formed across DC power supply 10a and electric power line 20 by the first step-up chopper circuit and a power conversion path formed across DC power supply 10b and electric power line 20 by the second step-up chopper circuit.

Control device 40 generates control signals SG1 to SG4 for controlling on/off of switching elements S1 to S4, respectively, in order to control output voltage VH to load 30. It is noted that although not shown in FIG. 1, detectors (voltage sensors, current sensors) for the voltage (hereinafter referred to as Va) and electric current (hereinafter referred to as Ia) of DC power supply 10a, the voltage (hereinafter referred to as Vb) and electric current (hereinafter referred to as Ib) of DC power supply 10b, as well as output voltage VH are provided. Furthermore, detectors (temperature sensors) for the temperatures (hereinafter referred to as Ta and Tb) of DC power supplies 10a and 10b are also preferably provided. The outputs of these detectors are given to control device 40. Control device 40 can be implemented by an ECU (Electronic Control Unit).

In the configuration of FIG. 1, switching elements S1 to S4 correspond to "a first switching element" to "a fourth switching element", respectively, and reactors L1 and L2 correspond to "a first reactor" and "a second reactor", respectively.

Figure 2:
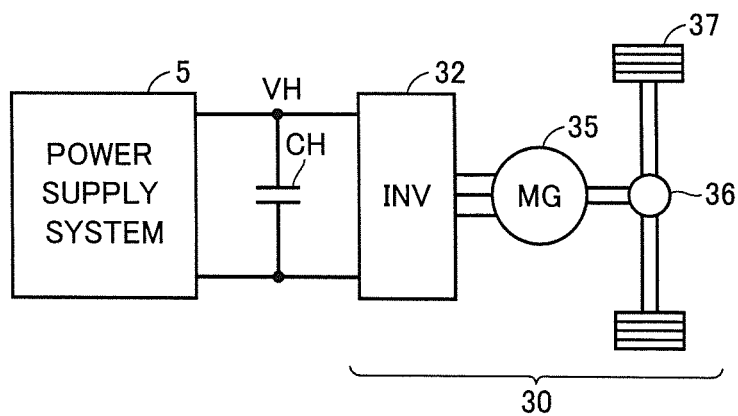
FIG. 2 is a schematic view showing an exemplary configuration of a load shown in FIG. 1.

FIG. 2 is a schematic view showing an exemplary configuration of load 30.

Referring to FIG. 2, load 30 is configured to include a traction motor for an electric powered vehicle, for example. Load 30 includes a smoothing capacitor CH, an inverter 32, a motor-generator 35, a motive power transmission gear 36, and a driving wheel 37.

Motor-generator 35 is a traction motor for generating vehicle driving force, and implemented by, for example, a multiple-phase permanent-magnet type synchronous motor. Output torque of motor-generator 35 is transferred to driving wheel 37 by way of motive power transmission gear 36 formed by a reduction gear and a power split device. The electric powered vehicle runs with the torque transferred to driving wheel 37. Motor-generator 35 generates electric power with rotary force of driving wheel 37 during regenerative braking of the electric powered vehicle. This generated power is subjected to AC/DC conversion by inverter 32. This DC power can be used as electric power for charging DC power supplies 10a and 10b included in power supply system 5.

In a hybrid vehicle equipped with an engine (not shown) in addition to the motor-generator, vehicle driving force necessary for the electric powered vehicle is generated by operating this engine and motor-generator 35 cooperatively. On this occasion, it is also possible to charge DC power supplies 10a and 10b with electric power generated by rotation of the engine.

In this manner, the electric powered vehicle collectively represents vehicles equipped with a traction motor, and includes both of a hybrid vehicle that generates vehicle driving force by an engine and an electric motor, as well as an electric vehicle and a fuel-cell vehicle not equipped with an engine.

(Operation Mode of Power Converter)

Power converter 50 has a plurality of operation modes different in the mode of DC power conversion between DC power supplies 10a, 10b and electric power line 20.

FIG. 3 shows a plurality of operation modes possessed by power converter 50.

Referring to FIG. 3, the operation modes are roughly divided into a "boosting mode (B)" of boosting output voltage(s) of DC power supply 10a and/or DC power supply 10b following periodic on/off control of switching elements S1 to S4 and a "direct connection mode (D)" of electrically connecting DC power supply 10a and/or DC power supply 10b to electric power line 20 with switching elements S1 to S4 kept on/off.

The boosting mode includes a "parallel boosting mode (hereinafter referred to as a PB mode)" of carrying out parallel DC/DC conversion between DC power supplies 10a, 10b and electric power line 20 and a "series boosting mode (hereinafter referred to as an SB mode)" of carrying out DC/DC conversion between DC power supplies 10a and 10b connected in series and electric power line 20. The PB mode corresponds to the "parallel connection mode" in PTL 4, and the SB mode corresponds to the "series connection mode" in PTL 4.

The boosting mode further includes an "independent mode with DC power supply 10a (hereinafter referred to as an aB mode)" of carrying out DC/DC conversion between only DC power supply 10a and electric power line 20 and an "independent mode with DC power supply 10b (hereinafter referred to as a bB mode)" of carrying out DC/DC conversion between only DC power supply 10b and electric power line 20. In the aB mode, DC power supply 10b is unused while being maintained in the state electrically disconnected from electric power line 20 as long as output voltage VH is controlled to be higher than voltage Vb of DC power supply 10b. Similarly, in the bB mode, DC power supply 10a is unused while being maintained in the state electrically disconnected from electric power line 20 as long as output voltage VH is controlled to be higher than voltage Va of DC power supply 10a.

In each of the PB mode, SB mode, aB mode, and bB mode included in the boosting mode, output voltage VH of electric power line 20 is controlled in accordance with voltage command value VH*. Control of switching elements S1 to S4 in each of these modes will be described later.

The direct connection mode includes a "parallel direct connection mode (hereinafter referred to as a PD mode)" of maintaining the state in which DC power supplies 10a and 10b are connected in parallel with electric power line 20 and a "series direct connection mode (hereinafter referred to as an SD mode)" of maintaining the state in which DC power supplies 10a and 10b are connected in series with electric power line 20.

In the PD mode, switching elements S1, S2 and S4 are kept on, while switching element S3 is kept off. Accordingly, output voltage VH becomes equivalent to voltages Va and Vb of DC power supplies 10a and 10b (strictly, a higher one of Va and Vb). Since the voltage difference between Va and Vb will produce a short-circuit current at DC power supplies 10a and 10b, the PD mode can be applied limitedly when the voltage difference is small.

In the SD mode, switching elements S2 and S4 are kept off, while switching elements S1 and S3 are kept on. Accordingly, output voltage VH becomes equivalent to the sum of voltages Va and Vb of DC power supplies 10a and 10b (VH=Va+Vb).

Further, the direct connection mode includes a "direct connection mode of DC power supply 10a (hereinafter referred to as an aD mode)" of electrically connecting only DC power supply 10a to electric power line 20 and a "direct connection mode of DC power supply 10b (hereinafter referred to as a bD mode)" of electrically connecting only DC power supply 10b to electric power line 20.

In the aD mode, switching elements S1 and S2 are kept on, while switching elements S3 and S4 are kept off. Accordingly, DC power supply 10b is brought into the state disconnected from electric power line 20, and output voltage VH becomes equivalent to voltage Va of DC power supply 10a (VH=Va). In the aD mode, DC power supply 10b is unused while being maintained in the state electrically disconnected from electric power line 20. It is noted that if the aD mode is applied when Vb>Va holds, a short-circuit current will flow from DC power supply 10b to 10a by way of switching element S2. Thus, Va>Vb is a necessary condition for applying the aD mode.

Similarly, in the bD mode, switching elements S1 and S4 are kept on, while switching elements S2 and S3 are kept off. Accordingly, DC power supply 10a is brought into the state disconnected from electric power line 20, and output voltage VH becomes equivalent to voltage Vb of DC power supply 10b (VH=Vb). In the bD mode, DC power supply 10a is unused while being maintained in the state electrically disconnected from electric power line 20. It is noted that when the bD mode is applied when Va>Vb holds, a short-circuit current will flow from DC power supply 10a to 10b by way of diode D2. Thus, Vb>Va is a necessary condition for applying the bD mode.

In each of the PD mode, SD mode, aD mode, and bD mode included in the direct connection mode, output voltage VH of electric power line 20 is determined depending on voltages Va and Vb of DC power supplies 10a and 10b, and therefore, cannot be directly controlled. Thus, in each mode included in the direct connection mode, output voltage VH can no longer be set at a voltage suitable for the operation of load 30, so that power loss of load 30 may be increased.

On the other hand, in the direct connection mode, power loss of power converter 50 is significantly suppressed because switching elements S1 to S4 are not turned on/off. Therefore, depending on the operation condition of load 30, there is a possibility that power loss of power supply system 5 as a whole can be suppressed because the amount of decrease in power loss of power converter 50 becomes larger than the amount of increase in power loss of load 30 by applying the direct connection mode.

In FIG. 3, the PB mode corresponds to a "first mode", and the SB mode corresponds to a "second mode." The aB mode and bB mode correspond to a "third mode." The PD mode corresponds to a "fourth mode." The SD mode corresponds to a "fifth mode." The aD mode and bD mode correspond to a "sixth mode."

FIG. 4 is a conceptual view showing an example of properties of DC power supplies 10a and 10b when implemented by power supplies of different types. FIG. 4 shows a so-called Ragone plot in which energy is plotted on the horizontal axis and electric power is plotted on the vertical axis. In general, output power and stored energy of a DC power supply have a trade-off relationship. Therefore, a high output is difficult to obtain with a high-capacity type battery, while stored energy is difficult to increase with a high-output type battery.

Therefore, preferably, one of DC power supplies 10a and 10b is implemented by a so-called high-capacity type power supply having high stored energy, and the other one of them is implemented by a so-called high-output type power supply providing high output power. Then, energy stored in the high-capacity type power supply is used as a constant supply for a long time, and the high-output type power supply can be used as a buffer to output electric power covering shortage caused by the high-capacity type power supply.

In the example of FIG. 4, DC power supply 10a is implemented by a high-capacity type power supply, while DC power supply 10b is implemented by a high-output type power supply. Therefore, an active region 110 of DC power supply 10a has a narrower range of electric power that can be output than an active region 120 of DC power supply 10b. On the other hand, active region 120 has a narrower range of energy that can be stored than active region 110.

At an operating point 101 of load 30, high power is requested for a short time. For example, in an electric powered vehicle, operating point 101 corresponds to abrupt acceleration caused by a user's accelerator operation. In contrast to this, at an operating point 102 of load 30, relatively low power is requested for a long time. For example, in an electric powered vehicle, operating point 102 corresponds to continuous high-speed steady running.

For operating point 101, the output from high-output type DC power supply 10b can mainly be applied. On the other hand, for operating point 102, the output from high-capacity type DC power supply 10a can mainly be applied. Accordingly, in an electric powered vehicle, the running distance with electrical energy can be extended through use of energy stored in the high-capacity type battery for a long time, and acceleration performance in correspondence with a user's accelerator operation can be ensured promptly.

In this manner, by combining DC power supplies of different types and capacitances, stored energy can be used effectively in the whole system taking advantage of characteristics of the respective DC power supplies. It should be noted that the combination of DC power supplies 10a and 10b is not limited to this example, but can be implemented by DC power supplies (power storage devices) of the same type and/or the same capacitance.

When the DC power supplies are implemented by batteries, there are possibilities that output characteristics decrease at a low temperature and charging/discharging is restricted at a high temperature in order to suppress progress of deterioration. Particularly in an electric powered vehicle, a case arises in which a temperature difference occurs between DC power supplies 10a and 10b because of the difference in mounting position. Therefore, in power supply system 5, there is a case in which it is more effective to use only either one of the DC power supplies in accordance with the operation condition (particularly, the temperature) of DC power supplies 10a and 10b or in accordance with requests of load 30 as described above. These cases can be handled by providing modes of using only one of DC power supplies 10a and 10b (aB mode, bB mode, aD mode, and bD mode) as described above.

That is, in power converter 50 according to the present embodiment, any operation mode is selected from among the plurality of operation modes shown in FIG. 3 in accordance with the operation conditions of DC power supplies 10a, 10b and load 30.

(Circuit Operation in Each Operation Mode)

Next, a circuit operation of power converter 50 in each operation mode will be described. First, a circuit operation in the PB mode of carrying out parallel DC/DC conversion between DC power supplies 10a and 10b and electric power line 20 will be described with reference to FIGS. 5 to 8.

(Circuit Operation in PB Mode)

As shown in FIGS. 5 and 6, by turning on switching element S4 or S2, it is possible to connect DC power supplies 10a and 10b in parallel with electric power line 20. Here, in the parallel connection mode, the equivalent circuit will differ depending on which is higher between voltage Va of DC power supply 10a and voltage Vb of DC power supply 10b.

As shown at (a) of FIG. 5, when Vb>Va holds, by turning on switching element S4, DC power supplies 10a and 10b are connected in parallel through switching elements S2 and S3. The equivalent circuit at this time is as shown at (b) of FIG. 5.

Referring to (b) of FIG. 5, between DC power supply 10a and electric power line 20, by on/off control of switching element S3, the on- and off-periods of the lower arm element can be formed alternately. Similarly, between DC power supply 10b and electric power line 20, by common on/off control of switching elements S2 and S3, the on- and off-periods of the lower arm element of the step-up chopper circuit can be formed alternately. Switching element S1 operates as a switch for controlling regeneration from load 30.

On the other hand, as shown at (a) of FIG. 6, when Va>Vb holds, by turning on switching element S2, DC power supplies 10a and 10b are connected in parallel through switching elements S3 and S4. The equivalent circuit at this time is as shown at (b) of FIG. 6.

Referring to (b) of FIG. 6, between DC power supply 10b and electric power line 20, by on/off control of switching element S3, the on- and off-periods of the lower arm element can be formed alternately. Similarly, between DC power supply 10a and electric power line 20, by common on/off control of switching elements S3 and S4, the on- and off-periods of the lower arm element of the step-up chopper circuit can be formed alternately. Switching element S1 operates as a switch for controlling regeneration from load 30.

First, referring to FIGS. 7 and 8, the step-up operation in the PB mode of power converter 50 will be described in detail.

FIG. 7 shows DC/DC conversion (step-up operation) for DC power supply 10a in the PB mode.

Referring to (a) of FIG. 7, by turning on the pair of switching elements S3 and S4 and by turning off the pair of switching elements S1 and S2, an electric current path 150 for storing energy in reactor L1 is formed. Thus, a state in which the lower arm element of the step-up chopper circuit is on is obtained.

In contrast, referring to (b) of FIG. 7, by turning off the pair of switching elements S3 and S4 and by turning on the pair of switching elements S1 and S2, an electric current path 151 for outputting the energy stored in reactor L1 with the energy of DC power supply 10a is formed. Thus, a state in which the upper arm element of the step-up chopper circuit is on is obtained.

By alternately repeating the first period in which the pair of switching elements S3 and S4 is on and at least one of switching elements S1 and S2 is off and the second period in which the pair of switching elements S1 and S2 is on and at least one of switching elements S3 and S4 is off, electric current path 150 at (a) of FIG. 7 and electric current path 151 at (b) of FIG. 7 are formed alternately.

As a result, a step-up chopper circuit having the pair of switching elements S1 and S2 as an equivalent of upper arm element and the pair of switching elements S3 and S4 as an equivalent of lower arm element is formed for DC power supply 10a. In the DC/DC converting operation shown in FIG. 7, there is no electric current circulation path to DC power supply 10b and, therefore, DC power supplies 10a and 10b do not interfere with each other. Specifically, electric power input/output to/from DC power supplies 10a and 10b can be controlled independently.

In such DC/DC conversion, the relation represented by Equation (1) below holds between voltage Va of DC power supply 10a and output voltage VH of electric power line 20. In Equation (1), Da represents the duty ratio of the period in which the pair of switching elements S3 and S4 is on. In each equation hereinafter, the symbol "x" is regarded as a multiplication sign.

$$VH = 1/(1-Da) \times Va \quad (1)$$

FIG. 8 shows DC/DC conversion (step-up operation) for DC power supply 10b in the PB mode.

Referring to (a) of FIG. 8, by turning on the pair of switching elements S2 and S3 and by turning off the pair of switching elements S1 and S4, an electric current path 160 for storing energy in reactor L2 is formed. Thus, a state in which the lower arm element of the step-up chopper circuit is on is obtained.

In contrast, referring to (b) of FIG. 8, by turning off the pair of switching elements S2 and S3 and by turning on the pair of switching elements S1 and S4, an electric current path 161 for outputting the energy stored in reactor L2 with the energy of DC power supply 10b is formed. Thus, a state in which the upper arm element of the step-up chopper circuit is on is obtained.

By alternately repeating the first period in which the pair of switching elements S2 and S3 is on and at least one of switching elements S1 and S4 is off and the second period in which the pair of switching elements S1 and S4 is on and at least one of switching elements S2 and S3 is off, electric current path 160 at (a) of FIG. 8 and electric current path 161 at (b) of FIG. 8 are formed alternately.

As a result, a step-up chopper circuit having the pair of switching elements S1 and S4 as an equivalent of upper arm element and the pair of switching elements S2 and S3 as an equivalent of lower arm element is formed for DC power supply 10b. In the DC/DC converting operation shown in FIG. 8, there is no electric current circulation path including DC power supply 10a and, therefore, DC power supplies 10a and 10b do not interfere with each other. Specifically, electric power input/output to/from DC power supplies 10a and 10b can be controlled independently.

In such DC/DC conversion, the relation represented by Equation (2) below holds between voltage Vb of DC power supply 10b and output voltage VH of electric power line 20.

In Equation (2), Db represents the duty ratio of the period in which the pair of switching elements S2 and S3 is on.

$$VH = 1/(1-Db) \times Vb \qquad (2)$$

Figures 9, 10:
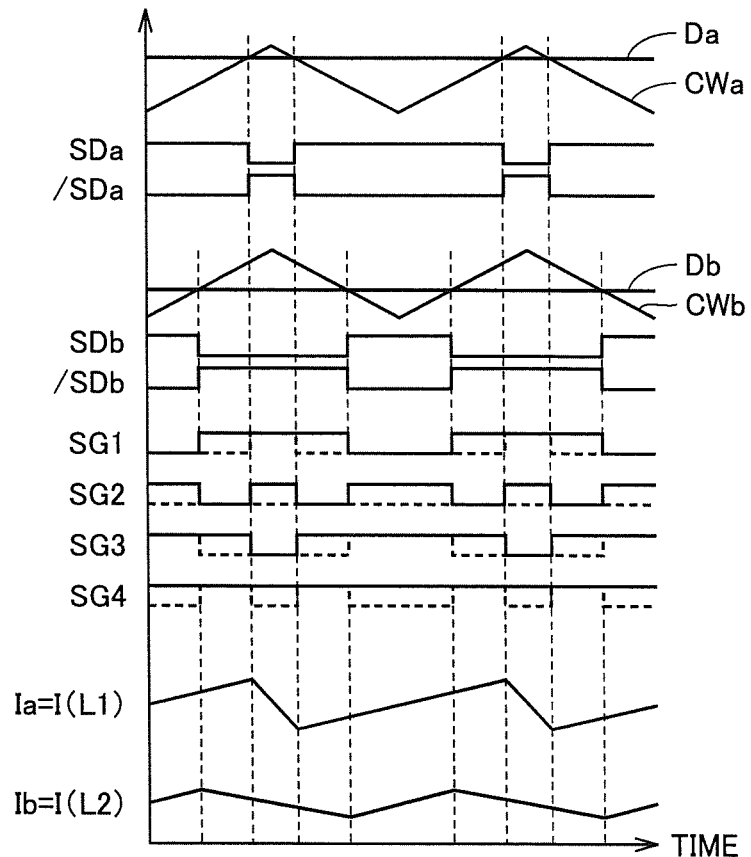
FIG. 9 is a diagram of waveforms showing an exemplary operation for controlling switching elements of the power converter in the PB mode.
FIG. 10 is a table for describing logical operational expressions for setting a control signal for each switching element in the PB mode.

FIG. 9 shows a diagram of waveforms for describing an exemplary operation for controlling switching elements in the PB mode. FIG. 9 shows an example when a carrier wave CWa used in PWM control for DC power supply 10a and a carrier wave CWb used in PWM control for DC power supply 10b have the same frequency and are in phase.

Referring to FIG. 9, in the PB mode, for example, the output of one of DC power supplies 10a and 10b can be subjected to feedback control (voltage control) so as to compensate for a voltage deviation VHD of output voltage VH (VHD=VH*−VH) and the output of the other one of DC power supplies 10a and 10b can be subjected to feedback control (electric current control) so as to compensate for an electric current deviation from an electric current command value for electric current Ia or Ib, as described in PTL 4. On this occasion, a command value for electric current control (Ia* or Ib*) can be set so as to control electric power of the corresponding DC power supply.

As an example, when the output of DC power supply 10b is subjected to voltage control while the output of DC power supply 10a is subjected to electric current control, duty ratio Da is calculated based on an electric current deviation IaD (IaD=Ia*−Ia), while duty ratio Db is calculated based on voltage deviation VHD (VHD=VH*−VH).

A control pulse signal SDa is generated based on voltage comparison between duty ratio Da for controlling the output of DC power supply 10a and carrier wave CWa. Similarly, a control pulse signal SDb is generated based on comparison between duty ratio Db for controlling the output of DC power supply 10b and carrier wave CWb. Control pulse signals /SDa, /SDb are inversion signals of control pulse signals SDa and SDb.

As shown in FIG. 10, control signals SG1 to SG4 are set based on the logical calculation of control pulse signals SDa (/SDa) and SDb (/SDb).

Switching element S1 forms the upper arm element in each of the boost chopper circuits shown in FIGS. 7 and 8. Accordingly, control signal SG1 for controlling on/off of switching element S1 is generated in accordance with the logical sum of control pulse signals /SDa and /SDb. As a result, on/off of switching element S1 is controlled so as to achieve both of the function of the upper arm element of the boost chopper circuit (DC power supply 10a) shown in FIG. 7 and that of the upper arm element of the boost chopper circuit (DC power supply 10b) shown in FIG. 8.

Switching element S2 forms the upper arm element in the boost chopper circuit shown in FIG. 7, and the lower arm element in the boost chopper circuit shown in FIG. 8. Therefore, control signal SG2 for controlling on/off of switching element S2 is generated in accordance with the logical sum of control pulse signals /SDa and SDb. Accordingly, on/off of switching element S2 is controlled so as to achieve both of the function of the upper arm element of the boost chopper circuit (DC power supply 10a) shown in FIG. 7 and that of the lower arm element of the boost chopper circuit (DC power supply 10b) shown in FIG. 8.

Similarly, control signal SG3 for switching element S3 is generated in accordance with the logical sum of control pulse signals SDa and SDb. Accordingly, on/off of switching element S3 is controlled so as to achieve both of the function of the lower arm element of the boost chopper circuit (DC power supply 10a) shown in FIG. 7 and that of the lower arm element of the boost chopper circuit (DC power supply 10b) shown in FIG. 8.

In addition, control signal SG4 for switching element S4 is generated in accordance with the logical sum of control pulse signals SDa and /SDb. Accordingly, on/off of switching element S4 is controlled so as to achieve both of the function of the lower arm element of the boost chopper circuit (DC power supply 10a) shown in FIG. 7 and that of the upper arm element of the boost chopper circuit (DC power supply 10b) shown in FIG. 8.

In the PB mode, because control signals SG2 and SG4 are set at complementary levels, switching elements S2 and S4 are complementarily turned on/off. Accordingly, the operation when Vb>Va holds shown in FIG. 5 and the operation when Va>Vb holds shown in FIG. 6 are naturally switched. In addition, it is possible to perform DC power conversion in accordance with duty ratios Da and Db for DC power supplies 10a and 10b by complementarily turning switching elements S1 and S3 on/off.

Referring again to FIG. 9, control signals SG1 to SG4 are generated based on control pulse signals SDa (/SDa) and SDb (/SDb) in accordance with the logical operational expressions shown in FIG. 10. By turning switching elements S1 to S4 on/off in accordance with control signals SG1 to SG4, an electric current I(L1) flowing through reactor L1 and an electric current I(L2) flowing through reactor L2 are controlled. Electric current I(L1) corresponds to electric current Ia of DC power supply 10a, and electric current I(L2) corresponds to electric current Ib of DC power supply 10b.

In this manner, in the PB mode, upon execution of DC/DC conversion of inputting/outputting DC power in parallel between DC power supplies 10a, 10b and electric power line 20, output voltage VH can be controlled to assume voltage command value VH*. Furthermore, in accordance with the electric current command value for a DC power supply to be subjected to electric current control, electric power input/output to/from that DC power supply can be controlled.

In the PB mode, electric power covering shortage caused by input/output power to/from a DC power supply subjected to electric current control for electric power input/output to/from load 30 (hereinafter also referred to as load power PL) will be input/output to/from a DC power supply subjected to voltage control. Accordingly, by setting the electric current command value in electric current control, the power distribution ratio between the DC power supplies can be controlled indirectly. In addition, by setting the electric current command value, an operation of allowing output power from one DC power supply to be charged into the other DC power supply is also possible. Hereinbelow, electric power values of electric power Pa, electric power Pb, total electric power PH (PH=Pa+Pb) that DC power supplies 10a and 10b as a whole input/output to/from electric power line 20, as well as load power PL will be expressed by positive values during discharging of respective DC power supplies 10a and 10b as well as during a power running operation of load 30, and will be expressed by negative values during charging of respective DC power supplies 10a and 10b as well as during a regenerative operation of load 30.

(Circuit Operation in Direct Connection Mode)

It is appreciated that, in the direct connection mode, any one of the PD mode, SD mode, aD mode, and bD mode is achieved by keeping switching elements S1 to S4 on/off in accordance with FIG. 3.

In the PD mode, by keeping switching elements S1, S2 and S4 on while keeping switching element S3 off, VH=max (Va, Vb) holds. In the SD mode, switching elements S2 and S4 are kept off, while switching elements S1 and S3 are kept on. Thus, VH=Va+Vb holds.

In the aD mode, switching elements S1 and S2 are kept on, while switching elements S3 and S4 are kept off. Thus, VH=Va holds (provided that Va>Vb). On the other hand, in the bD mode, switching elements S1 and S4 are kept on, while switching elements S2 and S3 are kept off. Thus, VH=Vb holds (provided that Vb>Va).

(Circuit Operation in SB Mode)

Next, circuit operations in the SB mode will be described with reference to FIGS. 11 and 12.

As shown at (a) of FIG. 11, by keeping switching element S3 on, DC power supplies 10a and 10b can be connected in series with electric power line 20. The equivalent circuit at this time is as shown at (b) of FIG. 11.

Referring to (b) of FIG. 11, in the SB mode, between DC power supplies 10a and 10b connected in series and electric power line 20, the on- and off-periods of the lower arm element of the step-up chopper circuit can be formed alternately by commonly controlling on/off of switching elements S2 and S4. Switching element S1, which is turned on in the off-period of switching elements S2 and S4, operates as a switch for controlling regeneration from load 30. Further, by switching element S3 kept on, a line 15 connecting reactor L1 to switching element S4 is equivalently formed.

Next, referring to FIG. 12, the DC/DC conversion (step-up operation) in the SB mode will be described.

Referring to (a) of FIG. 12, while switching element S3 is kept on for connecting DC power supplies 10a and 10b in series, the pair of switching elements S2 and S4 is turned on and switching element S1 is turned off. Accordingly, electric current paths 170 and 171 for storing energy in reactors L1 and L2 are formed. As a result, for series-connected DC power supplies 10a and 10b, a state in which the lower arm element of the step-up chopper circuit is on is obtained.

Referring to (b) of FIG. 12, while switching element S3 is kept on, the pair of switching elements S2 and S4 is turned off and switching element S1 is turned on, in contrast to (a) of FIG. 12. Accordingly, an electric current path 172 is formed. Through electric current path 172, the sum of energy from DC power supplies 10a and 10b connected in series and energy stored in reactors L1 and L2 is output to electric power line 20. As a result, for series-connected DC power supplies 10a and 10b, a state in which the upper arm element of the step-up chopper circuit is on is obtained.

With switching element S3 kept on, by alternately repeating the first period in which the pair of switching elements S2 and S4 is on and switching element S1 is off and the second period in which switching element S1 is on and switching elements S2 and S4 are off, electric current paths 170 and 171 at (a) of FIG. 12 and electric current path 172 at (b) of FIG. 12 are formed alternately.

In the DC/DC conversion in the SB mode, the relation represented by Equation (3) below holds among voltage Va of DC power supply 10a, voltage Vb of DC power supply 10b and output voltage VH of electric power line 20. In Equation (3), Dc represents the duty ratio of the first period in which the pair of switching elements S2 and S4 is on.

$$VH = 1/(1-Dc) \times (Va+Vb) \quad (3)$$

It is noted, however, that if Va and Vb are different or if reactors L1 and L2 have different inductances, reactors L1 and L2 come to have different electric current values at the end of operation shown at (a) of FIG. 12. Therefore, immediately after the transition to the operation shown at (b) of FIG. 12, if the electric current of reactor L1 is larger, a difference current flows through an electric current path 173. If the electric current of reactor L2 is larger, a difference current flows through an electric current path 174.

Figures 13, 14:
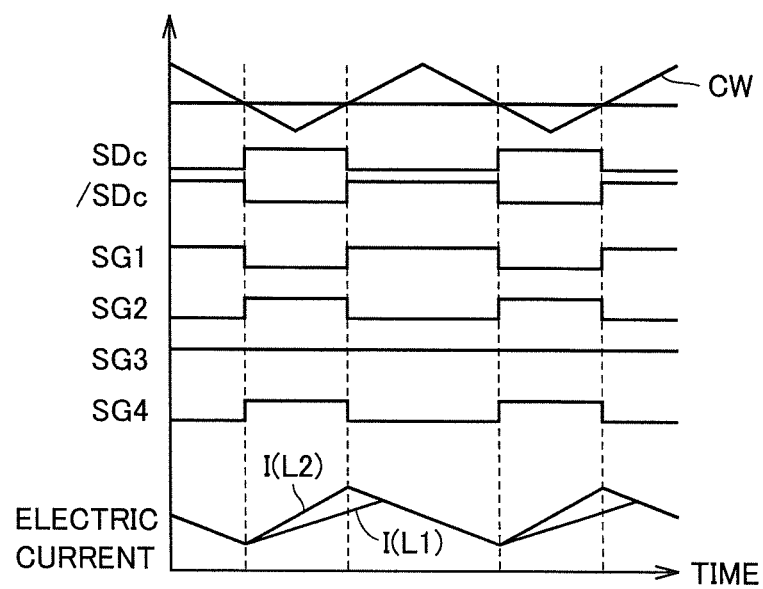
FIG. 13 is a diagram of waveforms showing an exemplary operation for controlling switching elements of the power converter in the SB mode.
FIG. 14 is a table for describing logical operational expressions for setting a control signal for each switching element in the SB mode.

FIG. 13 shows waveforms for describing an exemplary operation for controlling the switching elements in the SB mode.

In the SB mode, as described in PTL 4, duty ratio Dc in Equation (3) is calculated so as to compensate for voltage deviation VHD of output voltage VH (VHD=VH*−VH). Then, a control pulse signal SDc is generated based on voltage comparison between a carrier wave CW and duty ratio Dc. A control pulse signal /SDc is an inversion signal of control pulse signal SDc. In the SB mode, DC/DC conversion between the DC voltage (Va+Vb) and output voltage VH is executed by the step-up chopper circuit shown in FIG. 12.

As shown in FIG. 14, control signals SG1 to SG4 can be set based on a logical operation of control pulse signal SDc (/SDc).

Control pulse signal SDc is set as control signals SG2 and SG4 for the pair of switching elements S2 and S4 constituting the lower arm element of the step-up chopper circuit. Similarly, control signal SG1 for switching element S1 constituting the upper arm element of the step-up chopper circuit is obtained by control pulse signal /SDc. As a result, the period in which the pair of switching elements S2 and S4 constituting the lower arm element is on and the period in which switching element S1 constituting the upper arm element is on are provided complementarily.

In the SB mode, bidirectional DC/DC conversion is executed between DC power supplies 10a and 10b in the series-connected state and electric power line 20 (load 30). Therefore, electric power Pa of DC power supply 10a and electric power Pb of DC power supply 10b cannot be directly controlled. That is, the ratio between electric power Pa and electric power Pb of DC power supplies 10a and 10b is automatically determined depending on the ratio of voltages Va and Vb in accordance with Equation (4) below. It is noted that electric power is supplied to load 30 in accordance with the sum of input/output power (Pa+Pb) to/from DC power supplies 10a and 10b, similarly to the PB mode.

$$Pa:Pb = Va:Vb \quad (4)$$

In this manner, power distribution between DC power supplies 10a and 10b for total electric power PH (PH=Pa+Pb) of electric power of DC power supplies 10a and 10b as a whole input/output to/from electric power line 20 differs among the operation modes.

(Power Distribution Ratio and Output Voltage Range in Each Operation Mode)

Referring to FIG. 3 again, a power distribution ratio k between DC power supplies 10a and 10b and the range of output voltage VH in each operation mode will be described by comparison.

In the PB mode, by setting the electric current command value in a DC power supply to be subjected to electric current control, power distribution ratio k between DC power supplies 10a and 10b can be controlled. It is noted that power distribution ratio k is defined by the ratio of output power Pa of DC power supply 10a with respect to total electric power PH (k=Pa/PH).

In the PB mode, output voltage VH can be controlled within a range from max(Va, Vb) representing the maximum value of voltages Va and Vb to an upper limit voltage VHmax representing the control upper limit value of output voltage VH. It is noted that max(Va, Vb)=Va holds when Va>Vb holds, and max(Va, Vb)=Vb holds when Vb>Va holds. Upper limit voltage VHmax is an upper limit value determined in consideration of the withstand voltages of parts and the like.

In the SB mode, as understood from Equation (4), power distribution ratio k is determined in a fixed manner in accordance with voltages Va and Vb (k=Va/(Va+Vb)). Therefore, electric power Pa and electric power Pb of DC power supplies 10a and 10b as well as power distribution ratio k cannot be controlled independently through DC/DC conversion.

In the SB mode, output voltage VH cannot be set at a value lower than (Va+Vb). In the SB mode, output voltage VH can be controlled within the range from (Va+Vb) to upper limit voltage VHmax.

Since only DC power supply 10a is used in the aB mode, power distribution ratio k is kept at 1.0. Then, by controlling the step-up chopper circuit shown in FIG. 7 based on duty ratio Da in Equation (1), output voltage VH can be controlled within the range from max(Va, Vb) to upper limit voltage VHmax.

Since only DC power supply 10b is used in the bB mode, power distribution ratio k is kept at 0. Then, by controlling the step-up chopper circuit shown in FIG. 8 based on duty ratio Db in Equation (2), output voltage VH can be controlled within the range from max(Va, Vb) to VHmax.

In the PD mode, DC power supplies 10a and 10b are connected in parallel with electric power line 20. Therefore, power distribution ratio k is determined uniquely depending on internal resistances of DC power supplies 10a and 10b. Thus, output power Pa and output power Pb of respective DC power supplies 10a and 10b cannot be controlled independently. Specifically, k=Rb/(Ra+Rb) holds where Ra indicates the internal resistance of DC power supply 10a and Rb indicates the internal resistance of DC power supply 10b. Since VH=Va is kept (VH=Vb), output voltage VH cannot be controlled in accordance with voltage command value VH*. It is noted that the PD mode can be applied limitedly when the voltage difference between voltages Va and Vb is small, as described above.

In the SD mode, DC power supplies 10a and 10b are electrically connected in series with electric power line 20. Therefore, output voltage VH is kept at Va+Vb. That is, output voltage VH cannot be controlled in accordance with voltage command value VH*. Power distribution ratio k is determined in a fixed manner in accordance with voltages Va and Vb similarly to the SB mode. Therefore, power distribution ratio k cannot be controlled independently through DC/DC conversion.

When the aD mode is applied, satisfaction of Va>Vb is a condition as described above. Therefore, DC power supply 10b is disconnected from electric power line 20, while DC power supply 10a is connected to electric power line 20. Thus, output voltage VH is kept at Va. Since supply of electric power is executed only from DC power supply 10a, power distribution ratio k is kept at 1.0.

Similarly, when the bD mode is applied, satisfaction of Vb>Va is a condition as described above. Therefore, DC power supply 10a is disconnected from electric power line 20, while DC power supply 10b is connected to electric power line 20. Thus, output voltage VH is kept at Vb. Since supply of electric power is executed only from DC power supply 10b, power distribution ratio k is kept at 0.

In this manner, the operation modes applied to power converter 50 are divided into a power distribution controlling mode in which power distribution (power distribution ratio k) between DC power supplies 10a and 10b is controllable through DC/DC conversion for VH control and a power distribution keeping mode in which power distribution between DC power supplies 10a and 10b is determined in a fixed manner. The PB mode is included in the power distribution controlling mode. On the other hand, the remaining SB mode, SD mode, aB mode, bB mode, aD mode, bD mode, and PD mode are included in the power distribution keeping mode. The power distribution controlling mode (PB mode) corresponds to a "first operation mode" and the power distribution keeping mode corresponds to a "second operation mode."

As shown in FIG. 3, in power converter 50, the range of output voltage VH that can be output from power converter 50 differs among the respective operation modes. Therefore, selection of operation mode is also restricted in accordance with requested output voltage VH.

In the aB mode, bB mode and PB mode belonging to the boosting mode, output voltage VH can be controlled in accordance with voltage command value VH* within the range from max(Va, Vb) to VHmax. On the other hand, in the SB mode, output voltage VH cannot be controlled to fall below (Va+Vb). That is, in the SB mode, output voltage VH can be controlled in accordance with voltage command value VH* within the range from (Va+Vb) to VHmax.

In the direct connection mode, output voltage VH is kept in accordance with voltages Va and Vb of DC power supplies 10a and 10b. That is, when the direct connection mode is applied, output voltage VH cannot be controlled to assume any voltage.

Figure 15:
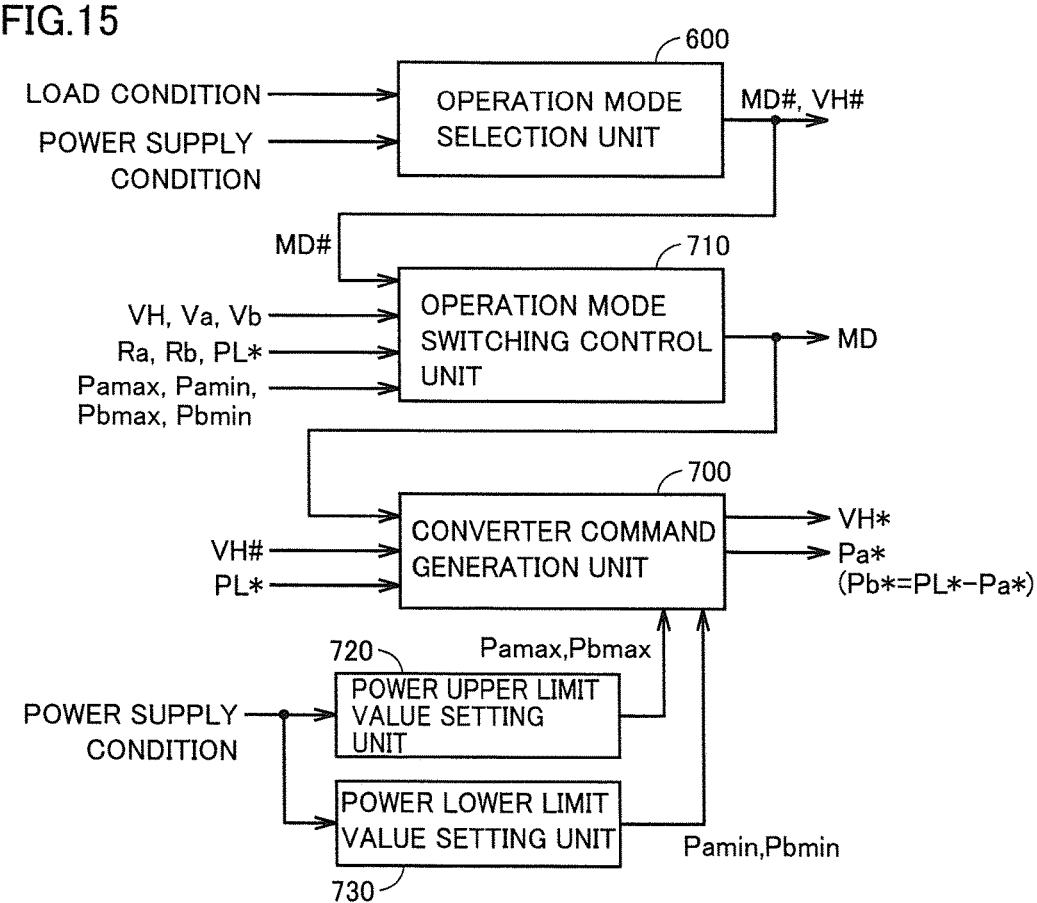
FIG. 15 is a functional block diagram for describing a control structure related to mode selection made by power converter control according to the first embodiment of the present invention.

FIG. 15 is a functional block diagram for describing a control structure related to mode selection made by power converter control according to the present embodiment. It is noted that the respective functional blocks illustrated in the respective functional block diagrams including FIG. 15 shall be achieved by hardware and/or software processing by control device 40.

Referring to FIG. 15, an operation mode selection unit 600 selects an operation mode based on the operation condition of load 30 (load condition) and the operation condition of DC power supplies 10a and 10b (power supply condition). Operation mode selection unit 600 generates a mode selection signal MD# indicating the result of selection of operation mode.

When load 30 includes motor-generator 35 as in the exemplary configuration of FIG. 2, operation mode selection unit 600 can select an operation mode based on the speed and torque of motor-generator 35. Alternatively, an operation mode can be selected using the operation condition (vehicular speed, accelerator pedal position, etc.) of an electric powered vehicle on which motor-generator 35 is mounted as the operation condition of load 30.

For example, selection of an operation mode made by operation mode selection unit 600 is executed such that the overall loss of power supply system 5 is minimized while ensuring an operation of load 30 in accordance with an operation command as will be described below.

To ensure an operation of load 30 in accordance with an operation command, output voltage VH to be supplied to load 30 needs to be set at more than or equal to a certain voltage corresponding to the operation condition of load 30. When load 30 is configured to include motor-generator 35, it is necessary that output voltage VH corresponding to a DC link-side voltage of inverter 32 be more than or equal to an induced voltage produced in a coil winding (not shown) of motor-generator 35.

The range of torque that can be output from motor-generator 35 changes in accordance with output voltage VH. Specifically, as output voltage VH is increased, the torque that can be output is also increased. It is therefore necessary that, for example, output voltage VH fall within a voltage range where motor-generator 35 can output torque corresponding to a torque command value determined by running control of the electric powered vehicle.

From these viewpoints, the minimum value (lowest voltage) of output voltage VH necessary for operating load 30 in accordance with an operation command is set depending on the operation condition of load 30 (in the exemplary configuration FIG. 2, torque and speed of motor-generator 35).

Furthermore, in torque control of motor-generator 35, the phases of currents when identical torque is output vary with the DC link voltage (output voltage VH) of inverter 32. The ratio of output torque to amplitude of electric current in motor-generator 35, namely, motor efficiency, varies in accordance with the phases of currents. Therefore, when a torque command value for motor-generator 35 is set, optimum phases of currents in which efficiency in inverter 32 and motor-generator 35 is maximized, that is, power losses are minimized, as well as output voltage VH for achieving this optimum phases of currents can be determined in correspondence with that torque command value.

On the other hand, the power loss of power converter 50 is significantly reduced by application of the direct connection mode. Therefore, if the amount of reduction in power loss in power converter 50 by setting VH at Va or Vb (in the aD, bD or PD mode) or VH at Va+Vb (in the SD mode) is larger than the amount of increase in power loss of motor-generator 35 caused by deviation from the optimum phases of currents, efficiency of power supply system 5 as a whole can be reduced.

In this manner, optimum output voltage VH and the optimum operation mode differ depending on the operation condition of load 30 (e.g., torque and speed). Operation mode selection unit 600 executes setting of the optimum output voltage (hereinafter also referred to as an optimum operating voltage VH#) and selection of an operation mode such that the overall loss of power supply system 5 is minimized in a voltage range more than or equal to the above-described lowest voltage. Optimum operating voltage VH# is set at a voltage range more than or equal to the above-described lowest voltage and less than or equal to VHmax.

For example, a setting map can be previously produced in which the above-described lowest voltage corresponds to the operation condition of load 30 (e.g., torque and speed). Furthermore, by estimating power losses of inverter 32 and motor-generator 35 as well as a power loss of power converter 50 with respect to output voltage VH, optimum operating voltage VH# and the optimum operation mode in accordance with the present load condition and the present power supply condition can be selected.

A power upper limit value setting unit 720 sets power upper limit values Pamax and Pbmax based on the power supply condition of DC power supplies 10a and 10b. Each power upper limit value indicates the upper limit value of discharging electric power, and is set at 0 or a positive value. When a power upper limit value is set at 0, it means that discharging from a corresponding DC power supply is prohibited. For example, power upper limit value Pamax can be set based on SOCa and temperature Ta of DC power supply 10a. Power upper limit value Pbmax can also be set based on the condition of DC power supply 10b (SOCb, Tb, Ib, and Vb), similarly to Pamax.

A power lower limit value setting unit 730 sets power lower limit values Pamin and Pbmin based on the power supply condition of DC power supplies 10a and 10b. Each power lower limit value indicates the upper limit value of charging electric power, and is set at 0 or a negative value. When a power lower limit value is set at 0, it means that charging of a corresponding DC power supply is prohibited. For example, power lower limit value Pamin is set based on SOCa and temperature Ta of DC power supply 10a. Power lower limit value Pbmin can also be set based on the condition of DC power supply 10b (SOCb, Tb, Ib, and Vb), similarly to Pamin.

It is noted that power upper limit value PHmax (PHmax=Pamax+Pbmax) and power lower limit value PHmin (PHmin, Pamin+Pbmin) of total electric power PH of DC power supplies 10a and 10b as a whole can be set in accordance with power upper limit values Pamax and Pbmax as well as power lower limit values Pamin and Pbmin. The operation command for load 30 is restricted such that a load power command value PL* falls within the range from PHmin to PHmax. Accordingly, load 30 can be operated without causing overcharge and overdischarge of DC power supplies 10a and 10b. For example, the torque command value for motor-generator 35 is set with a restriction to fall within the range in which PL* is more than or equal to PHmin and is less than or equal to PHmax in accordance with the operation condition (vehicular speed, accelerator pedal position, etc.) of the electric powered vehicle on which motor-generator 35 is mounted.

An operation mode switching control unit 710 generates a mode control signal MD for designating the operation mode of power converter 50. The operation mode of power converter 50 is determined by mode control signal MD.

Operation mode switching control unit 710 controls transition of operation mode when an operation mode selected by operation mode selection unit 600 (i.e., an operation mode in accordance with mode selection signal MD#) differs from a present operation mode (i.e., an operation mode in accordance with mode control signal MD). Hereinafter, the operation mode in accordance with mode selection signal MD# will also be referred to as "an operation mode after transition."

As will be described later, operation mode switching control unit 710 determines switchability from the present operation mode to the operation mode after transition based on present output voltage VH, voltages Va and Vb, internal resistances Ra and Rb of DC power supplies 10a and 10b, load power command value PL*, power upper limit values Pamax and Pbmax, as well as power lower limit values Pamin and Pbmin.

A converter command generation unit 700 sets a power command value Pa* for DC power supply 10a to be subjected to electric current control based on load power command value PL*, mode selection signal MD, power upper limit values Pamax and Pbmax, as well as power lower limit values Pamin and Pbmin.

Converter command generation unit 700 sets voltage command value VH* in accordance with an operation mode designated by mode control signal MD. Basically, voltage command value VH* is set in accordance with optimum operating voltage VH# in the PB mode, SB mode, aB mode, and bB mode where output voltage control by switching control is executed. On the other hand, in the SD mode, PD mode, aD mode, and bD mode, output voltage VH is determined uniquely by voltage Va and/or voltage Vb as shown in FIG. 3. Therefore, in these direct connection modes, voltage command value VH* is set at a voltage value in accordance with voltage Va and/or voltage Vb in each mode.

Furthermore, in the PB mode, converter command generation unit 700 can control power distribution ratio k between DC power supplies 10a and 10b by appropriately setting power command value Pa*.

Figure 16:
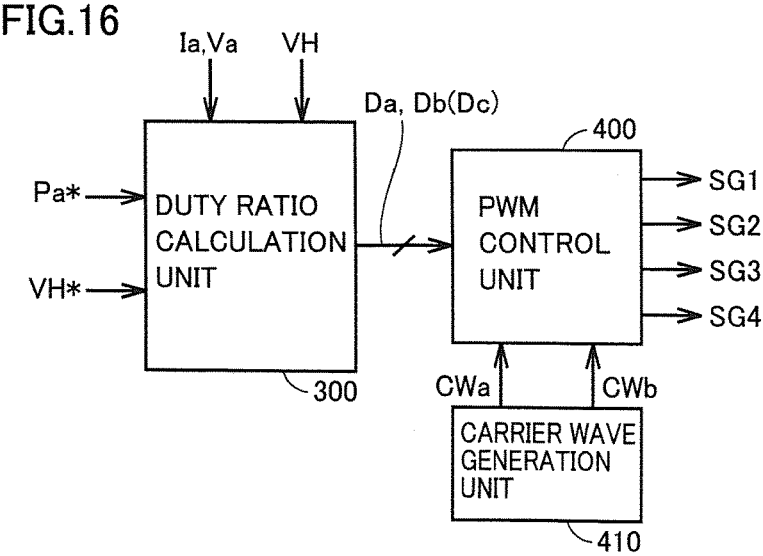
FIG. 16 is a functional block diagram for describing a control structure of the power converter in accordance with an operation command value from a converter command generation unit.

FIG. 16 is a functional block diagram for describing a control structure of power converter 50 in accordance with an operation command value from converter command generation unit 700.

Referring to FIG. 16, a duty ratio calculation unit 300 calculates duty ratios Da and Db in Equations (1) and (2) by feedback control of electric power Pa (voltage Va and electric current Ia) and output voltage VH of DC power supply 10a in accordance with power command value Pa* and voltage command value VH* set by converter command generation unit 700.

As described above, in the PB mode, by setting electric current command value Ia* for a DC power supply subjected to electric current control (here, DC power supply 10a) such that Ia*=Pa*/Va holds, electric power Pa can be controlled to assume power command value Pa* by feedback control of duty ratio Da by feedback control of electric current Ia.

On the other hand, for a DC power supply subjected to voltage control (here, DC power supply 10b), output voltage VH can be controlled to assume voltage command value VH* by calculation of duty ratio Db by feedback control of output voltage VH.

A PWM control unit 400 generates control signals SG1 to SG4 for switching elements S1 to S4 by pulse width modulation control based on duty ratios Da and Db set by duty ratio calculation unit 300 as well as carrier waves CWa and CWb received from a carrier wave generation unit 410. The pulse width modulation control and generation of control signals SG1 to SG4 conducted by PWM control unit 400 are executed similarly as described with reference to FIGS. 9 and 10, and therefore, detailed description will not be repeated.

Accordingly, output voltage VH can be subjected to feedback control to assume voltage command value VH*, and electric power Pa of DC power supply 10a can be subjected to feedback control to assume power command value Pa*. Electric power Pb of DC power supply 10b can also be controlled such that Pb=PL*−Pa* holds as a result of controlling output of DC power supply 10a in accordance with voltage command value Pa* and controlling output of DC power supply 10b in accordance with voltage command value VH. Therefore, electric power Pa and electric power Pb of DC power supplies 10a and 10b are controlled in accordance with power command value Pa* and (PL*−Pa*), that is, in accordance with power distribution ratio k.

It is noted that, in the SB mode, duty ratio calculation unit 300 calculates duty ratio Dc in Equation (3) by feedback control of output voltage VH in accordance with voltage command value VH* set by converter command generation unit 700. Furthermore, PWM control unit 400 generates control signals SG1 to SG4 for switching elements S1 to S4 by pulse width modulation control (FIG. 13) based on duty ratio Dc set by duty ratio calculation unit 300 and carrier wave CWa received from carrier wave generation unit 410. The pulse width modulation control and generation of control signals SG1 to SG4 conducted by PWM control unit 400 are executed similarly as described with reference to FIG. 14, and therefore, detailed description will not be repeated.

In the aB mode, duty ratio calculation unit 300 calculates duty ratio Da in Equation (1) by feedback control of output voltage VH in accordance with voltage command value VH* set by converter command generation unit 700. Then, PWM control unit 400 generates control signals SG1 to SG4 for switching elements S1 to S4 so as to control the step-up chopper circuit shown in FIG. 7 by pulse width modulation control based on duty ratio Da set by duty ratio calculation unit 300 and carrier wave CWa received from carrier wave generation unit 410. The pulse width modulation control and generation of control signals SG1 to SG4 conducted by PWM control unit 400 are executed in accordance with control pulse signals SDa and /SDa in FIG. 10.

Similarly, in the bB mode, duty ratio calculation unit 300 calculates duty ratio Db in Equation (2) by feedback control of output voltage VH in accordance with voltage command value VH* set by converter command generation unit 700. Then, PWM control unit 400 generates control signals SG1 to SG4 for switching elements S1 to S4 so as to control the step-up chopper circuit shown in FIG. 8 by pulse width modulation control based on duty ratio Db set by duty ratio calculation unit 300 and carrier wave CWb received from carrier wave generation unit 410. The pulse width modulation control and generation of control signals SG1 to SG4 conducted by PWM control unit 400 are executed in accordance with control pulse signals SDb and /SDb in FIG. 10.

Figure 17:
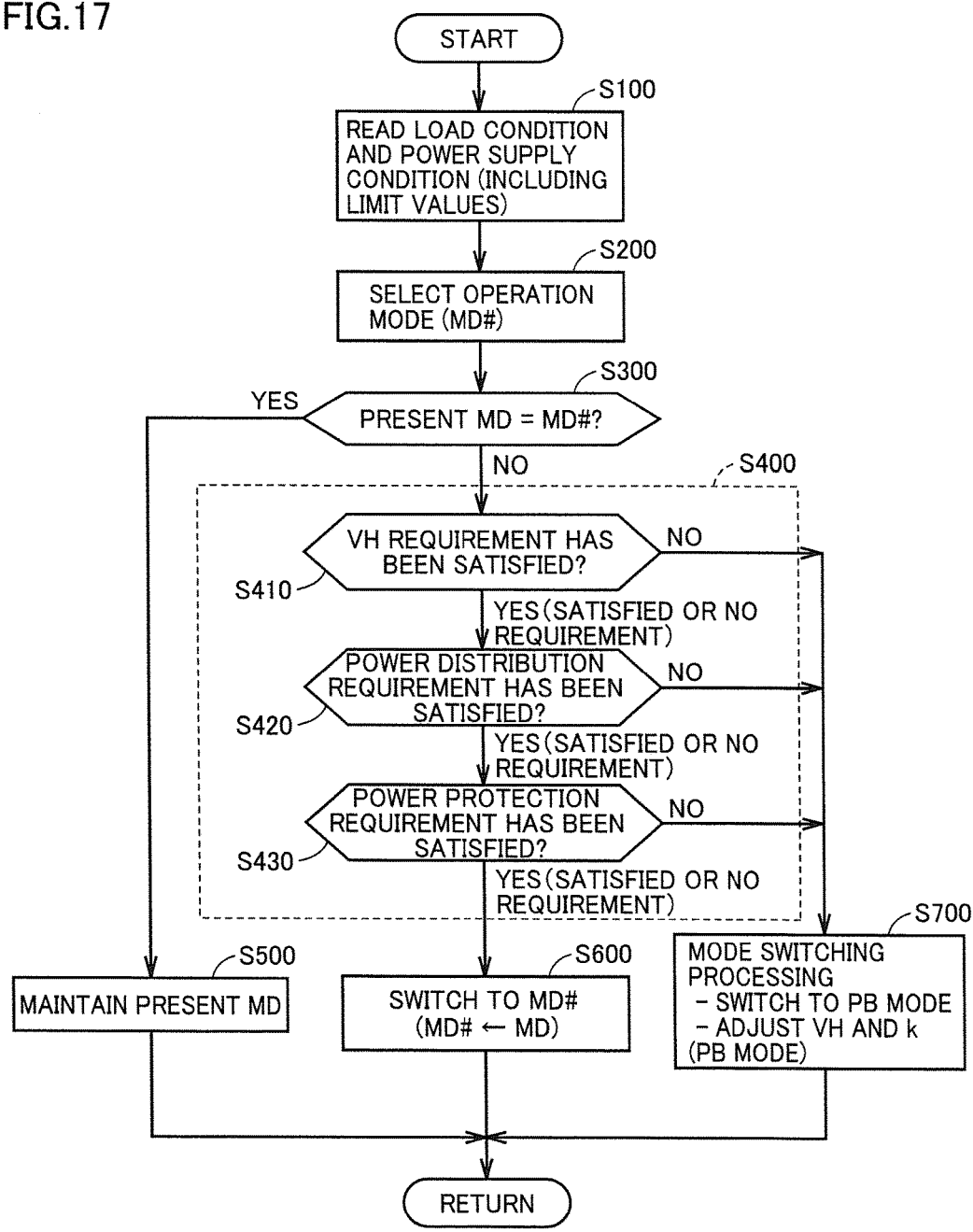
FIG. 17 is a flow chart for describing control processing according to the first embodiment in relation to switching of operation modes of the power converter.

FIG. 17 is a flow chart for describing control processing according to the present first embodiment in relation to switching of operation modes of the power converter. The control processing in accordance with the flow chart shown in FIG. 17 is periodically executed by control device 40.

Referring to FIG. 17, control device 40 reads in step S100 the present operation condition of load 30 and the present power supply condition of DC power supplies 10a and 10b. Accordingly, power upper limit values Pamax and Pbmax as well as power lower limit values Pamin and Pbmin are also read as limiting values for DC power supplies 10a and 10b. Furthermore, load power command value PL* is also obtained.

Furthermore, control device 40 in step S200 selects an operation mode based on the operation condition of load 30 and the operation condition of DC power supplies 10a and 10b (power supply condition) such that the overall loss of power supply system 5 is minimized while ensuring the operation of load 30 in accordance with the operation command. That is, the processing in step S200 corresponds to the function of operation mode selection unit 600 shown in FIG. 15. In step S200, mode selection signal MD# for selection of an operation mode suitable for the present operation condition is set.

Control device 40 determines in step S300 whether the operation mode in accordance with mode control signal MD (i.e., the present operation mode) and the operation mode in accordance with mode selection signal MD# set in step S200 (i.e., the operation mode after transition) agree with each other.

When they agree with each other (MD=MD#), that is, when a YES determination is made in S300, control device 40 advances the process to step S500 to maintain mode control signal MD. That is, power converter 50 is operated while maintaining the currently applied operation mode.

On the other hand, when the present operation mode and the operation mode after transition are different (when a NO determination is made in S300), control device 40 determines in step S400 switchability to the operation mode after transition.

Step S400 includes step S410 of determining a requirement on output voltage VH (VH requirement), step S420 of determining a requirement on power distribution ratio k between DC power supplies 10a and 10b (power distribution requirement), and step S430 of determining a requirement regarding power protection for DC power supplies 10a and 10b (power protection requirement). As will be described later, the VH requirement (S410), the power distribution requirement (S420) and the power protection requirement (S430) are previously set for each combination of a present operation mode and an operation mode after transition.

When all of the VH requirement (S410), the power distribution requirement (S420) and the power protection requirement (S430) have been satisfied, control device 40 permits switching to the operation mode after transition, and advances the process to step S600. In step S600, control device 40 changes mode control signal MD so as to designate an operation mode in accordance with mode selection signal MD#. Accordingly, power converter 50 executes switching from the present operation mode to the operation mode after transition.

In contrast, when at least any of the VH requirement, the power distribution requirement and the power protection requirement has not been satisfied (when a NO determination is made in any of S410 to S430), control device 40 advances the process to step S700.

In step S700, control device 40 prohibits switching from the present mode to the operation mode after transition, and executes mode switching processing. Therefore, mode switching in accordance with mode selection signal MD# is on hold, and present mode control signal MD is maintained. As will be described later, in the mode switching processing, the operation of power converter 50 is controlled so as to satisfy the VH requirement, the power distribution requirement and the power protection requirement for switching to the operation mode after transition.

Next, the mode switching requirements and mode switching processing in switching of each operation mode will be described in detail sequentially.

FIG. 18 is a table for describing mode switching requirements and mode switching processing in operation mode switching from the PB mode.

Referring to FIG. 18, when a transition is made from the PB mode to the SB mode, the VH requirement, the power distribution requirement and the power protection requirement are checked. Since the VH range in the SB mode (from (Va+Vb) to VHmax) is narrower than the VH range in the PB mode (from max(Va, Vb) to VHmax), the VH requirement is to satisfy VH>Va+Vb.

When VH<Va+Vb holds, a NO determination is made in step S410 (FIG. 17). Thus, switching to the SB mode is not permitted because the VH requirement does not hold. Then, as the mode switching processing in step S700 (FIG. 17), voltage command value VH* is raised toward (Va+Vb). Usually, the amount of increase in VH* in a single control cycle is restricted in order to avoid sudden change in output voltage VH. In a subsequent control cycle, when output voltage VH becomes higher than Va+Vb with increase in voltage command value VH*, the VH requirement is satisfied. Accordingly, a YES determination is now made in step S410.

As described above, in the SB mode, power distribution ratio k between DC power supplies 10a and 10b is determined in a fixed manner in accordance with voltages Va and Vb. Denoting the power distribution ratio at this time by k1, k1 is expressed by Equation (5) below.

$$k1 = Va/(Va+Vb) \quad (5)$$

Therefore, when a transition is made to the SB mode in the state where present power distribution ratio k deviates from k1, output power of DC power supplies 10a and 10b abruptly changes. Accordingly, the output to load 30 (voltage and/or current) may vary to become unstable.

Therefore, when a transition is made from the PB mode to the SB mode, switching to the SB mode is permitted after power distribution ratio k becomes equivalent to k1 in the PB mode. That is, as the power distribution requirement, it is determined in step S420 (FIG. 17) whether or not the difference between present power distribution ratio k and a power distribution ratio estimated value (k1) after the transition to the SB mode is smaller than a predetermined decided value. Power distribution ratio k can be obtained continuously from voltages Va and Vb as well as electric currents Ia and Ib of DC power supplies 10a and 10b. In addition, k1 can be obtained from voltages Va and Vb of DC power supplies 10a and 10b in accordance with Equation (5) described above.

When the difference between power distribution ratio k and k1 is larger than the decided value, a NO determination is made in step S420 (FIG. 17). Thus, switching to the SB mode is not permitted because the power distribution requirement does not hold. Then, as the mode switching processing in step S700 (FIG. 17), power command value Pa* for electric power feedback (DC power supply 10a) is adjusted in the direction that power distribution ratio k approaches k1. Usually, the amount of change in Pa* in a single control cycle is restricted in order to avoid sudden change in output power Pa and output power Pb. When power distribution ratio k substantially agrees with k1 with changes in power command value Pa* in a subsequent control cycle, the power distribution requirement is satisfied. Accordingly, a YES determination is now made in step S420.

Since the power distribution ratio is kept in the SB mode, electric power of each of DC power supplies 10a and 10b is also determined to assume Pa(SB) and Pb(SB) in a fixed manner in accordance with Equations (6) and (7) below.

$$Pa(SB) = PL^* \times k1 \quad (6)$$

$$Pb(SB) = PL^* \times (1-k1) \quad (7)$$

Therefore, when a transition is made from the PB mode to the SB mode, as the power protection requirement, it is necessary to determine whether electric power Pa(SB) and electric power Pb(SB) determined by Equations (6) and (7) have reached limiting values for DC power supplies 10a and 10b (i.e., power upper limit values Pamax and Pbmax as well as power lower limit values Pamin and Pbmin).

In step S430 (FIG. 17), it is determined, as the power protection requirement, whether or not electric power Pa(SB) falls within the range from Pamin to Pamax and whether or not electric power Pb(SB) falls within the range from Pbmin to Pbmax.

When at least either one of electric power Pa(SB) and electric power Pb(SB) has reached the limiting values, that is, when Pa(SB) falls out of the range from Pamin to Pamax or when Pb(SB) falls out of the range from Pbmin to Pbmax, a NO determination is made in step S430 (FIG. 17). Thus, switching to the SB mode is prohibited because the power protection requirement does not hold.

On the other hand, when both of electric power Pa(SB) and electric power Pb(SB) have not reached the limiting values, that is, when Pa(SB) falls within the range from Pamin to Pamax and when Pb(SB) falls within the range from Pbmin to Pbmax, the power protection requirement is satisfied. Thus, a YES determination is made in step S430 (FIG. 17).

Next, when a transition is made from the PB mode to the aB mode, the power distribution requirement and the power protection requirement are checked without checking the VH requirement.

As described above, the VH range is from max(Va, Vb) to VHmax both in the PB mode and aB mode. Thus, restriction on output voltage VH in mode switching is unnecessary. Therefore, the VH requirement is not set. Thus, a YES determination is unconditionally made in step S410 (FIG. 17) when a transition is made from the PB mode to the aB mode.

In the aB mode, since only DC power supply 10a is used, power distribution ratio k becomes equal to 1.0. Furthermore, electric power Pa of DC power supply 10a becomes equal to PL* (Pb=0). Therefore, when a transition is made to the aB mode in the state where present power distribution ratio k deviates from 1.0, output power of DC power supplies 10a and 10b abruptly change. The output to load 30 (voltage and/or current) may thus vary to become unstable.

Therefore, when a transition is made from the PB mode to the aB mode, switching to the aB mode is permitted after power distribution ratio k becomes equal to 1.0 in the PB mode. That is, as the power distribution requirement, it is determined in step S420 (FIG. 17) whether or not the difference between present power distribution ratio k and the power distribution ratio (1.0) after the transition to the aB mode is smaller than a predetermined decided value.

Since a NO determination is made in step S420 (FIG. 17) until power distribution ratio k becomes substantially 1.0, switching to the aB mode is not permitted because the power distribution requirement does not hold. Then, as the mode switching processing in step S700 (FIG. 17), power command value Pa* of electric power feedback (DC power supply 10a) is adjusted in the direction that power distribution ratio k approaches 1.0. In a subsequent control cycle, when power distribution ratio k substantially agrees with 1.0 with changes in power command value Pa*, the power distribution requirement is satisfied. Accordingly, a YES determination is now made in step S420.

In the aB mode where only DC power supply 10a is used, Pa=PL* and Pb=0 hold. Therefore, when a transition is made from the PB mode to the aB mode, it is necessary to determine, as the power protection requirement, whether electric power of DC power supply 10a, that is, load power command value PL* has reached the limiting values for DC power supply 10a (i.e., power upper limit value Pamax and power lower limit value Pamin).

In step S430 (FIG. 17), it is determined, as the power protection requirement, whether or not load power command value PL* falls within the range from Pamin to Pamax. When load power command value PL* falls out of the range from Pamin to Pamax, a NO determination is made in step S430 (FIG. 17). Thus, switching to the aB mode is prohibited because the power protection requirement does not hold. On the other hand, when load power command value PL* falls within the range from Pamin to Pamax, the power protection requirement is satisfied. Thus, a YES determination is made in step S430 (FIG. 17).

Also when a transition is made from the PB mode to the bB mode, the power distribution requirement and power protection requirement are checked without checking the VH requirement, similarly to the transition to the aB mode.

As described above, both in the PB mode and the bB mode, VH ranges from max(Va, Vb) to VVHmax. Therefore, the VH requirement is not set also when a transition is made from the PB mode to the bB mode, and a YES determination is unconditionally made in step S410 (FIG. 17).

Since only DC power supply 10b is used in the bB mode, power distribution ratio k becomes equal to 0. Furthermore, electric power Pb of DC power supply 10b becomes equal to PL* (Pa=0). Therefore, when a transition is made from the PB mode to the bB mode, switching to the bB mode is permitted after power distribution ratio k becomes equal to 0 in the PB mode, in order to avoid sudden change in electric power of DC power supplies 10a and 10b. That is, as the power distribution requirement, it is determined in step S420 (FIG. 17) whether or not the difference between present power distribution ratio k and the power distribution ratio (0) after the transition to the bB mode is smaller than a predetermined decided value.

Since a NO determination is made in step S420 (FIG. 17) until power distribution ratio k becomes substantially 0, switching to the bB mode is not permitted because the power distribution requirement does not hold. Then, as the mode switching processing in step S700 (FIG. 17), power command value Pa* for electric power feedback (DC power supply 10a) is adjusted in the direction that power distribution ratio k approaches 0. In a subsequent control cycle, when power distribution ratio k substantially agrees with 0 with changes in power command value Pa*, the power distribution requirement is satisfied. Accordingly, a YES determination is now made in step S420.

In the bB mode where only DC power supply 10b is used, Pb=PL* and Pa=0 hold. Therefore, when the bB mode is the operation mode after transition, it is necessary to determine, as the power protection requirement, whether electric power of DC power supply 10b, that is, whether load power command value PL* has reached the limiting values for DC power supply 10b (i.e., power upper limit value Pbmax and power lower limit value Pbmin).

In step S430 (FIG. 17), it is necessary to determine, as the power protection requirement, whether or not load power command value PL* falls within the range from Pbmin to Pbmax. When load power command value PL* falls out of the range from Pbmin to Pbmax, a NO determination is made in step S430 (FIG. 17). Thus, switching to the bB mode is prohibited because the power protection requirement does not hold. On the other hand, when load power command value PL* falls within the range from Pbmin to Pbmax, the power protection requirement is satisfied. Thus, a YES determination is made in step S430 (FIG. 17).

Next, when a transition is made from the PB mode to the PD mode, the VH requirement, the power distribution requirement and the power protection requirement are checked.

In the PD mode, output voltage VH is kept at max(Va, Vb). Therefore, the VH requirement is that output voltage VH substantially agrees with max(Va, Vb).

In step S410 (FIG. 17), it is determined whether or not the voltage difference between output voltage VH and max(Va, Vb) is smaller than a predetermined decided value. When output voltage VH deviates from max(Va, Vb), switching to the PD mode is not permitted because the VH requirement does not hold. Then, as the mode switching processing in step S700 (FIG. 17), voltage command value VH* is adjusted toward max(Va, Vb). In a subsequent control cycle, when output voltage VH becomes substantially equal to max(Va, Vb) with changes in voltage command value VH*, the VH requirement is satisfied. Accordingly, a YES determination is now made in step S410.

As described above, in the PD mode, power distribution ratio k between DC power supplies 10a and 10b is determined in a fixed manner in accordance with internal resistances Ra and Rb. A power distribution ratio k2 at this time is expressed by Equation (8) below:

$$k2 = Rb/(Ra+Rb) \tag{8}$$

Therefore, when a transition is made from the PB mode to the PD mode, switching to the PD mode is permitted after power distribution ratio k becomes equivalent to k2 in the PB mode. That is, as the power distribution requirement, it is determined in step S420 (FIG. 17) whether or not the difference between present power distribution ratio k and the power distribution ratio estimated value (k2) after the transition to the PD mode is smaller than a predetermined decided value. It is noted that internal resistances Ra and Rb of DC power supplies 10a and 10b can be estimated based on detection values of temperatures Ta and Tb in accordance with previously-obtained temperature dependence. Alternatively, it is also possible to make an estimate by obtaining the gradients of (Va/Ia) and (Vb/Ib) based on voltages Va and Vb as well as electric currents Ia and Ib while DC power supplies 10a and 10b are being used.

When the difference between power distribution ratio k and k2 is larger than the decided value, a NO determination is made in step S420 (FIG. 17). Thus, switching to the PD mode is not permitted because the power distribution requirement does not hold. Then, as the mode switching processing in step S700 (FIG. 17), power command value Pa* is adjusted in the direction that power distribution ratio k approaches k2. In a subsequent control cycle, when power distribution ratio k substantially agrees with k2 with changes in power command value Pa*, the power distribution requirement is satisfied. Accordingly, a YES determination is now made in step S420.

In the SD mode, power distribution ratio is kept at k2, electric power of each of DC power supplies 10a and 10b is determined to assume Pa(PD) and Pb(PD) in a fixed manner in accordance with Equations (9) and (10) described above.

$$Pa(PD) = PL^* \times k2 \tag{9}$$

$$Pb(PD) = PL^* \times (1-k2) \tag{10}$$

Therefore, when a transition is made from the PB mode to the PD mode, the power protection requirement similar to that in the transition to the SB mode is set. That is, it is determined in step S430 (FIG. 17) whether electric power Pa(PD) and electric power Pb(PD) in accordance with power distribution ratio k2 have reached the limiting values for DC power supplies 10a and 10b (i.e., power upper limit values Pamax and Pbmax as well as power lower limit values Pamin and Pbmin).

Therefore, when both of electric power Pa(PD) and electric power Pb(PD) have not reached the limiting values, that is, when Pa(PD) falls within the range from Pamin to Pamax and when Pb(PD) falls within the range from Pbmin to Pbmax, the power protection requirement is satisfied. Thus, a YES determination is made in step S430 (FIG. 17). In contrast, at least either one of electric power Pa(PD) and electric power Pb(PD) has reached the limiting values, that is, when Pa(PD) falls out of the range from Pamin to Pamax or when Pb(PD) falls out of the range from Pbmin to Pbmax, a NO determination is made in step S430 (FIG. 17). Thus, switching to the PD mode is prohibited because the power protection requirement does not hold.

Next, when a transition is made from the PB mode to the SD mode, the VH requirement, the power distribution requirement and the power protection requirement are checked.

In the SD mode, output voltage VH is kept at Va+Vb. Therefore, the VH requirement is that output voltage VH substantially agrees with Va+Vb. In step S410 (FIG. 17), it is determined whether or not the voltage difference between output voltage VH and Va+Vb is smaller than a predetermined decided value. When output voltage VH deviates from Va+Vb, switching to the SD mode is not permitted because the VH requirement does not hold. Then, as the mode switching processing in step S700 (FIG. 17), voltage command value VH* is adjusted toward Va+Vb. In a subsequent control cycle, when output voltage VH becomes substantially equal to Va+Vb with changes in voltage command value VH*, the VH requirement is satisfied. Accordingly, a YES determination is now made in step S410.

In the SD mode, the voltage distribution ratio between DC power supplies 10a and 10b is determined to assume k1 in a fixed manner in accordance with voltages Va and Vb, similarly to the SB mode. Therefore, when a transition is made from the PB mode to the SD mode, switching to the SB mode is permitted after power distribution ratio k becomes equivalent to k1 in the PB mode. That is, as the power distribution requirement, it is determined in step S420 (FIG. 17) whether or not the difference between present power distribution ratio k and the power distribution ratio estimated value (k1) after the transition to the SD mode is smaller than a predetermined decided value.

When the difference between power distribution ratios k and k1 is larger than the decided value, switching to the SB mode is not permitted because the power distribution requirement does not hold (a NO determination in S420). Then, as the mode switching processing in step S700, power command value Pa* is adjusted in a direction that power distribution ratio k approaches k1. In a subsequent control cycle, when power distribution ratio k substantially agrees with k1 with changes in power command value Pa*, the power distribution requirement is satisfied. Accordingly, a YES determination is now made in step S420.

Electric power Pa(SD) and electric power Pb(SD) when a transition is made to the SD mode are expressed by Equations (11) and (12) below. That is, Pa(SD) and Pb(SD) are identical to electric power Pa(SB) and electric power Pb(SB) after the transition to the SB mode, respectively.

$$Pa(SD) = PL^* \times k1 \tag{11}$$

$$Pb(SD) = PL^* \times (1-k1) \tag{12}$$

Therefore, the power protection requirement when a transition is made to the SD mode is set similarly to the power protection requirement when a transition is made to the SB mode. That is, it is determined in step S430 (FIG. 17) whether electric power Pa(SD) and electric power Pb(SD) have reached the limiting values for DC power supplies 10a and 10b (i.e., power upper limit values Pamax and Pbmax as well as power lower limit values Pamin and Pbmin).

When neither of electric power Pa(SD) and electric power Pb(SD) have not reached the limiting values, that is, when Pa(SD) falls within the range from Pamin to Pamax and when Pb(SD) falls within the range from Pbmin to Pbmax, the power protection requirement is satisfied. Thus, a YES determination is made in step S430 (FIG. 17). In contrast, when at least either one of electric power Pa(SD) and electric power Pb(SD) has reached the limiting values, that is, Pa(SD) falls out of the range from Pamin to Pamax or when Pb(SD) falls out of the range from Pbmin to Pbmax, a NO determination is made in step S430 (FIG. 17). Thus, switching to the SD mode is prohibited because the power protection requirement does not hold.

When a transition is made from the PB mode to the aD mode, the VH requirement, the power distribution requirement and the power protection requirement are checked.

In the aD mode, output voltage VH is kept at Va. Therefore, the VH requirement is that output voltage VH substantially agrees with Va. In step S410 (FIG. 17), it is determined whether or not the voltage difference between output voltage VH and Va is smaller than a predetermined decided value. When output voltage VH deviates from Va, switching to the aD mode is not permitted because the VH requirement does not hold. Then, as the mode switching processing in step S700 (FIG. 17), voltage command value VH* is adjusted toward Va. In a subsequent control cycle, when output voltage VH becomes substantially equal to Va with changes in voltage command value VH*, the VH requirement is satisfied. Accordingly, a YES determination is now made in step S410.

Since only DC power supply 10a is used in the aD mode, power distribution ratio k becomes equal to 1.0. Therefore, switching to the aD mode is permitted after power distribution ratio k becomes equal to 1.0 in the PB mode. That is, as the power distribution requirement, it is determined in step S420 (FIG. 17) whether or not the difference between present power distribution ratio k and the power distribution ratio (1.0) after the transition to the aD mode is smaller than a predetermined decided value.

Since a NO determination is made in step S420 (FIG. 17) until power distribution ratio k becomes substantially 1.0, switching to the aD mode is not permitted because the power distribution requirement does not hold. Then, as the mode switching processing in step S700 (FIG. 17), power command value Pa* for electric power (current) feedback is increased in the direction that power distribution ratio k approaches 1.0. In a subsequent control cycle, when power distribution ratio k substantially agrees with 1.0 with changes in power command value Pa*, the power distribution requirement is satisfied. Accordingly, a YES determination is now made in step S420.

In the aD mode, Pa=PL* and Pb=0 hold. Thus, when a transition is made from the PB mode to the aD mode, it is determined, as the power protection requirement, whether load power command value PL* has reached the limiting values for DC power supply 10a (i.e., power upper limit value Pamax and power lower limit value Pamin).

When load power command value PL* falls out of the range from Pamin to Pamax, a NO determination is made in step S430 (FIG. 17). Thus, switching to the aD mode is prohibited because the power protection requirement does not hold. On the other hand, when load power command value PL* falls within the range from Pamin to Pamax, the power protection requirement is satisfied. Thus, a YES determination is made in step S430 (FIG. 17).

When a transition is made from the PB mode to the bD mode, the VH requirement, the power distribution requirement and the power protection requirement are checked.

In the bD mode, output voltage VH is kept at Vb. Therefore, the VH requirement is that output voltage VH substantially agrees with Vb. In step S410 (FIG. 17), it is determined whether or not the voltage difference between output voltage VH and Vb is smaller than a predetermined decided value. When output voltage VH deviates from Vb, switching to the bD mode is not permitted because the VH requirement does not hold. Then, as the mode switching processing in step S700 (FIG. 17), voltage command value VH* is adjusted toward Vb. In a subsequent control cycle, when output voltage VH becomes substantially equal to Vb with changes in voltage command value VH*, the VH requirement is satisfied. Accordingly, a YES determination is now made in step S410.

In the bD mode, since only DC power supply 10b is used, power distribution ratio k becomes equal to 0. Therefore, switching to the bD mode is permitted after power distribution ratio k becomes equal to 0 in the PB mode. That is, as the power distribution requirement, it is determined in step S420 (FIG. 17) whether or not the difference between present power distribution ratio k and the power distribution ratio (0) after the transition to the bD mode is smaller than a predetermined decided value.

Since a NO determination is made in step S420 (FIG. 17) until power distribution ratio k becomes substantially 0, switching to the bD mode is not permitted because the power distribution requirement does not hold. Then, as the mode switching processing in step S700, power command value Pa* is adjusted in a direction that power distribution ratio k approaches 0. In a subsequent control cycle, when power distribution ratio k substantially agrees with 0 with changes in power command value Pa*, the power distribution requirement is satisfied. Accordingly, a YES determination is now made in step S420.

In the bD mode, Pb=PL* and Pa=0 hold. Thus, when a transition is made from the PB mode to the bD mode, it is determined, as the power protection requirement, whether load power command value PL* has reached the limiting values for DC power supply 10b (i.e., power upper limit value Pbmax and power lower limit value Pbmin).

When load power command value PL* falls out of the range from Pbmin to Pbmax, a NO determination is made in step S430 (FIG. 17). Thus, switching to the bD mode is prohibited because the power protection requirement does not hold. On the other hand, when load power command value PL* falls within the range from Pbmin to Pbmax, the power protection requirement is satisfied. Thus, a YES determination is made in step S430 (FIG. 17).

FIG. 19 is a table for describing mode switching requirements and mode switching processing in operation mode switching from the SB mode.

When a transition is made from the SB mode to the PB mode, none of the VH requirement, the power distribution requirement and the power protection requirement is set. As shown in FIG. 3, the VH range in the SB mode (from (Va+Vb) to VHmax) is included in the VH range in the PB mode (from max(Va, Vb) to VHmax). Therefore, switching to the PB mode can be made without particularly restricting output voltage VH. In the SB mode, the power distribution ratio is kept at k1 (Equation (5)), while in the PB mode, power distribution ratio k can be optionally controlled in accordance with power command value Pa*. Therefore, switching from the SB mode to the PB mode can also be made without particularly setting the power distribution requirement and the power protection requirement. It is noted that the initial value of power distribution ratio k at the time of switching to the PB mode is preferably set at k1 as in the SB mode from the viewpoint of smooth mode transition. It should be noted, however, that power distribution ratio k needs to be set such that electric power Pa (PL*×k) and Pb (PL*×(1−k)) fall within the range from Pamin to Pamax and the range from Pbmin to Pbmax, respectively.

Therefore, if the PB mode is selected in step S200 (operation mode selection unit 600) when the SB mode is applied, YES determinations are made in all of steps S410 to S430, and the operation mode is switched immediately (S600).

When a transition is made from the SB mode to the aB mode, the present operation mode and the operation mode after transition are both the "power distribution keeping modes." Since power distribution ratio k1 in the SB mode and the power distribution ratio 1.0 in the aB mode are different, power distribution ratio k needs to be adjusted.

Therefore, in the case of operation mode switching between power keeping modes, a transition is once made to the PB mode, and after adjusting power distribution ratio k, switching to the operation mode after transition is made.

That is, when a transition from the SB mode to the aB mode is instructed, switching is not permitted at least by the power distribution requirement (S420), and a transition to the PB mode is executed by step S700 as switching processing. As described above, when a transition is made from the SB mode to the PB mode, the mode switching requirement is not set.

Then, after a transition is made to the PB mode, a transition from the PB mode to the aB mode will be permitted when the power distribution requirement and the power protection requirement are satisfied in accordance with the mode switching requirements and the mode switching processing shown in FIG. 18.

Similarly, also when a transition is made from the SB mode to the bB mode, which is the operation mode switching between power keeping modes accompanied by changes in power distribution ratio k, a transition is once made to the PB mode, and after adjusting power distribution ratio k, switching to the operation mode after transition is made.

Therefore, after a transition is made to the PB mode, a transition to the bB mode will be permitted when the power distribution requirement and the power protection requirement are satisfied in accordance with the mode switching requirements and the mode switching processing shown in FIG. 18.

Furthermore, for a transition from the SB mode to the PD mode, which is also the operation mode switching between power keeping modes accompanied by changes in power distribution ratio k, a transition is once made to the PB mode, and after adjusting power distribution ratio k, switching to the operation mode after transition is made. Then, after a transition is made to the PB mode, a transition to the SD mode will be permitted when all of the VH requirement, the power distribution requirement and the power protection requirement are satisfied in accordance with the mode switching requirements and the mode switching processing shown in FIG. 18.

In the transition from the SB mode to the SD mode, it is unnecessary to set the power distribution requirement and the power protection requirement since the power distribution ratio is identical (k1) in both modes. Therefore, YES determinations are unconditionally made in steps S420 and S430 (FIG. 17).

On the other hand, VH in the SB mode ranges from Va+Vb to VHmax, while in the SD mode, VH is kept at Va+Vb. Therefore, the VH requirement is that output voltage VH substantially agrees with Va+Vb. Therefore, it is determined in step S410 (FIG. 17) whether or not the voltage difference between output voltage VH and Va+Vb is smaller than a predetermined decided value. When output voltage VH deviates from Va+Vb, switching to the SD mode is not permitted because the VH requirement does not hold.

As the mode switching processing in step S700 (FIG. 17), voltage command value VH* is adjusted toward Va+Vb. Accordingly, in a subsequent control cycle, when output voltage VH becomes substantially equal to Va+Vb with changes in voltage command value VH*, switching to the SD mode is permitted.

A transition from the SB mode to the aD mode and a transition from the SB mode to the bD mode are also the operation mode switching between power keeping modes accompanied by changes in power distribution ratio k. Therefore, a transition is once made to the PB mode, and after adjusting output voltage VH and power distribution ratio k, switching to the aD mode or the bD mode which is an operation mode after transition is made. When all of the VH requirement, the power distribution requirement and the power protection requirement are satisfied in accordance with the mode switching requirements and the mode switching processing shown in FIG. 18, a transition to the aD mode or the bD mode is permitted.

FIG. 20 is a table for describing mode switching requirements and mode switching processing in operation mode switching from the aB mode.

Referring to FIG. 20, when a transition is made from the aB mode to the PB mode, none of the VH requirement, the power distribution requirement and the power protection requirement is set. As shown in FIG. 3, since the VH range is the same in the aB mode and the PB mode (from max(Va+Vb) to VHmax), it is unnecessary to set the VH requirement. In the aB mode, the power distribution ratio is kept at 1.0, while in the PB mode, power distribution ratio k can be optionally controlled in accordance with power command value Pa*. Therefore, the aB mode can be switched to the PB mode without particularly setting the power distribution requirement and the power protection requirement. It is noted that the initial value of power distribution ratio k at the time of switching to the PB mode is preferably set at 1.0 as in the aB mode in terms of smooth mode transition.

Therefore, if the PB mode is selected in step S200 (operation mode selection unit 600) when the aB mode is applied, YES determinations are made in all of steps S410 to S430, and the operation mode is switched immediately (S600).

Each of the transition from the aB mode to the SB mode, the transition from the aB mode to the PD mode and the transition from the aB mode to the SD mode is the operation mode switching between power keeping modes accompanied by changes in power distribution ratio k.

Therefore, for switching these operation modes, a transition is once made to the PB mode, and after adjusting power distribution ratio k, switching to the operation mode after transition is made. That is, when a transition from the aB mode to the SB mode is instructed, switching is not permitted at least by the power distribution requirement (S420), and a transition to the PB mode is executed as the switching processing by step S700. Then, after a transition is made to the PB mode, and when the VH requirement, the power distribution requirement and the power protection requirement are satisfied in accordance with the mode switching requirements and the mode switching processing shown in FIG. 18, a transition to the SB mode will be permitted.

Similarly, when a transition is made from the aB mode to the PD mode, a transition is once made to the PB mode, and power distribution ratio k is adjusted to k2. Then, when the VH requirement, the power distribution requirement and the power protection requirement are satisfied in accordance with the mode switching requirements and the mode switching processing shown in FIG. 18, a transition to the PD mode will be permitted.

When a transition is made from the aB mode to the SD mode, a transition is once made to the PB mode, and power distribution ratio k is adjusted to k1. Then, when the VH requirement, the power distribution requirement and the power protection requirement are satisfied in accordance with the mode switching requirements and the mode switching processing shown in FIG. 18, a transition to the SD mode will be permitted.

For a transition from the aB mode to the aD mode, it is unnecessary to set the power distribution requirement and the power protection requirement since the power distribution ratio is identical (1.0) in both modes. Therefore, YES determinations are unconditionally made in steps S420 and S430 (FIG. 17).

On the other hand, VH in the aB mode ranges from max(Va+Vb) to VHmax, while in the aD mode, VH is kept at Va. Therefore, the VH requirement is set such that output voltage VH substantially agrees with Va. Thus, it is determined in step S410 (FIG. 17) whether or not the voltage difference between output voltage VH and Va is smaller than a predetermined decided value. When output voltage VH deviates from Va, switching to the aD mode is not permitted because the VH requirement does not hold. When output voltage VH becomes substantially equal to Va in a subsequent control cycle by adjusting power command value VH* toward Va as the mode switching processing in step S700 (FIG. 17), switching to the aD mode is permitted.

A transition from the aB mode to the bD mode and a transition from the aB mode to the bB mode are also the operation mode switching between power keeping modes accompanied by changes in power distribution ratio k. Therefore, a transition is once made to the PB mode, and after adjusting output voltage VH and power distribution ratio k, switching to the bD mode or the bB mode which is an operation mode after transition is made. In accordance with the mode switching requirements and the mode switching processing shown in FIG. 18, a transition to the bD mode or the bB mode is permitted.

FIG. 21 is a table for describing mode switching requirements and mode switching processing in operation mode switching from the bB mode.

Referring to FIG. 21, when a transition is made from the bB mode to the PB mode, none of the VH requirement, the power distribution requirement and the power protection requirement is set. As shown in FIG. 3, since the VH range is the same in the aB mode and the PB mode (from max(Va+Vb) to VHmax), it is unnecessary to set the VH requirement. In the bB mode, the power distribution ratio is kept at 0, while in the PB mode, power distribution ratio k can be optionally controlled in accordance with power command value Pa*. Therefore, the bB mode can be switched to the PB mode without particularly setting the power distribution requirement and the power protection requirement. It is noted that the initial value of power distribution ratio k at the time of switching to the PB mode is preferably set at 0 as in the bB mode in terms of smooth mode transition.

Therefore, if the PB mode is selected in step S200 (operation mode selection unit 600) when the bB mode is applied, YES determinations are made in all of steps S410 to S430, and the operation mode is switched immediately (S600).

Each of the transition from the bB mode to the SB mode, the transition from the bB mode to the PD mode and the transition from the bB mode to the SD mode is the operation mode switching between power keeping modes accompanied by changes in power distribution ratio k.

Therefore, for switching these operation modes, a transition is once made to the PB mode, and after adjusting power distribution ratio k, switching to the operation mode after transition is made. That is, a transition from the bB mode to the SB mode is instructed, switching is not permitted at least by the power distribution requirement (S420), and a transition to the PB mode is executed as the switching processing by step S700. Then, after a transition is made to the PB mode, and when the VH requirement, the power distribution requirement and the power protection requirement are satisfied in accordance with the mode switching requirements and the mode switching processing shown in FIG. 18, a transition to the SB mode will be permitted.

Similarly, when a transition is made from the bB mode to the PD mode, a transition is once made to the PB mode, and power distribution ratio k is adjusted to k2. Then, when the VH requirement, the power distribution requirement and the power protection requirement are satisfied in accordance with the mode switching requirements and the mode switching processing shown in FIG. 18, a transition to the PD mode will be permitted.

When a transition is made from the bB mode to the SD mode, a transition is once made to the PB mode, and power distribution ratio k is adjusted to k1. Then, when the VH requirement, the power distribution requirement and the power protection requirement are satisfied in accordance with the mode switching requirements and the mode switching processing shown in FIG. 18, a transition to the SD mode will be permitted.

For a transition from the bB mode to the bD mode, it is unnecessary to set the power distribution requirement and the power protection requirement since the power distribution ratio is identical (0) in both modes. Therefore, YES determinations are unconditionally made in steps S420 and S430 (FIG. 17).

On the other hand, VH in the bB mode ranges from max(Va+Vb) to VHmax, while in the bD mode, VH is kept at Vb. Therefore, the VH requirement is set such that output voltage VH substantially agrees with Vb. Thus, it is determined in step S410 (FIG. 17) whether or not the voltage difference between output voltage VH and Vb is smaller than a predetermined decided value. When output voltage VH deviates from Vb, switching to the bD mode is not permitted because the VH requirement does not hold. When output voltage VH becomes substantially equal to Vb in a subsequent control cycle by adjusting power command value VH* toward Vb as the mode switching processing in step S700 (FIG. 17), switching to the bD mode is permitted.

A transition from the bB mode to the aD mode and a transition from the bB mode to the aB mode are also the operation mode switching between power keeping modes accompanied by changes in power distribution ratio k. Therefore, a transition is once made to the PB mode, and after adjusting output voltage VH and power distribution ratio k, switching to the aD mode or the aB mode which is an operation mode after transition is made. In accordance with the mode switching requirements and the mode switching processing shown in FIG. 18, a transition to the aD mode or the aB mode is permitted.

FIG. 22 is a table for describing mode switching requirements and mode switching processing in operation mode switching from the PD mode.

Referring to FIG. 22, when a transition is made from the PD mode to the PB mode, none of the VH requirement, the power distribution requirement and the power protection requirement is set. As shown in FIG. 3, since the VH range in the PD mode (VH=max(Va, Vb)) is included in the VH range in the PB mode (from max(Va+Vb) to VHmax), it is unnecessary to set the VH requirement. In the PD mode, the power distribution ratio is kept at k2 in accordance with internal resistances Ra and Rb, while in the PB mode, power distribution ratio k can be optionally controlled in accordance with power command value Pa*. Therefore, the PD mode can be switched to the PB mode without particularly setting the power distribution requirement and the power protection requirement. It is noted that the initial value of power distribution ratio k at the time of switching to the PB mode is preferably set at k2 as in the PD mode in terms of smooth mode transition.

Therefore, if the PB mode is selected in step S200 (operation mode selection unit 600) when the PD mode is applied, YES determinations are made in all of steps S410 to S430, and the operation mode is switched immediately (S600).

Each of the transition from the PD mode to the SB mode, the transition from the PD mode to the aB mode, the transition from the PD mode to the bB mode, and the transition from the PD mode to the SD mode is the operation mode switching between power keeping modes accompanied by changes in power distribution ratio k.

Therefore, for switching these operation modes, a transition is once made to the PB mode, and after adjusting power distribution ratio k, switching to the operation mode after transition is made. That is, when a transition from the PD mode to the SB mode is instructed, switching is not permitted at least by the power distribution requirement (S420), and a transition to the PB mode is executed as the switching processing by step S700. Then, after a transition is made to the PB mode, and when the VH requirement, the power distribution requirement and the power protection requirement are satisfied in accordance with the mode switching requirements and the mode switching processing shown in FIG. 18, a transition to the SB mode will be permitted.

Similarly, when a transition is made from the PD mode to the aB mode or the bB mode, a transition is once made to the PB mode, and power distribution ratio k is adjusted to 1.0 or 0. Then, when the power distribution requirement and the power protection requirement are satisfied in accordance with the mode switching requirements and the mode switching processing shown in FIG. 18, a transition to the bB mode will be permitted.

When a transition is made from the PD mode to the SD mode, a transition is once made to the PB mode, and power distribution ratio k is adjusted to k1. Then, when the VH requirement, the power distribution requirement and the power protection requirement are satisfied in accordance with the mode switching requirements and the mode switching processing shown in FIG. 18, a transition to the SD mode will be permitted.

A transition from the PD mode to the aD mode takes place depending on the relationship between voltages Va and Vb. That is, when Va>Vb holds in the PD mode, no electric current flows from DC power supply 10b to electric power line 20. Therefore, by turning off switching element S4, a transition can be naturally made to the aD mode.

Similarly, that is, when Vb>Va holds in the PD mode, no electric current flows from DC power supply 10a to electric power line 20. Therefore, by turning off switching element S2, a transition can be naturally made to the bD mode.

FIG. 23 is a table for describing mode switching requirements and mode switching processing in operation mode switching from the SD mode.

Referring to FIG. 23, when a transition is made from the SD mode to the PB mode, none of the VH requirement, the power distribution requirement and the power protection requirement is set. As shown in FIG. 3, since the VH range in the SD mode (VH=Va+Vb) is included in the VH range in the PB mode (from max(Va+Vb) to VHmax), it is unnecessary to set the VH requirement. In the SD mode, the power distribution ratio is kept at k1 in accordance with voltages Va and Vb, while in the PB mode, power distribution ratio k can be optionally controlled in accordance with power command value Pa*. Therefore, the SD mode can be switched to the PB mode without particularly setting the power distribution requirement and the power protection requirement. It is noted that the initial value of power distribution ratio k at the time of switching to the PB mode is preferably set at k1 as in the SD mode in terms of smooth mode transition.

Therefore, if the PB mode is selected in step S200 (operation mode selection unit 600) when the SD mode is applied, YES determinations are made in all of steps S410 to S430, and the operation mode is switched immediately (S600).

In the transition from the SD mode to the SB mode, the power distribution ratio is common (k1) between the present operation mode and the operation mode after transition. The VH range in the SD mode (VH=Va+Vb) is included in the VH range in the SB mode (from max(Va, Vb) to VHmax). Therefore, in the transition from the SD mode to the SB mode, none of the VH requirement, the power distribution requirement and the power protection requirement needs to be set. That is, if the SB mode is selected in step S200 (operation mode selection unit 600) when the SD mode is applied, YES determinations are made in all of steps S410 to S430, and the operation mode is switched immediately (S600).

Each of the transition from the SD mode to the aB mode, the transition from the SD mode to the bB mode, the transition from the SD mode to the PD mode, the transition from the SD mode to the aD mode, and the transition from the SD mode to the bD mode is the operation mode switching between power keeping modes accompanied by changes in power distribution ratio k.

For switching these operation modes, a transition is once made to the PB mode, and after adjusting power distribution ratio k, switching to the operation mode after transition is made. That is, when a transition from the SD mode to the aB mode or the bB mode is instructed, switching is not permitted at least by the power distribution requirement (S420), and a transition to the PB mode is executed as the switching processing by step S700.

When a transition is made from the SD mode to the PD mode, aD mode or the bD mode, a transition is once made to the PB mode, and power distribution ratio k is adjusted to k2, 1.0 or 0. Then, when the VH requirement, the power distribution requirement and the power protection requirement are satisfied in accordance with the mode switching requirements and the mode switching processing shown in FIG. 18, the transition to the PD mode, the aD mode or the bD mode will be permitted.

FIG. 24 is a table for describing mode switching requirements and mode switching processing in operation mode switching from the aD mode.

Referring to FIG. 24, when a transition is made from the aD mode to the PB mode, none of the VH requirement, the power distribution requirement and the power protection requirement is set. As shown in FIG. 3, since the VH range in the aD mode (VH=Va) is included in the VH range in the PB mode (from max(Va+Vb) to VHmax), it is unnecessary to set the VH requirement. In the aD mode, the power distribution ratio is kept at 1.0, while in the PB mode, power distribution ratio k can be optionally controlled in accordance with power command value Pa*. Therefore, the aD mode can be switched to the PB mode without particularly setting the power distribution requirement and the power protection requirement. It is noted that the initial value of power distribution ratio k at the time of switching to the PB mode is preferably set at 1.0 as in the aD mode in terms of smooth mode transition.

Therefore, if the PB mode is selected in step S200 (operation mode selection unit 600) when the aD mode is applied, YES determinations are made in all of steps S410 to S430, and the operation mode is switched immediately (S600).

Each of a transition from the aD mode to the SB mode, a transition from the aD mode to the bB mode, a transition from the aD mode to the PD mode, and a transition from the aD mode to the SD mode is the operation mode switching between power keeping modes accompanied by changes in power distribution ratio k. Therefore, for switching these operation modes, a transition is once made to the PB mode, and after adjusting power distribution ratio k, switching to the operation mode after transition is made.

That is, when the transition from the aD mode to the SB mode, the PD mode or the SD mode is instructed, switching is not permitted at least by the power distribution requirement (S420), and a transition to the PB mode is executed as the switching processing by step S700. Then, after a transition is made to the PB mode, power distribution ratio k is adjusted to k1 or k2. Then, when the VH requirement, the power distribution requirement and the power protection requirement are satisfied in accordance with the mode switching requirements and the mode switching processing shown in FIG. 18, the transition to the SB mode, the PD mode or the SD mode will be permitted.

Similarly, when a transition is made from the aD mode to the bB mode, a transition is once made to the PB mode, and power distribution ratio k is adjusted to 0. Then, when the power distribution requirement and the power protection requirement are satisfied in accordance with the mode switching requirements and the mode switching processing shown in FIG. 18, the transition to the bB mode will be permitted.

In a transition from the aD mode to the aB mode, the power distribution ratio is common (1.0) between the present operation mode and the operation mode after transition. The VH range in the aD mode (VH=Va) is included in the VH range in the aB mode (from max(Va, Vb) to VHmax). Therefore, in the transition from the aD mode to the aB mode, none of the VH requirement, the power distribution requirement and the power protection requirement needs to be set. That is, if the aB mode is selected in step S200 (operation mode selection unit 600) when the aD mode is applied, YES determinations are made in all of steps S410 to S430, and the operation mode is switched immediately (S600).

A transition from the aD mode to the bD mode takes place depending on the relationship between voltages Va and Vb. That is, when Vb>Va holds in the aD mode, no electric current flows from DC power supply 10a to electric power line 20, while electric current flows from DC power supply 10b to electric power line 20 because diode D4 conducts. Accordingly, a transition can be naturally made from the aD mode to the bD mode.

Similarly, when Vb and Va become equivalent in the aD mode, electric current also flows from DC power supply 10a to electric power line 20 because diode D4 conducts. Therefore, a transition can be naturally made from the aD mode to the PD mode.

Figures 25, 26:
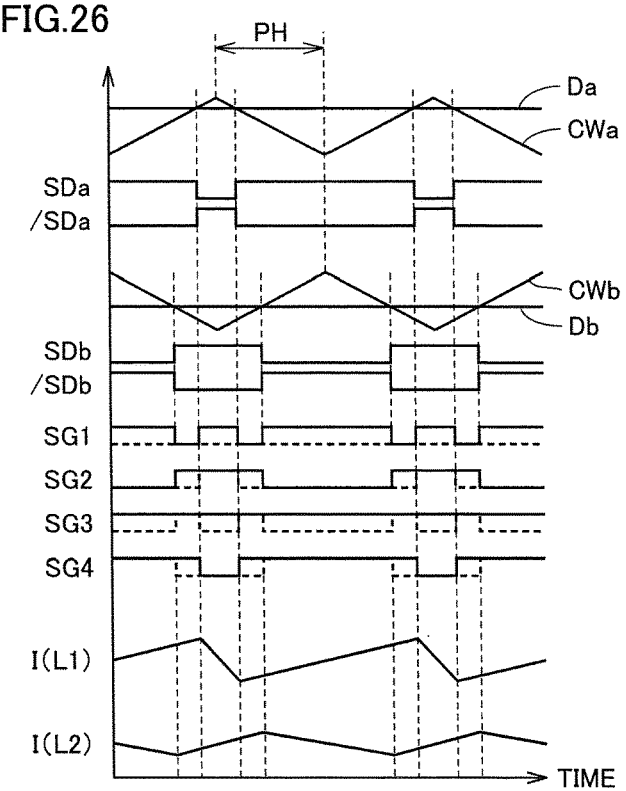
FIG. 25 is a table for describing mode switching requirements and mode switching processing in operation mode switching from a bD mode.
FIG. 26 is a diagram of waveforms showing an exemplary control operation in the PB mode when carrier phase control by power converter control according to a second embodiment of the present invention is applied.

FIG. 25 is a table for describing mode switching requirements and mode switching processing in operation mode switching from the bD mode.

Referring to FIG. 25, when a transition is made from the bD mode to the PB mode, none of the VH requirement, the power distribution requirement and the power protection requirement is set. As shown in FIG. 3, since the VH range in the bD mode (VH=Vb) is included in the VH range in the PB mode (from max(Va+Vb) to VHmax), it is unnecessary to set the VH requirement. In the bD mode, the power distribution ratio is kept at 0, while in the PB mode, power distribution ratio k can be optionally controlled in accordance with power command value Pa*. Therefore, the bD mode can be switched to the PB mode without particularly setting the power distribution requirement and the power protection requirement. It is noted that the initial value of power distribution ratio k at the time of switching to the PB mode is preferably set at 0 as in the bD mode in terms of smooth mode transition.

Therefore, if the PB mode is selected in step S200 (operation mode selection unit 600) when the bD mode is applied, YES determinations are made in all of steps S410 to S430, and the operation mode is switched immediately (S600).

Each of a transition from the bD mode to the SB mode, a transition from the bD mode to the aB mode, a transition from the bD mode to the PD mode, and a transition from the bD mode to the SD mode is the operation mode switching between power keeping modes accompanied by changes in power distribution ratio k. Therefore, for switching these operation modes, a transition is once made to the PB mode, and after adjusting power distribution ratio k, switching to the operation mode after transition is made.

That is, when the transition from the bD mode to the SB mode, the PD mode or the SD mode is instructed, switching is not permitted at least by the power distribution requirement (S420), and a transition to the PB mode is executed as the switching processing by step S700. Then, after a transition is made to the PB mode, power distribution ratio k is adjusted to k1 or k2. Then, when the VH requirement, the power distribution requirement and the power protection requirement are satisfied in accordance with the mode switching requirements and the mode switching processing shown in FIG. 18, the transition to the SB mode, the PD mode or the SD mode will be permitted.

Similarly, when a transition is made from the bD mode to the aB mode, a transition is once made to the PB mode, and power distribution ratio k is adjusted to 1.0. Then, when the power distribution requirement and the power protection requirement are satisfied in accordance with the mode switching requirements and the mode switching processing shown in FIG. 18 the a transition to the aB mode will be permitted.

In a transition from the bD mode to the bB mode, the power distribution ratio is common (0) between the present operation mode and the operation mode after transition. The VH range in the bD mode (VH=Vb) is included in the VH range in the bB mode (from max(Va, Vb) to VHmax). Therefore, in the transition from the bD mode to the bB mode, none of the VH requirement, the power distribution requirement and the power protection requirement needs to be set. That is, if the bB mode is selected in step S200 (operation mode selection unit 600) when the bD mode is applied, YES determinations are made in all of steps S410 to S430, and the operation mode is switched immediately (S600).

A transition from the bD mode to the aD mode takes place depending on the relationship between voltages Va and Vb. That is, when Va>Vb holds in the bD mode, no electric current flows from DC power supply 10b to electric power line 20, while electric current flows from DC power supply 10a to electric power line 20 because diode D2 conducts. Accordingly, a transition can be naturally made from the bD mode to the aD mode.

Similarly, when Vb and Va become equivalent in the bD mode, electric current also flows from DC power supply 10a to electric power line 20 because diode D2 conducts. Therefore, a transition can be naturally made from the bD mode to the PD mode.

In this manner, with the power supply system according to the present embodiment, an operation mode can be selected appropriately in accordance with the load condition and the power supply condition such that, for example, the loss of the power supply system as a whole is minimized. Furthermore, since operation modes are switched after confirming that a predetermined mode switching condition has been satisfied, switching of operation modes following operation mode selection can be executed smoothly such that inconvenience does not occur in the operation and output of power converter 50.

In particular, when a transition is made to an operation mode where the power distribution ratio between DC power supplies 10a and 10b is determined in a fixed manner (power distribution keeping mode), electric power input/output to/from each of DC power supplies 10a and 10b can be prevented from abruptly changing. This can prevent the operation mode switching from causing fluctuations in and unstabilization of the output (voltage and/or current) from power supply system 5 to load 30.

Moreover, since the operation mode switching is restricted reflecting the difference in the settable range of output voltage VH between the respective operation modes (VH requirement), output voltage VH can be prevented from abruptly changing because of the operation mode switching.

Furthermore, during the operation mode switching to the power distribution keeping mode, that operation mode switching can be prohibited if electric power of each of DC power supplies 10a and 10b reaches electric power limiting values Pamax, Pbmax, Pamin, and Pbmin when the power distribution ratio after transition is applied. Accordingly, each of DC power supplies 10a and 10b can be protected such that overcharge and overdischarge resulting from the operation mode switching do not occur.

Second Embodiment

In a second embodiment, phase control of carrier waves (hereinafter referred to as carrier phase control) in pulse width modulation control in the PB mode and the SB mode where both of DC power supplies 10a and 10b are used will be described. First, carrier phase control in the PB mode will be described.

FIG. 26 shows an exemplary control operation in the PB mode when a phase difference is provided intentionally between carrier waves CWa and CWb.

Referring to FIG. 26, carrier wave CWa and carrier wave CWb have the same frequency with a phase difference PH provided therebetween. In the example of FIG. 26, phase difference PH is 180 degrees.

Similarly to the case when PH=0 as shown in FIG. 9, control pulse signal SDa is generated based on the comparison between carrier wave CWa and duty ratio Da, while control pulse signal SDb is generated based on the comparison between carrier wave CWb and duty ratio Db.

Duty ratios Da and Db shown in FIG. 26 have the same values as those shown in FIG. 9. Accordingly, control pulse signal SDa shown in FIG. 26 has the same length of H-level period as control pulse signal SDa shown in FIG. 9, despite different phases between these signals. Similarly, control pulse signal SDb shown in FIG. 26 has the same length of H-level period as control pulse signal SDb shown in FIG. 9, despite different phases between these signals.

Accordingly, it is possible to achieve control signals SG1 to SG4 shown in FIG. 26 with waveforms different from those of control signals SG1 to SG4 shown in FIG. 9 by providing phase difference PH between carrier waves CWa and CWb. From the comparison between FIGS. 9 and 26, it is understood that the phase relationship (phases of currents) between electric currents I(L1) and I(L2) can be changed by varying phase difference PH between carrier waves CWa and CWb.

Meanwhile, it is understood that an average value of electric currents I(L1) and I(L2) is equivalent in FIGS. 9 and 26, with respect to the same duty ratios Da and Db. That is, the outputs of DC power supplies 10a and 10b are controlled by duty ratios Da and Db, and not affected by variation in phase difference PH between carrier waves CWa and CWb.

Therefore, in the second embodiment, in the PB mode, reduction in switching losses of switching elements S1 to S4 is achieved by carrier phase control for appropriately adjusting phase difference PH between carrier waves CWa and CWb.

Figure 27:
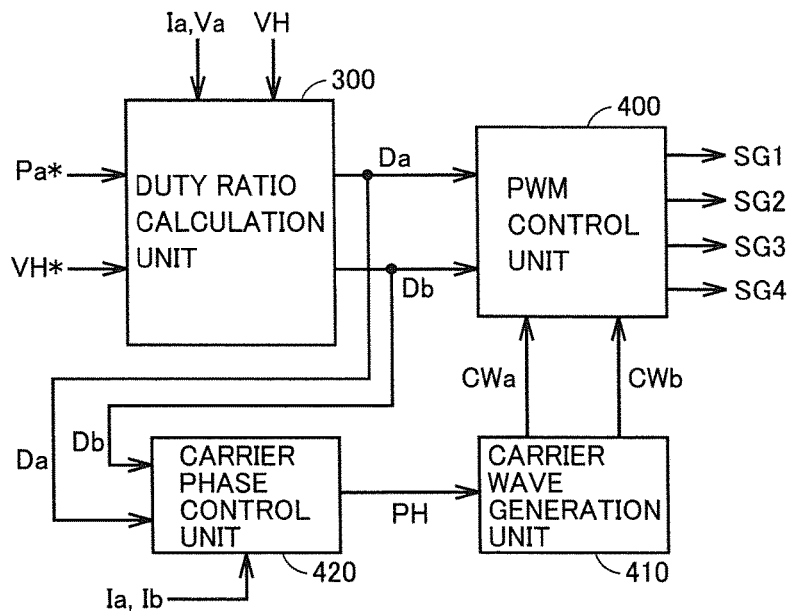
FIG. 27 is a functional block diagram for describing a control structure of a power converter for applying the carrier phase control according to the second embodiment.

FIG. 27 shows a control structure of a power converter for applying the carrier phase control according to the second embodiment.

Comparing FIG. 27 with FIG. 15, in the control structure of the power converter according to the second embodiment, a carrier phase control unit 420 is further required in addition to duty ratio calculation unit 300, PWM control unit 400 and carrier wave generation unit 410 shown in FIG. 17.

Carrier phase control unit 420 sets phase difference PH between carrier waves CWa and CWb in the SB mode and the PB mode. Carrier wave generation unit 410 generates carrier waves CWa and CWb with phase difference PH set by carrier phase control unit 420 provided therebetween.

It is noted that, similarly to the first embodiment, a single carrier wave in PWM control should only be used in the aB mode and the bB mode. Therefore, phase difference PH is not set in the aB mode and the bB mode.

First, setting of phase difference PH in the PB mode in order to achieve reduction in switching losses of switching elements S1 to S4 will be described. Herein, a description will be made on control in a state where both of DC power supplies 10a and 10b are in the powering condition, namely in a state where electric current I(L1)>0 and electric current I(L2)>0 hold.

Figure 28:
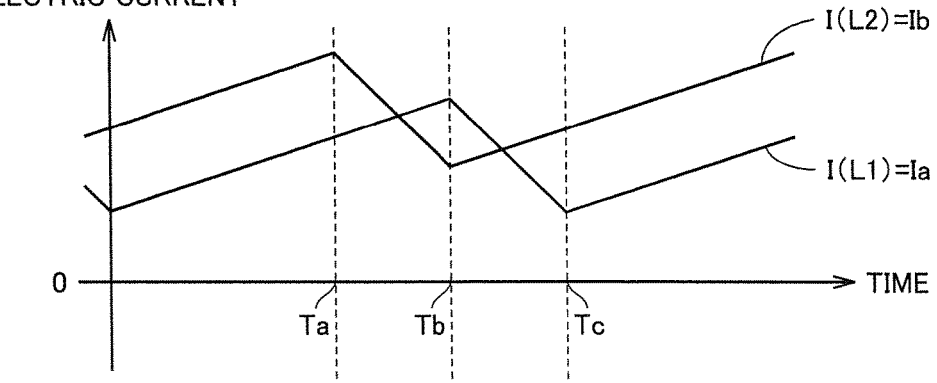
FIG. 28 is a diagram of waveforms describing phases of currents resulting from carrier phase control in the PB mode.

FIG. 28 is a diagram of waveforms describing phases of currents resulting from carrier phase control in the PB mode in power converter 50.

Referring to FIG. 28, since switching elements S2 to S4 are on until time Ta, the lower arm of the boost chopper circuit is on in both of DC power supplies 10a and 10b. Thus, both of electric currents I(L1) and I(L2) rise.

By turning off switching element S2 at time Ta, the lower arm element of the boost chopper circuit for DC power supply 10b is turned off. Thus, electric current I(L2) starts falling. While switching element S2 is turned off, switching element S1 is turned on.

After time Ta, the lower arm element of the boost chopper circuit for DC power supply 10a is on, while the lower arm element of the boost chopper circuit for DC power supply 10b is off. That is, electric current I(L2) falls while electric current I(L1) rises. In this instance, the electric current path in power converter 50 is as shown at (a) of FIG. 29.

As understood from (a) of FIG. 29, after time Ta, a differential current between electric currents I(L1) and I(L2) flows through switching element S4. That is, the electric current flowing through switching element S4 decreases.

Referring to FIG. 28 again, when switching element S4 is turned off after time Ta, the lower arm element of the boost chopper circuit for DC power supply 10a is turned off. Thus, electric current I(L1) starts falling. When switching element S2 is turned on, the lower arm element of the boost chopper circuit for DC power supply 10b is turned on. Thus, electric current I(L2) starts rising again. That is, the electric current path in power converter 50 changes from the state at (a) of FIG. 29 into the state at (b) of FIG. 29. In the state shown at (b) of FIG. 29, the differential current between electric currents I(L1) and I(L2) flows through switching element S2. Thus, the electric current flowing through switching element S2 decreases.

It is possible to reduce an electric current during the turn-off period of switching element S4, namely, the switching loss by turning off switching element S4 in the state shown at (a) of FIG. 29. In addition, it is possible to reduce an electric current during the turn-on period of switching element S2, namely, the switching loss by turning on switching element S2 in the state shown at (a) of FIG. 29.

Therefore, the phases of currents, namely, phase difference PH between carrier waves CWa and CWb is adjusted such that the falling start timing of electric current I(L1) (local maximum) and the rising start timing of electric current I(L2) (local minimum) coincide with each other. Accordingly, at time Tb shown in FIG. 28, switching element S2 is turned on, while switching element S4 is turned off.

Referring to FIG. 28 again, at time Tc, switching element S1 is turned off, while switching element S4 is turned on. Thus, the lower arm element of the boost chopper circuit for each of DC power supplies 10a and 10b is turned on. Accordingly, the abovementioned state prior to time Ta is reproduced, so that both of electric currents I(L1) and I(L2) rise.

FIG. 30 shows waveforms of electric currents of switching elements S2 and S4 under the phases of currents shown in FIG. 28. FIG. 30 shows at (a) a waveform of electric current I(S2) of switching element S2. FIG. 30 shows at (b) a waveform of electric current I(S4) of switching element S4.

Referring to (a) of FIG. 30, electric current I(S2) satisfies a relation of I(S2)=I(L2) during the period before time Ta and after time Tc. Since switching element S2 is off during the period from time Ta to Tb, I(S2)=0 holds. During the period from time Tb to Tc, I(S2)=-(I(L1)-I(L2)) holds, as shown at (b) of FIG. 30.

Referring to (b) of FIG. 30, electric current I(S4) satisfies a relation of I(S4)=I(L1) during the period before time Ta and after time Tc. During the period from time Ta to Tb, I(S4)=-(I(L2)-I(L1)) holds, as shown at (a) of FIG. 30. Since switching element S4 is off during the period from time Tb to Tc, I(S4)=0 holds.

Figure 31:
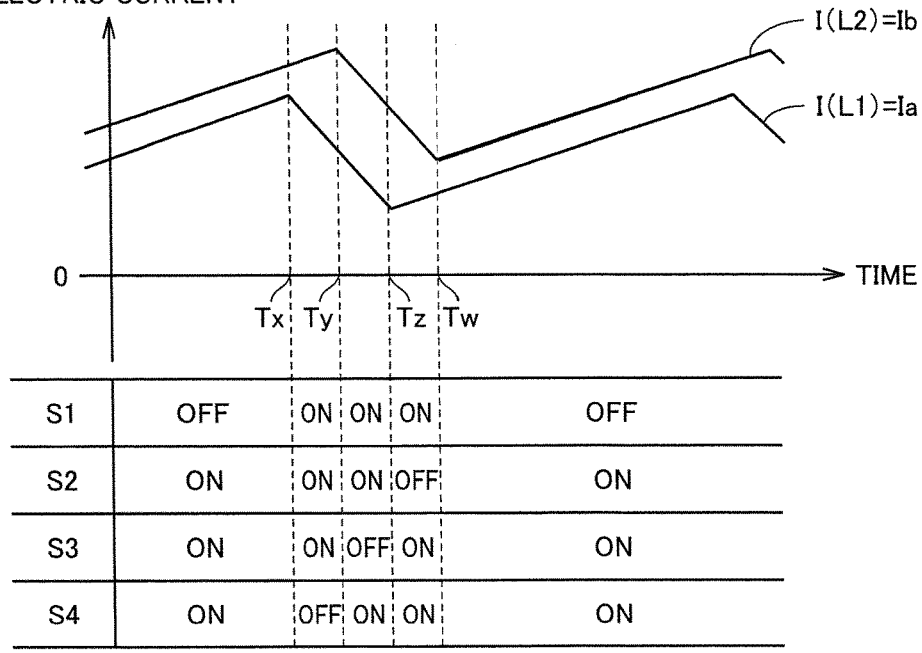
FIG. 31 is a diagram of waveforms showing phases of currents when a phase difference between carrier waves is equal to zero.

FIG. 31 shows phases of currents when phase difference PH between the carrier waves is set at zero under the duty ratios equivalent to those shown in FIG. 28, for comparison with FIG. 28.

Referring to FIG. 31, when phase difference PH between carrier waves CWa and CWb is equal to zero, electric currents I(L1) and I(L2) are different in the rising/falling timings (Tx, Ty, Tz, and Tw).

Specifically, prior to time Tx, when switching element S1 is off while switching elements S2 to S4 are on, both of electric currents I(L1) and I(L2) rise. Then, when switching element S4 is turned off at time Tx, electric current I(L1) starts falling. Switching element S1 is turned on, when switching element S4 is turned off.

Then, when switching element S3 is turned off at time Ty, electric current I(L2) starts falling. Switching element S4 is turned on, when switching element S3 is turned off. Accordingly, both of electric currents I(L1) and I(L2) fall.

At time Tz, switching element S2 is turned off, while switching element S3 is turned on. Accordingly, the lower arm element of the boost chopper circuit is turned on for DC power supply 10a. Thus, electric current I(L1) rises again. At time Tw, switching element S1 is turned off, while switching element S2 is turned on. Accordingly, the state prior to time Tx is reproduced, so that both of electric currents I(L1) and I(L2) rise.

FIG. 32 shows waveforms of electric currents of switching elements S2 and S4 under the phases of currents shown in FIG. 31. FIG. 32 shows at (a) a waveform of electric current I(S2) of switching element S2. FIG. 32 shows at (b) a waveform of electric current I(S4) of switching element S4.

Referring to (a) of FIG. 32, electric current I(S2) satisfies a relation of I(S2)=I(L2) during the period before time Tx and after time Tw. During the period from time Tx to Ty, an electric current path similar to that shown at (b) of FIG. 29 is formed, so that I(S2)=-(I(L1)-I(L2)) holds. During the period from time Ty to Tz, switching element S2 operates as the upper arm element for DC power supply 10a, so that I(S2)=-I(L1) holds. During the period from time Ty to Tz in which both of electric currents I(L1) and I(L2) fall, switching element S2 operates as the upper arm element for DC power supply 10a, so that I(S2)=-I(L1) holds. During the period from time Tz to Tw, switching element S2 is off, so that I(S2)=0 holds.

Referring to (b) of FIG. 32, electric current I(S4) satisfies the relation of I(S4)=I(L1) during the period before time Tx and after time Tw. During the period from time Tx to Ty, switching element S4 is off, so that I(S4)=0 holds. During the period from time Ty to Tz in which both of electric currents I(L1) and I(L2) fall, switching element S4 operates as the upper arm element for DC power supply 10b, so that I(S4)=-I(L2) holds. During the period from time Tz to Tw, an electric current path similar to that shown at (b) of FIG. 29 is formed, so that I(S2)=-(I(L2)-I(L1)) holds.

From the comparison of electric current I(S2) generated at time Tb shown at (a) of FIG. 30 with electric current I(S2) generated at the time Tw shown at (a) of FIG. 32, it is understood that the turn-on electric current of switching element S2, that is, the switching loss during turn-on period is reduced by adjusting phase difference j for achieving the phases of currents shown in FIG. 28. From the comparison of electric current I(S2) during the period from time Tb to Tc shown at (a) of FIG. 30 with electric current I(S2) during the period from time Ty to Tz shown at (a) of FIG. 32, it is understood that the conduction loss of switching element S2 is also reduced.

Similarly, from the comparison of electric current I(S4) generated at time Tb shown at (b) of FIG. 30 with electric current I(S4) generated at the time Tx shown at (b) of FIG. 32, it is understood that the turn-off electric current of switching element S4, that is, the switching loss during turn-off period is reduced by adjusting phase difference j for achieving the phases of currents shown in FIG. 28. From the comparison of electric current I(S4) during the period from time Ta to Tb shown at (b) of FIG. 30 with electric current I(S4) during the period from time Ty to Tz shown at (a) of FIG. 32, it is understood that the conduction loss of switching element S4 is also reduced.

In this manner, by providing phase difference PH between carrier waves CWa and CWb, it is possible to reduce the losses in switching elements S1 to S4. For example, as shown in FIG. 28, when both of DC power supplies 10a and 10b are in the powering condition, the losses in the switching elements S1 to S4 are suppressed by setting phase difference PH such that the falling start timing (local maximum) of electric current I(L1) and the rising start timing (local minimum) of electric current I(L2) coincide with each other, that is, such that the turn-on timing of switching element S2 and the turn-off timing of switching element S4 coincide with each other.

With such a phase difference PH, the falling timing (or rising timing) of control pulse signal SDa and the rising timing (or falling timing) of control pulse signal SDb coincide with each other. In other words, it is necessary to adjust phase difference PH such that a pulse transition timing (i.e., timing when the H/L level of pulse is switched) agrees between control pulse signals SDa and SDb.

As also understood from FIGS. 9 and 25, control pulse signals SDa and SDb vary in accordance with duty ratios Da and Db. Accordingly, it is understood that phase difference PH with which the phases of currents shown in FIG. 26 can be achieved, namely, phase difference PH resulting from carrier phase control is also determined in accordance with duty ratios Da and Db. Therefore, it is possible to previously obtain the relationship of duty ratios Da and Db with phase difference PH resulting from carrier phase control, and previously store in control device 40 the relationship as a map (hereinafter also referred to as a "phase difference map") or a function (hereinafter also referred to as a "phase difference calculation formula").

Carrier phase control unit 420 can calculate phase difference PH for the carrier phase control in accordance with the phase difference map or the phase difference calculation formula based on calculated duty ratios Da and Db in the PWM control in the PB mode. Then, carrier waves CWa and CWb are generated with calculated phase difference PH provided therebetween, so that highly efficient DC/DC conversion can be achieved with losses in switching element S1 to S4 suppressed.

Description with reference to FIGS. 28 to 32 has been made as to the state where both DC power supplies 10a and 10b are in the powering condition. Similar carrier phase control can be executed in other conditions.

FIG. 33 is a table for describing the carrier phase control according to the second embodiment of the present invention in each operation condition of the DC power supplies.

Referring to FIG. 33, in condition A, both of DC power supplies 10a and 10b are in the powering condition described above. As shown in FIG. 26, phase difference PH between the carrier waves is adjusted to achieve the phases of currents such that the falling timing (local maximum) of electric current I(L1) and the rising timing (local minimum) of electric current I(L2) coincide with each other at Tb shown in the drawing. Accordingly, it is possible to reduce the turn-on loss of switching element S2 and the turn-off loss of switching element S4 at Tb. Moreover, as described above, it is possible to reduce the conduction loss of switching element S4 during the period from Ta to Tb and the conduction loss of switching element S2 during the period from Tb to Tc.

In condition B, both of DC power supplies 10a and 10b are in the regenerative condition. In this condition, phase difference PH between the carrier waves is adjusted to achieve the phases of currents such that the rising timing (local minimum) of electric current I(L1) and the falling timing (local maximum) of electric current I(L2) coincide with each other at Tb shown in the drawing. Accordingly, it is possible to reduce the turn-on loss of switching element S4 and the turn-off loss of switching element S2 at Tb. Moreover, as described above, it is possible to reduce the conduction loss of switching element S2 during the period from Ta to Tb and the conduction loss of switching element S4 during the period from Tb to Tc.

In condition C, DC power supply 10a is in the regenerative condition, while DC power supply 10b is in the powering condition. In this condition, phase difference PH between the carrier waves is adjusted to achieve the phases of currents such that the falling timing (local maximum) of electric current I(L1) and the falling timing (local maximum) of electric current I(L2) coincide with each other at Ta shown in the drawing. Accordingly, it is possible to reduce the turn-on loss of switching element S3 and the turn-off loss of switching element S1 at Ta. Moreover, as described above, it is possible to reduce the conduction loss of switching element S1 during the period from Ta to Tb and the conduction loss of switching element S3 during the period from Tc to Ta.

In condition D, DC power supply 10a is in the powering condition, while DC power supply 10b is in the regenerative condition. In this condition, phase difference PH between the carrier waves is adjusted to achieve the phases of currents such that the rising timing of electric current I(L1) and the rising timing of electric current I(L2) coincide with each other at Tc shown in the drawing. Accordingly, it is possible to reduce the turn-on loss of switching element S1 and the turn-off loss of switching element S3 at Tc. Moreover, as described above, it is possible to reduce the conduction loss of switching element S1 during the period from Tb to Tc and the conduction loss of switching element S3 during the period from Tc to Ta.

As described above, phase difference PH for reducing the losses in the switching elements S1 to S4 varies depending on the combination of powering/regenerative conditions of DC power supplies 10a and 10b. Therefore, it is preferred to set the abovementioned phase difference map or phase difference calculation formula for each of the combinations of powering/regenerative conditions (conditions A to D in FIG. 31).

With the power converter control according to the second embodiment, the above-described carrier phase control can be combined in DC/DC conversion in the PB mode for controlling output voltage VH at voltage command value VH*. Accordingly, highly efficient DC/DC conversion with losses in switching elements S1 to S4 reduced can be executed.

It is noted that the example shown in FIG. 33 is not a limitation, but phase difference PH with which the operation of power converter 50 is optimized can be optionally set within the range from 0 degree to 180 degrees in the SB mode. That is, phase difference PH set by the above-described phase difference map or the phase difference calculation formula is not necessarily limited to phases of currents in which the local maximum, namely, falling timing of electric current I(L1) and the local minimum, namely, rising timing of electric current I(L2) coincide with each other or phases of currents in which the local minimum, namely, rising timing of electric current I(L1) and the local maximum, namely, falling timing of electric current I(L2) coincide with each other.

Next, carrier phase control in the SB mode will be described. As will be described below, in power converter control to which carrier phase control according to the second embodiment is applied, on/off of switching elements S1 to S4 is also controlled in the SB mode by pulse width modulation control based on duty ratios Da and Db.

Figure 34:
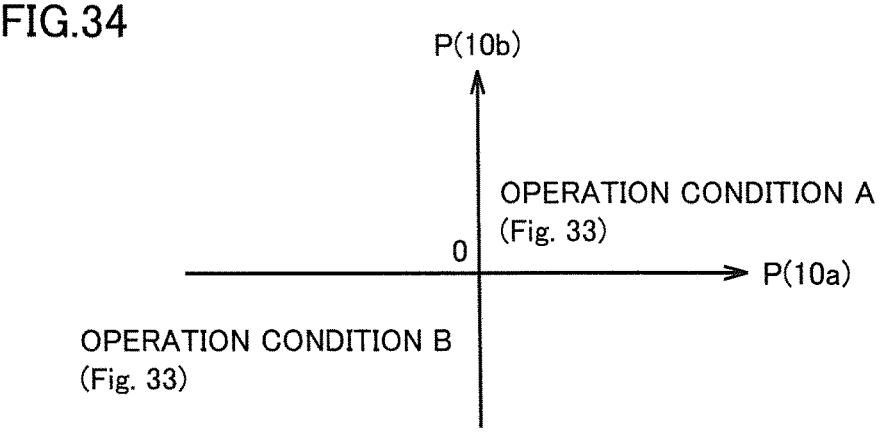
FIG. 34 shows a diagram describing conditions of two DC power supplies in the SB mode.

As shown in FIG. 34, in the SB mode, DC power supplies 10a and 10b are connected to each other in series. Therefore, there only exists either of the condition where both of DC power supplies 10a and 10b are in the powering condition (condition A in FIG. 33) and the condition where both of DC power supplies 10a and 10b are in the regenerative condition (condition B in FIG. 33).

Therefore, in the control operation in the SB mode, phase difference PH between the carrier waves is set so as to achieve phases of currents in which the local maximum, namely, falling timing of electric current I(L1) and the local minimum, namely, rising timing of electric current I(L2) coincide with each other, or phases of currents in which the local minimum, namely, rising timing of electric current I(L1) and the local maximum, namely, falling timing of electric current I(L2) coincide with each other, as shown in conditions A and B in FIG. 33.

That is, by setting phase difference PH between carrier waves CWa and CWb such that the falling timing of control pulse signal SDa and the rising timing of control pulse signal SDb coincide with each other or such that the rising timing of control pulse signal SDa and the falling timing of control pulse signal SDb coincide with each other, the phases of currents shown in conditions A and B in FIG. 33 will be achieved. Accordingly, phase difference PH is set such that the turn-on of switching element S2 coincides with the turn-off of switching element S4, or the turn-on of switching element S4 coincides with the turn-off of switching element S2.

Duty ratios Da and Db on this occasion will be considered. By modifying Equation (1), Da is expressed by Equation (13) below.

$$Da=(VH-Va)/VH \quad (13)$$

Similarly, by modifying Equation (2), Db is expressed by Equation (14) below.

$$Db=(VH-Vb)/VH \quad (14)$$

As shown in FIG. 10, control signal SG3 in the PB mode is generated based on the logical sum of control pulse signals SDa and SDb. Therefore, it is understood that, when phase difference PH is set such that the falling (or rising) timing of control pulse signal SDa and the rising (or falling) timing of control pulse signal SDb coincide with each other and when VH>(Va+Vb) holds, the ratio of H level period of control signal SG3 in the PB mode is more than 1.0. That is, when VH>(Va+Vb) holds, control signal SG3 is kept at the H level also by the PWM control with duty ratios Da and Db common to the PB mode.

Figure 35:
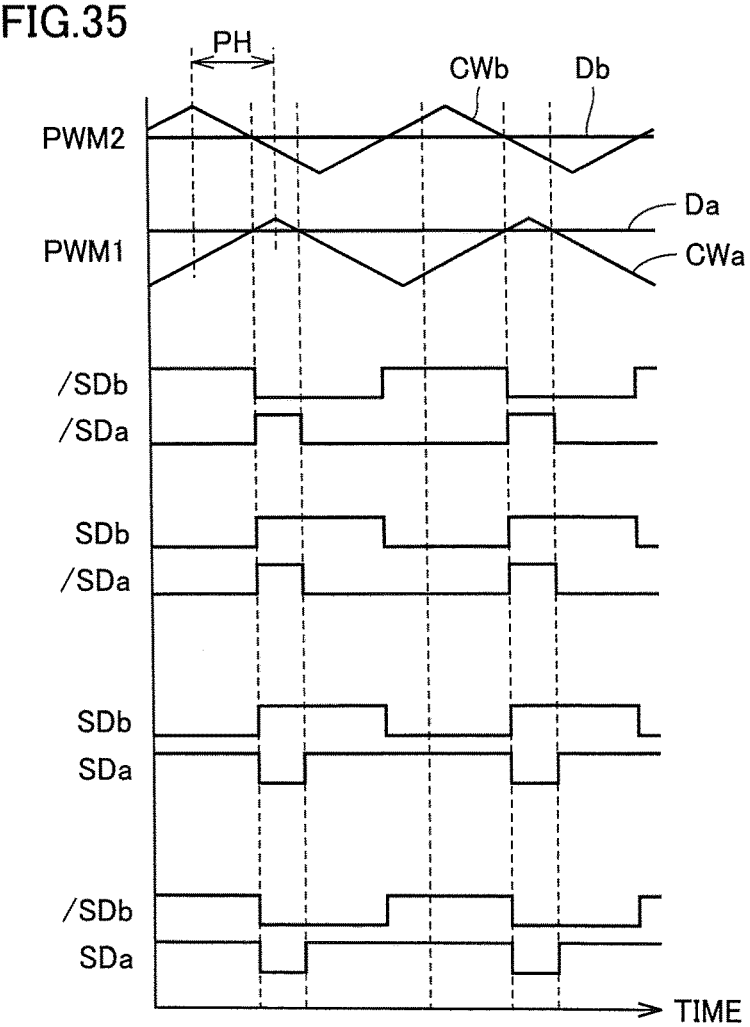
FIG. 35 is a diagram of waveforms showing control pulse signals in the SB mode when carrier phase control is applied.

FIG. 35 is a diagram of waveforms showing control pulse signals in the SB mode when carrier phase control is applied.

As shown in FIG. 35, control signal SG1 in the PB mode is generated based on the logical sum of control pulse signals /SDa and /SDb. When phase difference PH is set as described above, the rising timing of control pulse signal /SDa and the rising timing of control pulse signal /SDb coincide with each other. Therefore, the duty ratio of control signal SG1 is expressed by DSG1=(1−Da)+(1−Db). That is, DSG1 is expressed by Equation (15) below.

$$DSG1=(Va+Vb)/VH \quad (15)$$

Meanwhile, duty ratio Dc is expressed by Equation (16) below by modifying Equation (3).

$$Dc=1-(Va+Vb)/VH \quad (16)$$

Therefore, when SG1=/SGc holds in accordance with the logical calculation in the SB mode in FIG. 14, duty ratio DSG1 of control signal SG1 is expressed by Equation (17) below.

$$DSG1=1-Dc=(Va+Vb)/VH \quad (17)$$

As described above, when phase difference PH is set in accordance with the above-described carrier phase control, it is possible to generate signals with a duty ratio equal to that of control pulse signal /SDc based on duty ratio Dc by performing logical calculation based on control pulse signals SDa and SDb with duty ratios Da and Db, specifically, the logical sum of /SDa and /SDb. That is, it is possible to generate control signal SG1 in the SB mode based on control pulse signals SDa and SDb.

As shown in FIG. 36, control signals SG2 and SG4 in the SB mode are inversion signals of control signal SG1. The result of logical calculation of not (/SDb or /SDa) is the logical product of SDa and SDb (SDb and SDa). Therefore, it is also possible to generate control signals SG2 and SG4 which should be set in accordance with control pulse signal SDc, based on the logical calculation of control pulse signals SDa and SDb.

As described above, the carrier phase control is applied in the SB mode to set phase difference PH such that the pulse transition timing coincides between control pulse signal SDa (/SDa) and control pulse signal SDb (/SDb). By generating carrier waves CWa and CWb with such phase difference PH provided therebetween, it is possible to generate control signals SG1 to SG4 which should be set based on duty ratio Dc in the SB mode, from control pulse signals SDa and SDb based on duty ratios Da and Db, as shown in FIG. 36.

Specifically, as described above, control signal SG3 is a signal kept at the H level by the logical sum of control pulse signals SDa and SDb. Besides, control signal SG1 can be generated by the logical sum of control pulse signals /SDa and /SDb so as to have an equivalent duty to that in the PWM control based on duty ratio Dc. In addition, in the SB mode, it is also possible to generate control signals SG2 and SG4 which are set complementarily to control signal SG1, based on the logical sum of control pulse signals SDa and SDb.

Therefore, also in the SB mode, the operation of power converter 50 is controlled in accordance with the control structure of FIG. 27. PWM control unit 400 generates control pulse signals SDa (/SDa) and SDb (/SDb) in accordance with the comparison between carrier waves CWa and CWb for which phase difference PH has been set and duty ratios Da and Db, commonly in the PB mode and the SB mode. Furthermore, in accordance with the logical operational expressions shown in FIG. 35, control signals SG1 to SG4 are generated from control pulse signals SDa (/SDa) and SDb (/SDb) in each of the PB mode and the SB mode.

It is noted that phase difference PH in the SB mode can also be calculated based on duty ratios Da and Db calculated in the SB mode, in accordance with previously-set phase difference map storing the relationship of duty ratios Da and Db with phase difference PH, or phase difference calculation formulas, similarly to the carrier phase control in the PB mode. As described above, phase difference PH in the SB mode is set to achieve phases of currents in which the local maximum, namely, falling timing of electric current I(L1) and the local minimum, namely, rising timing of electric current I(L2) coincide with each other, or phases of currents in which the local minimum, namely, rising timing of electric current I(L1) and the local maximum, namely, falling timing of electric current I(L2) coincide with each other.

Therefore, when the carrier phase control is applied to power converter 50, a condition concerning the carrier phase control needs to be further added in switching control of operation mode described in the first embodiment. That is, at the time of switching to the SB mode, the PB mode needs to be applied so that phase difference PH between carrier waves becomes a phase difference for the SB mode.

Figure 37:
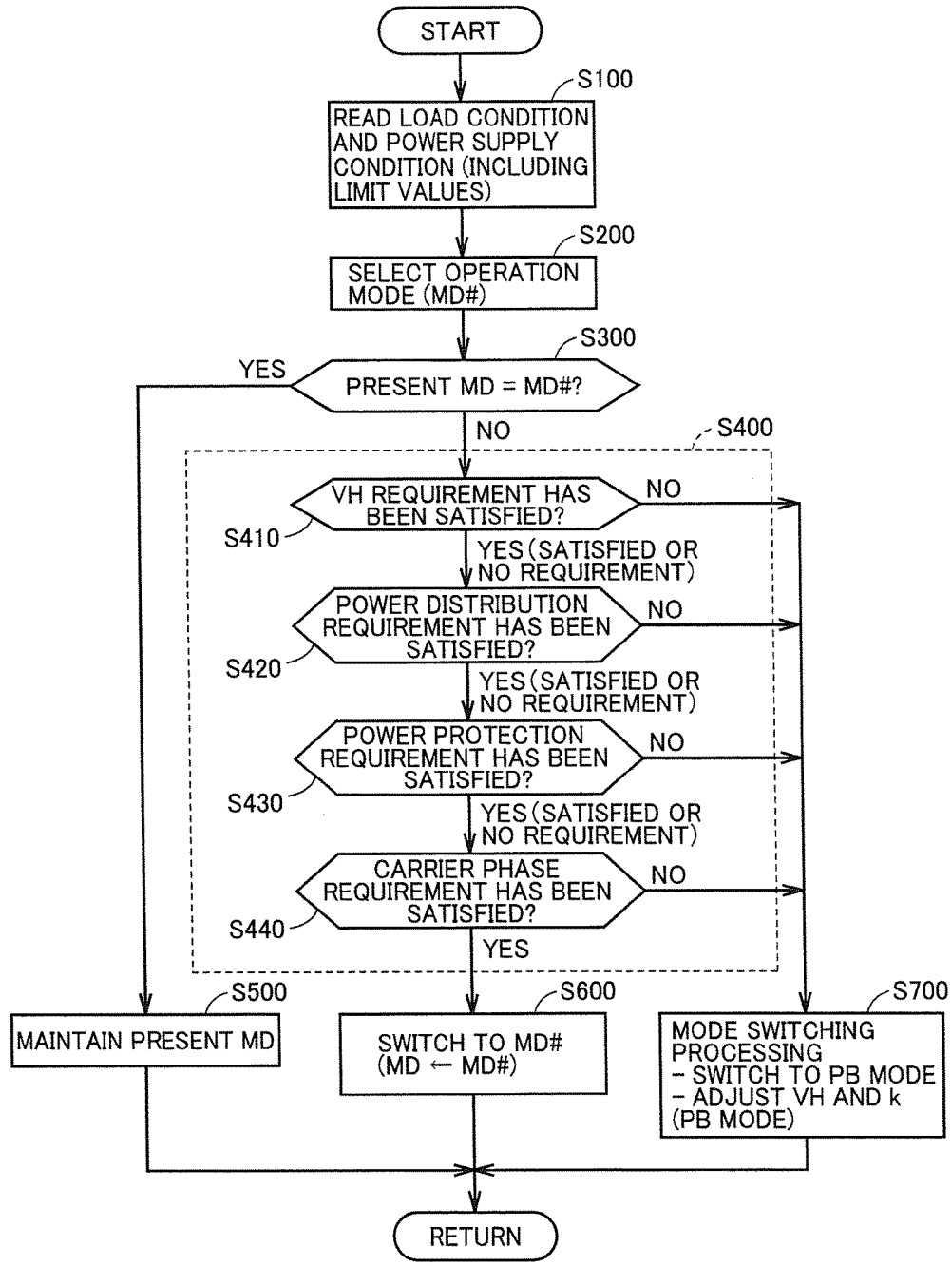
FIG. 37 is a flow chart for describing control processing according to the second embodiment in relation to switching of operation modes of the power converter.

FIG. 37 is a flow chart for describing control processing according to the second embodiment in relation to switching of operation modes of power converter 50. The control processing in accordance with the flow chart shown in FIG. 37 is also executed periodically by control device 40.

Comparing FIG. 37 with FIG. 17, in power converter control according to the second embodiment to which carrier phase control is applied, in switching control of operation mode, step S400 further includes step S440 of determining the carrier phase requirement. In step S440, when an operation mode after transition is the SB mode, it is determined whether or not phase difference PH between carrier waves CWa and CWb corresponds to the operation in the SB mode.

Therefore, in the control processing according to the second embodiment, when all of the VH requirement (S410), the power distribution requirement (S420), the power protection requirement (S430), and the carrier phase requirement (S440) have been satisfied, control device 40 advances the process to step S600 to execute switching to an operation mode in accordance with mode selection signal MD#. On the other hand, when at least any of the VH requirement, the power distribution requirement, the power protection requirement, and the carrier phase requirement has not been satisfied, control device 40 advances the process to step S700 (when a NO determination is made in any of S410 to S440), and does not permit switching to the operation mode after transition.

Figure 38:
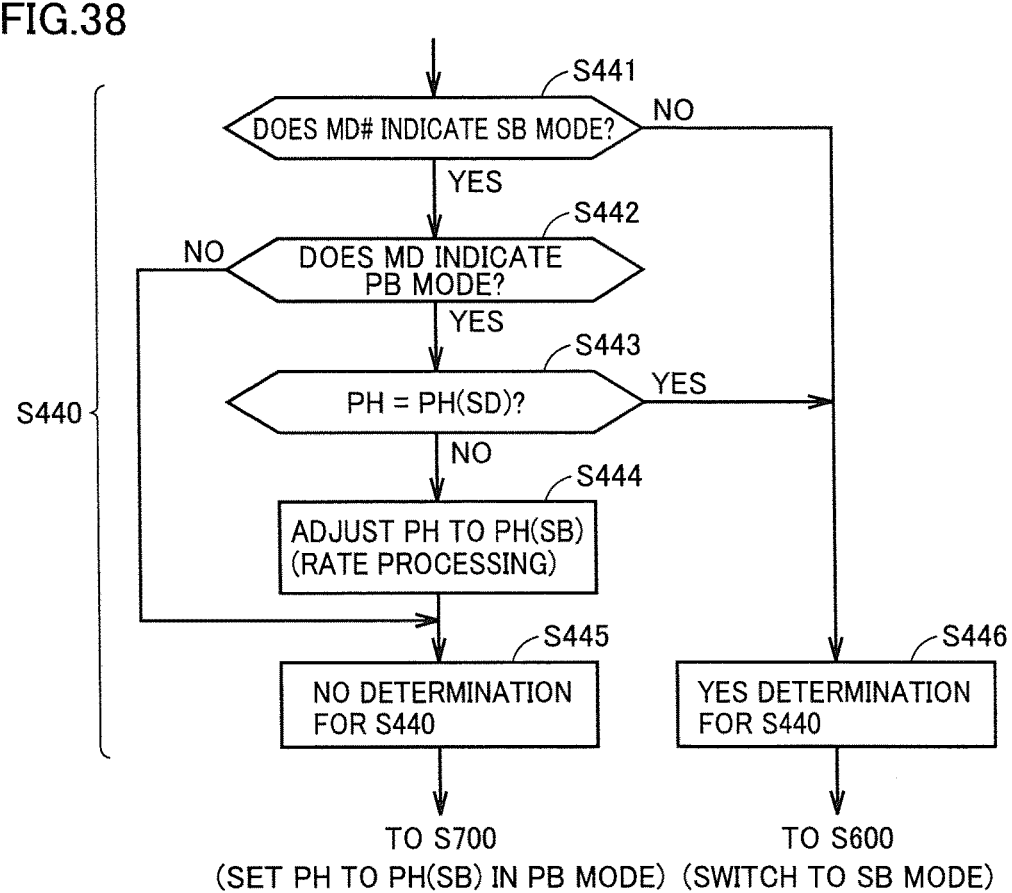
FIG. 38 is a flow chart for describing in detail control processing for determining a carrier phase requirement.

FIG. 38 is a flow chart for describing in detail control processing (S440) for determining the carrier phase requirement. That is, FIG. 38 shows the details of the control processing by step S440 of FIG. 37.

Referring to FIG. 38, S440 of FIG. 37 includes steps S441 to S446 below.

Control device 40 determines in step S441 whether an operation mode after transition (MD#) is the SB mode. When the operation mode after transition is not the SB mode (when a NO determination is made in S441), control device 40 advances the process to step S446 to determine that the carrier phase requirement has been satisfied. That is, the carrier phase requirement is set only at the time of switching to the SB mode. Therefore, when the operation mode after transition is not the SB mode, a YES determination is unconditionally made in step S440.

When the mode after transition is the SB mode (when a YES determination is made in S441), control device 40 advances the process to step S442 to determine whether or not the present operation mode is the PB mode. This is because phase difference PH cannot be adjusted except in the PB mode.

When the present operation mode is not the PB mode (when a NO determination is made in S442), control device 40 advances the process to step S445 to make a NO determination for step S440. That is, it is determined that the carrier phase requirement (S440) has not been satisfied, and the process is advanced to step S700. In step S700, when the present operation mode is not the PB mode, the operation mode is switched to the PB mode.

By the determination made in step S442, also in switching from the SD mode to the SB mode, the operation mode is once switched to the PB mode, and then switching to the SB mode will be executed. Therefore, in the power converter control according to the second embodiment to which the carrier phase control is applied, the operation mode is once switched to the PB mode at the time of switching from each operation mode to the SB mode.

When the present operation mode is the PB mode (when a YES determination is made in S442), control device 40 compares in step S443 present phase difference PH and a phase PH(SB) to which the SB mode can be applied. As described above, in the powering mode (Pa>0, Pb>0), PH(SB) corresponds to a phase difference when phases of currents in which the local maximum, namely, falling timing of electric current I(L1) and the local minimum, namely, rising timing of electric current I(L2) coincide with each other is obtained. In the regenerating mode (Pa<0, Pb<0), PH(SB) is a phase difference when phases of currents in which the local minimum, namely, rising timing of electric current I(L1) and the local maximum, namely, falling timing of electric current I(L2) coincide with each other is obtained. As described above, PH(SB) can be previously obtained uniquely in accordance with duty ratios Da and Db as well as plus/minus of electric power Pa and electric power Pb.

In the SB mode, carrier phase control unit 420 shown in FIG. 27 sets phase difference PH in accordance with a phase difference map for satisfying PH=PH(SB), based on duty ratios Da and Db as well as electric power Pa and electric power Pb. On the other hand, in the PB mode, carrier phase control unit 420 sets phase difference PH so as to be a phase difference with which the loss of power converter 50 is minimized. Therefore, there is no guarantee that phase difference PH in the PB mode agrees with phase difference PH(SB) required in the SB mode.

When the difference between present phase difference PH and PH(SB) is smaller than a predetermined decided value (when a YES determination is made in S443), control device 40 advances the process to step S446 to make a YES determination for step S440. Furthermore, when all of the VH requirement (S410), the power distribution requirement (S420) and the power protection requirement (S430) for the transition from the PB mode to the SB mode shown in FIG. 18 have been satisfied, switching to the SB mode is permitted.

On the other hand, when the difference between present phase difference PH and PH(SB) is larger than the predetermined decided value (when a NO determination is made in S443), control device 40 in step S444 changes phase difference PH to approach PH(SB). On this occasion, it is preferable to provide an upper limit for the amount of change in phase difference PH in a single control cycle. Therefore, the change in phase difference PH toward PH(SB) is rate processing in accordance with a constant change rate. Furthermore, control device 40 in step S445 makes a NO determination for step S440. Accordingly, switching to the SB mode is not permitted since the carrier phase requirement is not satisfied until phase difference PH substantially agrees with PH(SB) to achieve a phase difference that can correspond to the SB mode.

Then, with the operation mode switching of the power converter according to the second embodiment, the power loss is reduced by applying the carrier phase control during the operation in the PB mode, while the phase difference between carrier waves can be prevented from abruptly varying at the time of switching to the SB mode. Therefore, when the carrier phase control is applied, operation mode switching to the SB mode can also be executed smoothly such that inconvenience does not occur in operation and output of power converter 50.

Although the present embodiment has illustrated power converter 50 which executes DC/DC conversion between two DC power supplies 10a, 10b and common electric power line 20, the configuration of the power converter to which the present invention is applied is not limited to this illustration. That is, the operation mode switching to which the present invention is applied can be executed by any power converter that includes a plurality of DC power supplies and that is configured such that a plurality of operation modes are selectively applied, where the plurality of operation modes include both of the power distribution controlling mode in which power distribution between the DC power supplies can be controlled and the power distribution keeping mode in which power distribution between the DC power supplies is determined in a fixed manner.

Further, it is noted that load 30 may be configured by any device that operates with DC voltage VH. Specifically, though examples in which load 30 is configured so as to include a traction motor for running of an electric powered vehicle have been described in the present embodiment, application of the present invention is not limited to such examples.

It should be understood that the embodiments disclosed herein are illustrative and non-restrictive in every respect. The scope of the present invention is defined by the claims not by the description above, and is intended to include any modification within the meaning and scope equivalent to the terms of the claims.

REFERENCE SIGNS LIST 5 power supply system; 10a, 10b DC power supply; 15 line; 20 electric power line; 21 ground line; 30 load; 32 inverter; 35 motor-generator; 36 motive power transmission gear; 37 driving wheel; 40 control device; 50 power converter; 101, 102 operating point; 110, 120 active region; 150, 151, 160, 161, 170-174 electric current path; 300 duty ratio calculation unit; 400 control unit; 410 carrier wave generation unit; 420 carrier phase control unit; 600 operation mode selection unit; 700 converter command generation unit; 710 operation mode switching control unit; 720 power upper limit value setting unit; 730 power lower limit value setting unit; CH smoothing capacitor; CW, CWa, CWb carrier wave; D1-D4 anti-parallel diode; Da, Db, Dc duty ratio; Ia, Ib electric current (DC power supply); I(L1), I(L2) electric current of reactor; Ia* electric current command value; L1, L2 reactor; MD mode control signal; MD# mode selection signal; N1-N3 node; PHmax, Pamax, Pbmax power upper limit value; PL* load power command value; Pa, Pb electric power (DC power supply); Ra, Rb internal resistance (DC power supply); S1-S4 power semiconductor switching element; SDa, SDb, SDc control pulse signal; SG1-SG4 control signal; Ta,Tb temperature (DC power supply); VH DC voltage (output voltage); VH* voltage command value (output voltage); VH# optimum operating voltage; VHmax upper limit voltage (output voltage); Va, Vb voltage (DC power supply); k power distribution ratio; k1 power distribution ratio (SB mode, SD mode); k2 power distribution ratio (PD mode).

The invention claimed is:

1. A power supply system comprising:
an electric power line connected to a load;
a plurality of DC power supplies;
a power converter connected across said plurality of DC power supplies and said electric power line; and
a control device configured to control operation of said power converter, said power converter including a plurality of switching elements and being configured to control an output voltage on said electric power line by operating with one of a plurality of operation modes different in mode of power conversion between said plurality of DC power supplies and said electric power line applied, said plurality of operation modes including
a first operation mode in which power distribution between said plurality of DC power supplies is controllable through said power converter, and
a second operation mode in which power distribution between said plurality of DC power supplies is determined in a fixed manner through said power converter, said control device including
a mode selection unit configured to select an operation mode from among said plurality of operation modes in accordance with conditions of said load and said plurality of DC power supplies, and
an operation mode switching control unit configured to, when a present operation mode currently applied to said power converter and an operation mode after transition selected by said mode selection unit are different, control switching from said present operation mode to said operation mode after transition, when said present operation mode is said first operation mode and said operation mode after transition is said second operation mode, said operation mode switching control unit controlling, in said first operation mode, power distribution between said plurality of DC power supplies to be performed at a power distribution ratio in a case where said operation mode after transition is applied, and then executing switching to said operation mode after transition, wherein when electric power of each of said DC power supplies in accordance with the power distribution ratio in the case where said operation mode after transition is applied reaches a limiting value for each of said DC power supplies, said operation mode switching control unit prohibits switching to the operation mode after transition.

2. The power supply system according to claim 1, wherein when one mode belonging to said second operation mode among said plurality of operation modes is said present operation mode and said operation mode after transition is another mode belonging to said second operation mode among said plurality of operation modes, said operation mode switching control unit switches said present operation mode to said first operation mode and controls power distribution between said plurality of DC power supplies in said first operation mode, and then executes switching to said operation mode after transition.

3. The power supply system according to claim 1, wherein when said output voltage at present falls out of a controllable range of said output voltage by said operation mode after transition, said operation mode switching control unit operates said power converter by said present operation mode such that said output voltage falls within said controllable range, and then executes switching to said operation mode after transition.

4. A power supply system comprising:
an electric power line connected to a load;
a plurality of DC power supplies;
a power converter connected across said plurality of DC power supplies and said electric power line; and
a control device configured to control operation of said power converter,
said power converter including a plurality of switching elements and being configured to control an output voltage on said electric power line by operating with one of a plurality of operation modes different in mode of power conversion between said plurality of DC power supplies and said electric power line applied,
said plurality of operation modes including
a first operation mode in which power distribution between said plurality of DC power supplies is controllable through said power converter, and
a second operation mode in which power distribution between said plurality of DC power supplies is determined in a fixed manner through said power converter,
said control device including
a mode selection unit configured to select an operation mode from among said plurality of operation modes in accordance with conditions of said load and said plurality of DC power supplies, and
an operation mode switching control unit configured to, when a present operation mode currently applied to said power converter and an operation mode after transition selected by said mode selection unit are different, control switching from said present operation mode to said operation mode after transition,
when said present operation mode is said first operation mode and said operation mode after transition is said second operation mode, said operation mode switching control unit controlling, in said first operation mode, power distribution between said plurality of DC power supplies to be performed at a power distribution ratio in a case where said operation mode after transition is applied, and then executing switching to said operation mode after transition, wherein
said plurality of DC power supplies are implemented by a first DC power supply and a second DC power supply,
said plurality of switching elements include
a first switching element connected electrically across a first node and said electric power line,
a second switching element connected electrically across a second node and said first node,
a third switching element connected electrically across a third node, connected electrically to a negative electrode terminal of said second DC power supply, and said second node, and
a fourth switching element connected electrically across a negative electrode terminal of said first DC power supply and said third node,
said power converter further includes
a first reactor connected electrically across said second node and a positive electrode terminal of said first DC power supply, and
a second reactor connected electrically across said first node and a positive electrode terminal of said second DC power supply,
said first operation mode includes a first mode in which said first and second DC power supplies execute DC voltage conversion in parallel with said electric power line by controlling on/off of said first to fourth switching elements, and
said second operation mode includes a second mode in which said first and second DC power supplies connected in series execute DC voltage conversion with said electric power line by keeping said third switching element on and controlling on/off of said first, second and fourth switching elements.

5. The power supply system according to claim 4, wherein when one mode belonging to said second operation mode among said plurality of operation modes is said present operation mode and said operation mode after transition is another mode belonging to said second operation mode among said plurality of operation modes, said operation mode switching control unit switches said present operation mode to said first operation mode to control power distribution between said first and second DC power supplies in said first operation mode, and then executes switching to said operation mode after transition.

6. The power supply system according to claim 4, wherein when electric power of each of said DC power supplies in accordance with the power distribution ratio in the case where said operation mode after transition is applied reaches a limiting value for each of said DC power supplies, said operation mode switching control unit prohibits switching to the operation mode after transition.

7. The power supply system according to claim 4, wherein when said output voltage at present falls out of a controllable range of said output voltage by said operation mode after transition, said operation mode switching control unit operates said power converter by said present operation mode such that said output voltage falls within said controllable range, and then executes switching to said operation mode after transition.

8. The power supply system according to claim 4, wherein said control device includes
a duty ratio calculation unit configured to calculate a first duty ratio for controlling output from said first DC power supply and a second duty ratio for controlling output from said second DC power supply,
a pulse width modulation control unit configured to generate on/off control signals for said first to fourth switching elements based on first and second control pulse signals respectively obtained by pulse width modulation in accordance with comparison between a first carrier wave and said first duty ratio as well as comparison between a second carrier wave and said second duty ratio, and
a carrier phase control unit configured to variably control a phase difference between said first carrier wave and said second carrier wave when said first and second modes are applied, and
when said operation mode after transition is said second mode, said operation mode switching control unit operates said power converter by said first mode to obtain phases of currents in which a falling timing of electric current of said first DC power supply and a rising timing of electric current of said second DC power supply coincide with each other or to obtain phases of currents in which the rising timing of electric current of said first DC power supply and the falling timing of electric current of said second DC power supply coincide with each other, and then executes switching to said second mode.

9. The power supply system according to claim 4, wherein said second operation mode further includes a third mode in which DC voltage conversion is executed between one of said first and second DC power supplies and said electric power line by controlling on/off of said first to fourth switching elements, a fourth mode in which said first to fourth switching elements are kept on/off to maintain said first and second DC power supplies connected in parallel with said electric power line, a fifth mode in which said first to fourth switching elements are kept on/off to maintain said first and second DC power supplies connected in series with said electric power line, and a sixth mode in which said first to fourth switching elements are kept on/off to maintain one of said first and second DC power supplies electrically connected to said electric power line.

* * * * *